(12) United States Patent
Creasey et al.

(10) Patent No.: US 11,576,372 B2
(45) Date of Patent: Feb. 14, 2023

(54) SHIPPING CONTAINER

(71) Applicant: Asymptote Ltd., Cambridge (GB)

(72) Inventors: Christopher Creasey, Cambridge (GB); Stephen Lamb, Cambridge (GB); Stuart Milne, Cambridge (GB); George John Morris, Cambridge (GB)

(73) Assignee: Asymptote Ltd., Cambridge (GB)

(*) Notice: Subject to any disclaimer, the term of this patent is extended or adjusted under 35 U.S.C. 154(b) by 81 days.

(21) Appl. No.: 16/470,715

(22) PCT Filed: Dec. 19, 2017

(86) PCT No.: PCT/GB2017/053792
§ 371 (c)(1),
(2) Date: Jun. 18, 2019

(87) PCT Pub. No.: WO2018/115833
PCT Pub. Date: Jun. 28, 2018

(65) Prior Publication Data
US 2020/0085036 A1  Mar. 19, 2020

(30) Foreign Application Priority Data

Dec. 19, 2016 (GB) .................................. 1621645
Sep. 6, 2017 (GB) .................................. 1714319

(51) Int. Cl.
| | | |
|---|---|---|
| *F25B 9/14* | (2006.01) |
| *A01N 1/02* | (2006.01) |
| *F25D 3/10* | (2006.01) |
| *F25D 19/00* | (2006.01) |
| *F25D 3/14* | (2006.01) |

(52) U.S. Cl.
CPC .............. *A01N 1/0257* (2013.01); *F25B 9/14* (2013.01); *F25D 3/107* (2013.01); *F25D 19/006* (2013.01); *F25D 3/14* (2013.01)

(58) Field of Classification Search
CPC .......... F25B 9/14; F25D 19/006; F25D 3/107; F25D 3/14; A01N 1/0257
See application file for complete search history.

(56) References Cited

U.S. PATENT DOCUMENTS 5,355,684 A  10/1994 Guice
5,419,143 A   5/1995 Leonard et al.
(Continued)

FOREIGN PATENT DOCUMENTS

CN  101059285 A  10/2007
CN  105737471 A   7/2016
(Continued)

OTHER PUBLICATIONS

PCT International Search Report and Written Opinion for PCT Application No. PCT/GB2017/053792 dated Apr. 30, 2018 (14 pages).
(Continued)

*Primary Examiner* — Filip Zec
(74) *Attorney, Agent, or Firm* — Eversheds Sutherland (US) LLP

(57) ABSTRACT

The present invention relates to a shipping container for cryopreserved biological samples in which a cryopreserved sample can be maintained on arrival at its destination for a period of time, for example several months.

13 Claims, 27 Drawing Sheets

(56) References Cited

U.S. PATENT DOCUMENTS

| | | | |
|---|---|---|---|
| 6,212,901 B1 | 4/2001 | Pint et al. | |
| 6,711,912 B2* | 3/2004 | Laubacher | H01P 1/30 |
| | | | 62/259.2 |
| 6,751,963 B2 | 6/2004 | Navedo et al. | |
| 7,331,192 B2* | 2/2008 | Kummeth | F28D 15/02 |
| | | | 62/457.1 |
| 8,256,231 B2* | 9/2012 | Teehan | A01N 1/02 |
| | | | 62/51.1 |
| 9,366,483 B2 | 6/2016 | Eckhoff et al. | |
| 10,935,298 B2* | 3/2021 | Arnitz | F25D 3/105 |
| 2003/0101733 A1 | 6/2003 | Ogura et al. | |
| 2005/0166601 A1 | 8/2005 | Culp et al. | |
| 2009/0007573 A1* | 1/2009 | Noonan | F25B 17/08 |
| | | | 62/51.1 |
| 2012/0297797 A1* | 11/2012 | Cognard | A47J 41/024 |
| | | | 62/51.1 |
| 2015/0068232 A1* | 3/2015 | Petrov | F25D 3/107 |
| | | | 62/125 |
| 2015/0128614 A1* | 5/2015 | Ghoshal | F24H 4/04 |
| | | | 62/3.3 |
| 2015/0204598 A1* | 7/2015 | Affleck | B65B 3/003 |
| | | | 220/560.04 |
| 2017/0343264 A1* | 11/2017 | McCormick | A01N 1/0257 |
| 2020/0305417 A1 | 10/2020 | Morris et al. | |

FOREIGN PATENT DOCUMENTS

| | | | | |
|---|---|---|---|---|
| CN | 106081363 A | 11/2016 | | |
| CN | 1068715467 A | 6/2017 | | |
| EP | 1526347 A1 | 4/2005 | | |
| JP | H0452480 A | 2/1992 | | |
| JP | 06101946 A | * 4/1994 | ……… | F25D 19/006 |
| JP | 2007057179 A | 3/2007 | | |
| JP | 2013245907 A | 12/2013 | | |
| WO | 01/95716 A2 | 12/2001 | | |

OTHER PUBLICATIONS

Great Britain Search Report for GB Application No. 1621645.9 dated Jun. 20, 2017 (4 pages).

Chinese Office Action for CN Application No. 201680062682.6 dated Dec. 16, 2020 (20 pages, with English translation).

European Office Action for EP Application No. 17818239.0 dated May 31, 2021 (5 pages).

Japanese Office Action for JP Application No. 2019-532930 dated Jul. 26, 2021 (9 pages, with English translation).

* cited by examiner

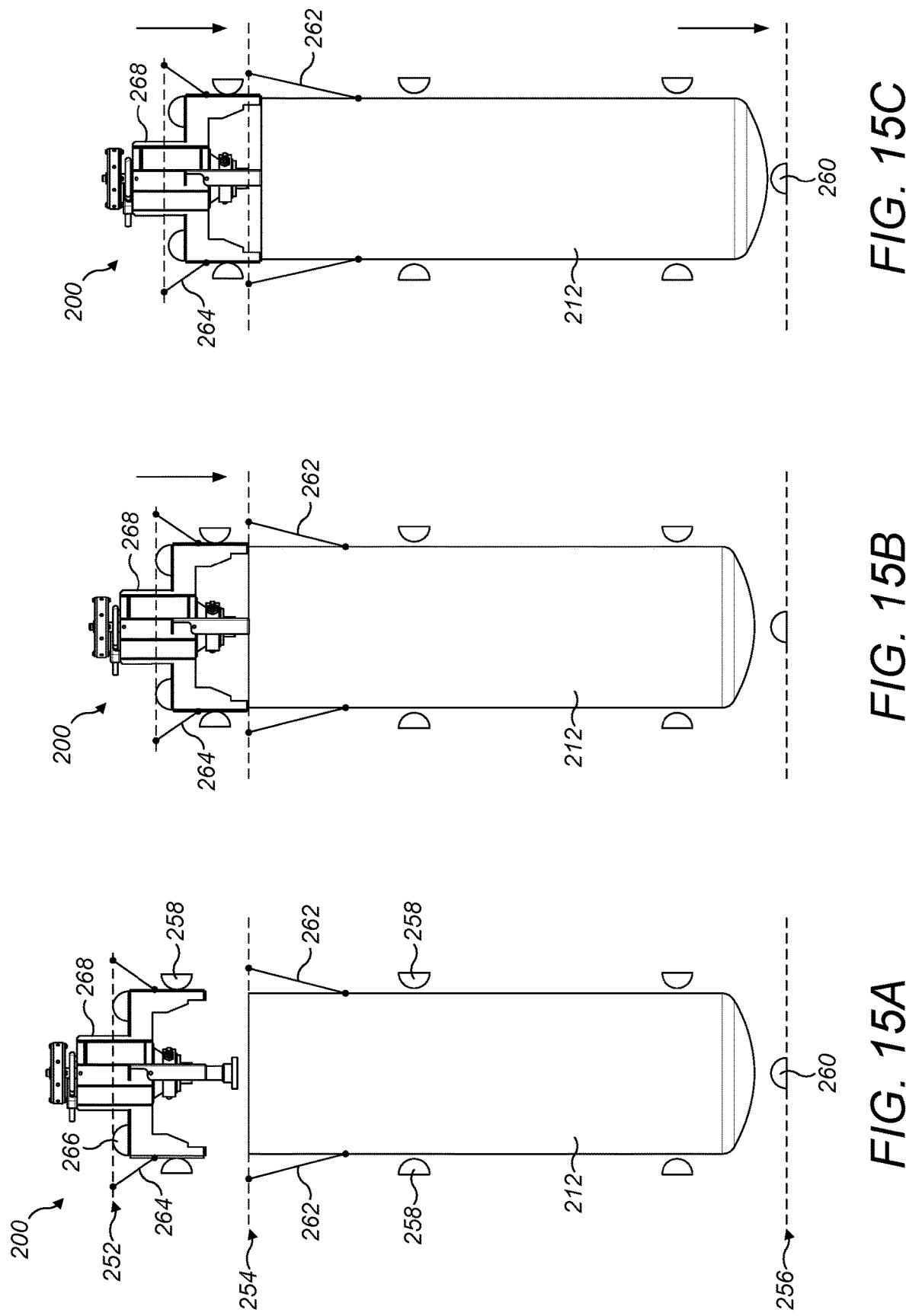

SHIPPING CONTAINER

CROSS REFERENCE TO RELATED APPLICATIONS

This application claims the priority benefit of PCT/GB2017/053792 filed on Dec. 19, 2017 which claims priority benefit of Great Britain Application Nos. 1621645.9 and 1714319.9, filed Dec. 19, 2016 and Sep. 6, 2017, respectively. The entire contents of which are hereby incorporated by reference herein.

FIELD OF THE INVENTION

The present invention relates to a shipping container for cryopreserved samples, for example biological samples, in which a cryopreserved sample can be maintained on arrival at its destination for an extended period of time, for example months, and can also possibly be used for controlled rate freezing and thawing. The containers of the invention could also be used for shipping other types of samples that require cryogenic storage without the use of conventional cryogenic materials such as liquid nitrogen or solid carbon dioxide.

BACKGROUND TO THE INVENTION

Cryopreservation is a technique used for the preservation of biological samples that involves cooling samples to, and maintaining them for prolonged periods at, very low temperatures, for example −78.5° C. to −196° C. By cooling a biological sample to a low temperature, the kinetics of chemical or enzymatic reactions that would otherwise degrade the sample are slowed to such an extent that the sample no longer degrades or only degrades at a very slow rate. As a result, biological samples can be stored over prolonged periods and then brought back to ambient temperature as required for use and/or analysis.

Cryopreserved samples can be transported if their temperature is maintained at a sufficiently low temperature during transit. If the sample is allowed to warm above a certain temperature, for example above the glass transition point of the sample, the integrity of the sample can be compromised. This is because the cryoprotective agents used in the cryopreservation process have a degree of toxicity towards the sample and more diffusion and therefore more chemical reactions can occur which can affect the viability of the stored cells. Prolonged exposure to the cryoprotective agents and chemical reactions at higher temperatures and their cumulative effects causes damage to the cryopreserved material. Below the glass transition temperature the viscosity of the system means that cumulative effects are very small. During cryopreservation cooling from the cell's ambient temperature needs to be done in a controlled way to minimise damage and optimise cell viability post thaw. It is therefore evident that to ensure sample integrity in shipping the cryopreserved sample must be kept cold enough for the cumulative damaging effects not to be significant in the anticipated period of transportation and storage.

In addition to the need to maintain an adequately low temperature during transit the shipping container and its contents must be compatible with the environments it passes through before, during and after transit. Thus, in the case of airfreight it is unacceptable on safety grounds for a phase transition coolant such as liquid nitrogen to be used if there is a risk of spillage of the liquid nitrogen. To circumvent this problem, dry shippers, Dewar vessels with porous materials such as molecular sieves or zeolites, have been developed to ensure that low temperature shipping can be achieved without the risk of liquid nitrogen spillage. In such Dewars liquid nitrogen is absorbed into the porous material and is retained therein until it boils off as gaseous nitrogen.

A problem associated with these dry shippers is that the porous materials are easily contaminated, for example with particulate biological material from the liquid nitrogen that remains in the dry shipper must be sterilised between each use and this makes their use in sterile environments such as operating theatres and clean room highly undesirable Additionally, the Dewar vessel is a vacuum jacketed vessel and to ensure equal pressure distribution on the vessel walls the shape of the vessel must be approximately cylindrical or spherical as avoiding catastrophic failure requires thicker materials and therefore poorer performing Dewars. A combination of these factors means that the dry shippers are generally in the form of a cylindrical or spherical Dewar with a relatively narrow aperture at one end through which charging with liquid nitrogen and sample occurs. A typical dry shipper has a bore that projects radially from the central axis of the Dewar's mouth. The porous material in which the liquid nitrogen is absorbed is provided in the ring between the outer wall of the bore and the innermost wall of the Dewar and this dictates that the porous material (i.e. the molecular sieve element) cannot be removed and replaced easily and in any case not without first extracting the sample.

Simpler shipping containers containing a phase transition cooling material such as solid carbon dioxide as the coolant (cryogen) can also be used for shipping cryopreserved samples and consist of an insulated vessel, for example a Dewar or an insulated box, containing the sample on or immersed in a bed of solid carbon dioxide. The problem with such containers is that they are only capable of maintaining the sample at a low temperature for a relatively modest period of time and are unsuitable for shipping or storage over large time scale without frequent recharging of the phase transition cooling material. Solid carbon dioxide has a temperature of approximately −78.5° C. which is above the glass transition temperature of many cryoprotective agents and this temperature may not be low enough to prevent damage to the sample before, during, or after transport over longer timescales (days).

Developments in medicine mean that there is a growing need to ship and maintain cryopreserved samples in environments where cryogenic materials (liquid nitrogen, solid carbon dioxide etc.) and storage facilities are not available and/or practical. For example, the field of immunotherapy is rapidly developing and has significant potential for therapy, for example in the treatment of cancers such as leukaemia and melanoma. In one approach T-cells are harvested from a patient's blood and then genetically engineered to introduce chimeric antigen receptors (CARs) on their surface. The resultant chimeric antigen receptor T-cells (CAR T-cells) are then grown up in the lab to provide a sufficient number for therapy and are in turn transfused into the original patient. The CAR T-cells can then recognise the relevant protein antigen on the tumour cell's surface and in turn recruit the patient's immune system to kill those cells. This process requires the transfer of the blood and/or tissue samples to a laboratory capable of performing the genetic engineering thereon and then growing the requisite number of CAR T-cells. In addition, the CAR T-cells must then be shipped back to the patient's own clinic and stored until the patient is ready for treatment. This typically requires storage of the cryopreserved CAR T-cell sample(s) at the clinic for a period of several weeks or more and this demands either construction of a local cryopreservation facility or provision of a shipping container that can also serve as a storage unit on arrival. It is an object of the present invention to provide such a shipping container.

SUMMARY

In a first aspect the invention provides a shipping container for cryogenic samples comprising an insulated housing defining a cavity for receiving a sample for cryopreservation and a thermal diode operable in a first state to provide cooling to the cavity and in a second state to impair heat transfer into the cavity. In this aspect the cavity is preferably suitable for receiving a replaceable cartridge of cryogenic phase transition material, in the case where a solid to liquid phase transition cryogen is to be used a cartridge containing such a cryogen may be fixably attached in the cavity.

In embodiments, the thermal diode is a gravitational thermal diode, i.e. a diode that operates under the influence of gravity and is capable of maintaining a temperature difference of up to 180° C. across its vertical height with a power loss of less than 10 W, for example less than 5 W or less than 3 W. An advantage of having a gravitational thermal diode is that in a state where no active cooling is provided to the shipper the temperature differential between the base of the cavity can be maintained solely under the influence of gravity. The thermal diode may comprise an air blanket element and/or a closed circuit condenser/evaporator loop element (thermosiphon). An advantage of the air blanket element is that the cost of the shipper is reduced. An advantage of the thermosiphon element is that cooling can be accelerated. In embodiments, a heat engine is provided to remove heat from the thermal diode, in use the heat engine, for example a Stirling cryocooler, will be thermally connected to a heat exchange element or a thermosiphon or both so that heat can be removed from the cavity. Provision of a heat engine allows the temperature with in the shipper to be brought to cryopreservation temperatures without the need for a cryocoolant. The heat exchange element, when present, will be located at the vertically uppermost portion of the cavity when the shipping container is in an upright position and is preferably surrounded by an infra-red shield.

In embodiments, the insulation element of the insulated housing may comprise vacuum insulated panels. An advantage of vacuum insulated panels is their excellent insulating properties, relatively low cost and weight. Vacuum insulated panels can be easily formed into shapes not easily accessible with Dewars, for example the cavity can be substantially rectangular in cross section. The insulation element of the insulated housing may comprise a Dewar vessel. The insulation element of the insulated housing may comprise a Dewar vessel and one or more vacuum insulated panel, generally in this case the one or more vacuum insulated panel will be located outside the cavity defined by the Dewar. An advantage of this construction is that excellent thermal performance and resistance to failure of the Dewar is provided.

In embodiments, the shipping container may comprise one or more sensors for detecting the temperature within the cavity or the temperature of a sample located in the cavity, the location of the container, the power required to maintain the temperature within the cavity stable or the amount of cryogenic phase transition material in a cartridge located in the cavity. An advantage of this is that the history of the sample preservation conditions can be established and therefore the quality of the sample can be assured. The need for intervention to maintain sample integrity can also be determined.

Alternatively, or additionally, in embodiments the shipping container may comprise an electronic contact for engagement with one or more sensors located within a replaceable cartridge of phase transition material. An advantage here is that monitoring of the cartridge can be performed without opening the container, for example, remotely.

In embodiments, shipping containers equipped with sensors or configured to receive sensor bearing cartridge of phase transition material preferably also a communication unit for reporting a reading from the one or more sensors. Remote monitoring of the conditions in the shipping container is thus possible and alerts can be sent when intervention to ensure sample integrity can be provided. The reading from the one or more sensors in/on the container can indicate the position of the shipping container, the temperature in the cavity, the heat loss from the cavity, orientation of the cavity, shocks and vibration that the cavity has been exposed to or the integrity of the sample or a combination of such parameters.

Shipping containers according to embodiments also typically comprising an insulated lid that is attachable to the container to seal the cavity. The lid may further comprise a lock, optionally wherein the lock is releasable by remote control or by a remotely generated code, for example in response to a signal verifying the integrity of the cryopreserved sample. Stored samples can thus be released to authorised users or when the integrity of the sample can be established through its preservation history. Alternatively, or additionally, in embodiments the lid comprises a Stirling engine configured to remove heat from the thermal diode or is adapted to receive a Stirling engine configured to remove heat from the thermal diode. The shipping container can thus be maintained at optimal temperature by powering up the heat pump, for example a Stirling cryocooler from an internal or external power source.

In embodiments, the shipping container may comprise means for controlled rate freezing and/or controlled thawing. Such means may allow for controlling the descent of a sample into the cavity in response to a reading from one or more sensors located in the cavity or on the sample or the ascent of a sample up the cavity in response to a reading from one or more sensors located in the cavity or on the sample, for example a lift or winch arrangement. An advantage is that cryopreservation and sample thawing can be performed at locations where this would not usually be possible, for example in operating theatres without additional equipment. In embodiments, extraction means for retrieving a cryopreserved sample and/or replaceable cartridge of phase transition material from the cavity may also be provided to facilitate access to or removal of the sample. In embodiments, the shipping container can in some embodiments comprise a conduit for fluid recharging of a replaceable cartridge of phase transition material located within the cavity of the container thus allowing recharging of cryogen without exposing the shipper cavity or sample to contamination. The shipping container may be equipped with a replaceable cartridge for receiving a cryogenic phase transition material. Advantageously the cryopreservation properties of the shipper in offline, unpowered states, can be maintained when such a cryogen containing cartridge is in place.

In a further aspect the invention provides a replaceable cartridge for receiving a cryogenic phase transition material for use with a shipping container as described above. The cartridge may comprise a handle that extends towards the top of the thermal diode when installed in a shipping container. In advantageous configurations, the cartridge may comprise one or more sensors for providing information on the fill state or temperature of the cartridge and may be provided with a connector to form an electrical connection between the one or sensors in the cartridge and control electronics/communication unit.

In embodiments, the thermal diode is operable in a first state to provide cooling to the cavity using a gas, and in a second state to impair heat transfer into the cavity using a gas.

In a further aspect of the invention, there is provided a portable housing for the shipping container described herein. The portable housing may comprise an upper portion; a lower portion; and a drawer mechanism slideably engaged with the lower portion. A shipping container of the type described herein may be mountable in the drawer mechanism.

In a further aspect of the invention, there is provided a method for reducing a volume of liquid oxygen in a cavity of a shipping container for cryopreserved biological samples, the shipping container comprising a first temperature sensor located near the top of the cavity, and a second temperature sensor located near the bottom of the cavity, the method comprising: measuring a first temperature at the top of the cavity; measuring a second temperature at the bottom of the cavity; determining a difference between the first temperature and the second temperature, wherein if the determined difference between the first temperature and the second temperature is within a specified range; switching on a heating mechanism to evaporate liquid oxygen in the cavity.

In a further aspect of the invention, there is provided a method for safely switching-off an engine of a cryocooler, the method comprising: determining a mains power supply has been disconnected from the engine; sending a control signal to the engine to park; and de-coupling the engine from at least one battery According to a related aspect of the present techniques, there is provided a non-transitory data carrier carrying code which, when implemented on a processor, causes the processor to carry out any of the methods described herein.

As will be appreciated by one skilled in the art, embodiments of the present techniques may be embodied as a system, method or computer program product. Accordingly, present techniques may take the form of an entirely hardware embodiment, an entirely software embodiment, or an embodiment combining software and hardware aspects.

Furthermore, embodiments of the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

In a related aspect of the invention, there is provided a container for holding at least one cryopreserved biological sample within a shipping container of the types described herein.

BRIEF DESCRIPTION OF THE DRAWINGS

The techniques are diagrammatically illustrated, by way of example, in the accompanying drawings, in which:

FIG. 15A shows a cross-sectional view of a mechanism to raise and lower the upper portion of the portable housing of FIG. 14A, with the upper portion in a raised position; FIG.

15B shows the upper portion in a lowered position; and FIG. 15C shows a mechanism to protect the shipping container;

DETAILED DESCRIPTION

Broadly speaking, the present techniques relate to shipping containers, and more particularly to portable shipping containers that may be transported from location to location by standard road, air and rail freight, and may be stored and used in conventional rooms, for example operating theatres, at their destination. To ensure portability, it is preferred that the shipping containers described herein are less than or equal to 1.5 m tall (i.e. have a height of ≤1.5 m).

In embodiments, the shipping containers may comprise an insulated housing, the housing defining a cavity for receiving i) a replaceable cartridge of phase transition material and ii) the sample to be cryopreserved. The housing can be formed in any appropriate shape and from any appropriate material. In addition, the shipping containers may characteristically comprise a thermal diode operable in a first state to provide cooling to the cavity and in a second state to impair heat transfer into the cavity. The thermal diode of the shipping containers may be gravitational thermal diodes, i.e. thermal diodes that operate under the influence of gravity, wherein gravity dictates that the vertically lowest portion of the cavity within the insulated housing is maintained at a lower temperature than the other areas of the cavity.

Figure 1:
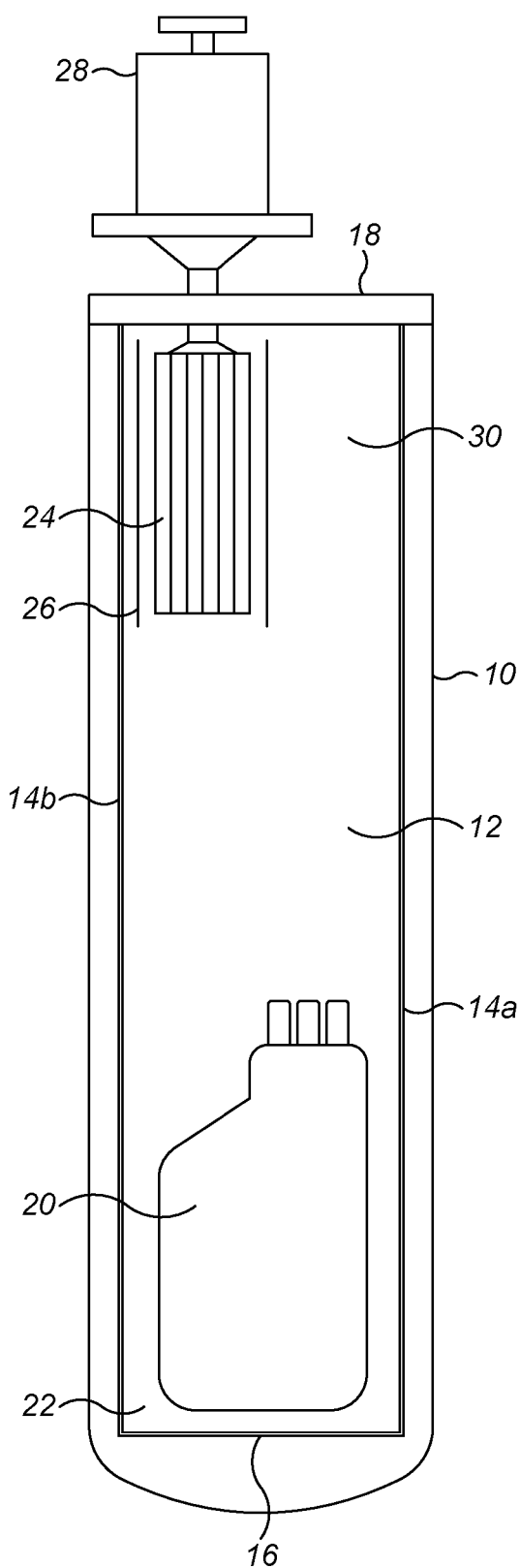
FIG. 1 shows the basic structure of a shipper or shipping container with the cryopreserved sample at the bottom of the Dewar and the Stirling engine and heat exchanger at the top.

FIG. 1 shows the basic structure of a shipper or shipping container comprising an insulated housing 10. In FIG. 1, the housing 10 has a cavity 12 defined by walls 14a,b, a base 16 and a lid 18. The walls 14 and base 16 can be a continuous structure such as a Dewar or a vacuum insulated panel. An additional layer of insulated material and a hard shell can surround the walls and base though for clarity these are not shown. The lid 18 preferably comprises an insulant such as a vacuum insulated panel or an expanded foam structure to minimise heat ingress into the cavity 12. The housing can be enclosed in a further layer of insulation around the walls 14 and base 16, for example a layer of vacuum insulated panels or a foamed insulation layer that additionally provides a degree of shock protection but for clarity these additional insulation elements are not shown. A surrounding hard shell can also be provided. In addition, a removable cartridge of phase transition material will be installed in the cavity 12 and located towards its base 22 but for clarity this is not shown in FIG. 1.

In FIG. 1, a sample 20 is provided towards the base 22 of the cavity that is at the lower end of the thermal diode. (As explained with reference to FIGS. 9A to 9C, at least one shallow vessel may be provided at the base of the cavity, to collect liquified gas which forms at the top of the cavity and drips down towards the base 22. The shallow vessel(s) may be considered to form a liquified gas reservoir). A heat exchanger 24, surrounded by an infra-red (IR) shield 26, is attached to a Stirling cryocooler 28 located on the lid 18. Alternative heat removal means such as a phase transition cryogen can be used in place of the Stirling cryocooler. The IR shield mitigates any heat radiation from the heat exchanger 24 into the cavity 12 thus further improving the thermal performance of the shipping container. In use the Stirling cryocooler is powered to remove heat from the cavity 12 from the cavity's uppermost portion 30 that is also the uppermost portion of the thermal diode. The shipper of FIG. 1 has a simple air blanket based thermal diode.

The thermal diode of the shipper of the invention works in two operational states. In the first, active, state wherein the Stirling cryocooler 28 is active heat is removed from the cavity 12 via the heat exchanger 24. As heat is removed from the cavity 12 a convection current is established whereby the cooled air from the uppermost portion of the cavity 30 descends to the base 22 of the cavity. This may prevent or minimise the evaporation of liquid nitrogen (or other working fluid) and recharge the system, as the liquid nitrogen drips from the heat exchanger 24 and into one of the shallow vessels (or liquid nitrogen reservoirs). An electromechanical control loop may stop the production of liquid nitrogen when the system reaches its full state, where the "full state" is a predetermined volume and may depend on the liquified gas type, the thermal mass(es) used and the required standby time. This full state may be a few millilitres if the build-up of liquified gas (e.g. oxygen) is undesirable. In this case, the nitrogen supply may be from a nitrogen source e.g. a lab supply, a nitrogen concentrator, or oxygen scavenging system which uses air from the external environment as a source of working fluid for the cryocooler. At the same time any relatively hot air from the base of the cavity will rise towards the top of the thermal diode, i.e. the top of the cavity. This continuous convection circuit allows constant heat extraction from the cavity and allows the lowermost portion of the cavity/thermal diode 22 to be brought to a temperature suitable for cryopreservation, for example a temperature of −150° C. or less.

Figure 2:
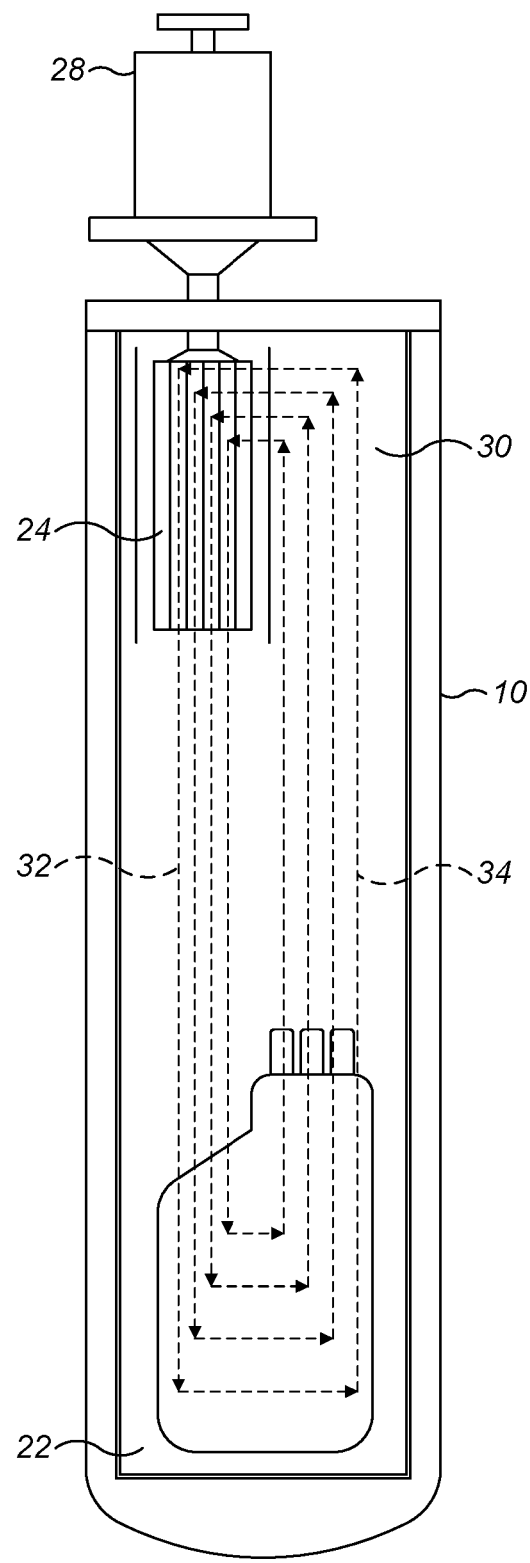
FIG. 2 shows the shipper of FIG. 1 with arrows to indicate the convection circuit established when the Stirling engine is powered and the thermal diode is in a first operational state.

The heat flow/convection circuit established when the thermal diode is in the first, powered operational state is shown schematically in FIG. 2 wherein operation of the Stirling cryocooler 28 causes heat to be removed from the air located in the uppermost portion of the cavity 30 via the heat exchanger 24. The cooled air descends to the base of the cavity 22 as indicated by arrows 32 while any relatively warm air will rise from the base of the cavity 22 to the uppermost portion of the cavity as indicated by arrows 34.

Figure 3:
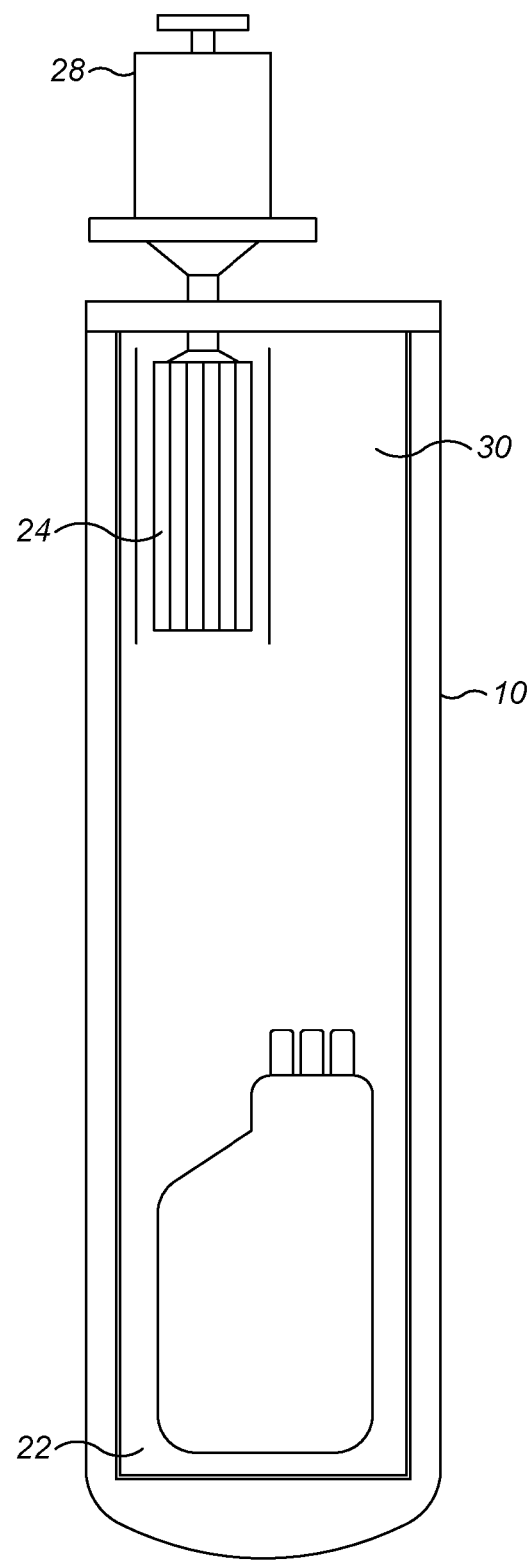
FIG. 3 shows the temperature gradient across the thermal diode in the shipper in a second operational state wherein the Stirling cryocooler is unpowered and a temperature gradient is maintained under gravity by the insulating air blanket in the cavity of the shipper.

In the second, passive, state a temperature gradient is maintained across the gravitational thermal diode that relies on the insulation properties of the housing 10 and the insulating properties of the air blanket in the cavity 10 (see FIG. 3). The lowermost portion 22 of the thermal diode is maintained at a temperature below that of the uppermost portion 30. The ratio of the cross-sectional area of the cavity to its height can be tailored to the desired operational performance. For example, a temperature difference of 220° C. can be obtained by using a height to cross sectional area ratio of 75 cm:230 cm$^2$ with a heat loss of less than 1 W. This may enable a minimal heat gain in the system, which may advantageously enable the system to maximise the amount of time for which the system is on standby, i.e. unpowered. This is particularly useful in case of a power failure, or when the system is being transported over long distances (e.g. by plane).

Figure 4A:
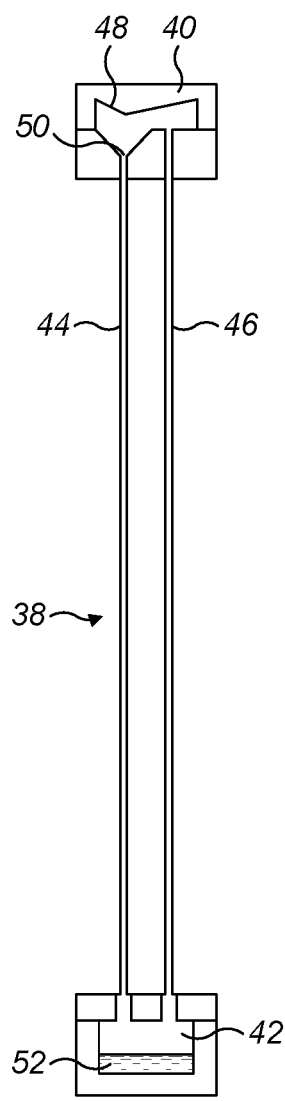
FIG. 4A shows a condensing thermal diode element of the closed loop or gravity thermosyphon type.
Figure 4B:
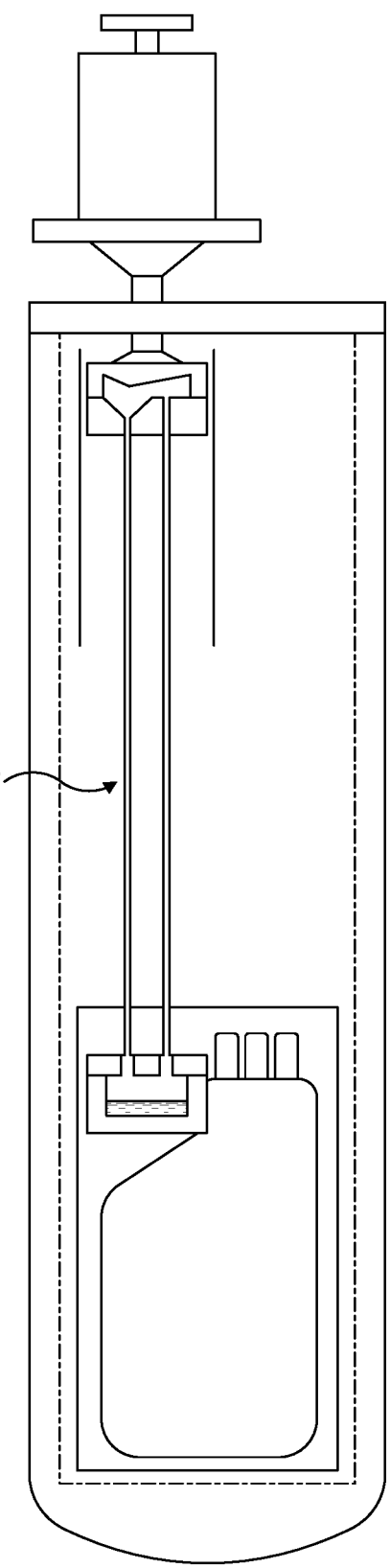
FIG. 4B shows a shipping container comprising the condensing thermal diode element of FIG. 4A.

FIG. 4A shows a condensing thermal diode element 38 of the closed loop or gravity thermosyphon type and FIG. 4B shows a shipping container according to the invention fitted with such an element. In FIG. 4A a top condensing chamber 40 is connected to a cold chamber 42, located at the base of the closed loop, by a down pipe 44 and an up pipe 46 to form a continuous circuit containing a working fluid such as nitrogen or argon.

The top condensing chamber 40 has a roof 48 formed with a with a lowest point vertically above a bowl 50 at the mouth of the down pipe 44 so that, in the operational state in which heat is actively being extracted from the top condensing chamber by a heat pump (not shown), any working fluid that condenses on the cooled roof drips down into the bowl 50 and then down to the cold chamber 42 via the down pipe 44 under the influence of gravity. A reservoir of cold, liquid, working fluid 52 is thus established in the cold chamber 42. The build-up of condensed working fluid in the cold chamber 42 drives any relatively warm working fluid to migrate to the top condensing chamber via up pipe 46. An active cooling circuit is thus established when heat is being extracted from the top condensing chamber by a heat pump.

In the second operational state in which no active cooling is provided to the top condensing chamber a temperature gradient between the top condensing chamber 40 and the cold chamber 42 is maintained under gravity as the coldest working fluid will reside at the vertically lowest point of the circuit and the warmest working fluid will rise to the top of the circuit 40.

In embodiments, it may be beneficial to operate the shipping container system at an elevated pressure, such that the boiling point of the liquid nitrogen or other cryogenic liquid in the system is increased. This may enable the system to run at a lower cost and may provide improved thermal efficiency, because of the lower temperature differential within the system, and therefore, improved thermodynamic efficiency. In such embodiments, the closed system is initially charged with liquid nitrogen (or other working fluid).

When the system has equilibrated, the cryocooler is sealed and liquid nitrogen regeneration by/within the cryocooler may be initiated. This means that any liquid nitrogen which evaporates in the system is re-liquified by the cryocooler, such that the initial supply of liquid nitrogen can be used and reused within the system. If any losses of liquid nitrogen occur from the system during prolonged operation, the nitrogen within the shipping container may be topped-up via an external supply. The shipping container system may comprise a sensor to monitor liquid nitrogen (or other working fluid) levels within the container.

In an example closed shipping container system, the evaporated/gaseous nitrogen in the container is collected, re-liquified, and then returned to the container for use in keeping samples at the required cool temperature. For a shipping container with, for example, a 100 litre liquid nitrogen capacity, the liquid nitrogen evaporation may be less than two litres per day (when the system is in continuous operation). This evaporated nitrogen could be re-liquified with a cryocooler (e.g. a Stirling cryocooler) having, for example, a 5 W to 20 W cooling capacity at 77K. Thus, the performance of the closed system may be enhanced/improved by using the cryocooler to reduce the temperature of the liquid nitrogen so that the amount of evaporation is reduced.

Thus, in embodiments, a cryocooler may be used to re-liquify liquid nitrogen in a closed system shipping container, to maintain the level of cryogen within the shipping container. The cryocooler may be a Stirling cryocooler, a Kleemenco cycle cryocooler, pulse tube cryocooler, "acoustic Stirling" cryocooler, Joule Thompson cryocooler or any other suitable means of refrigeration.

In the insulated shipping container, the liquid nitrogen may exist as free liquid or the liquid nitrogen may be adsorbed into an appropriate material. The shipping container may be vacuum insulated or insulated by any other suitable means.

In a closed shipping container system, when the nitrogen gas in a head space of the cavity of the shipping container attains a particular state (for example, a particular pressure) it is taken to the cryocooler, which is operating at a temperature below the saturation temperature at the pressure of the nitrogen gas (77K for liquefaction at 1 bar), to achieve liquefaction of the gas. The liquid is then returned to the cavity of the shipping container. The shipping container cavity has a pressure relief valve in case of failure of the cryocooler, interruption of power to the cryocooler, or failure of the insulation. When not being employed to liquefy nitrogen, the cryocooler may be used to reduce the temperature of the liquid nitrogen in the closed cavity, and thereby reduce evaporation. The cold head of the cryocooler may be applied directly to the liquid nitrogen within its insulated pressure vessel. Alternatively, a thermosiphon or any other appropriate system may be used to facilitate heat transfer between the liquid nitrogen and the cryocooler.

An advantage of recycling the liquid nitrogen within the shipping container is that the cost of operating the shipping container is reduced, as liquid nitrogen is expensive and may not be readily available everywhere. Another advantage is that the need to store and handle large volumes of liquid nitrogen is reduced, which reduces the amount of training and safety processes required to use the shipping container. Another advantage is that the liquid nitrogen that is recycled contains low levels of contaminants.

Figure 6:
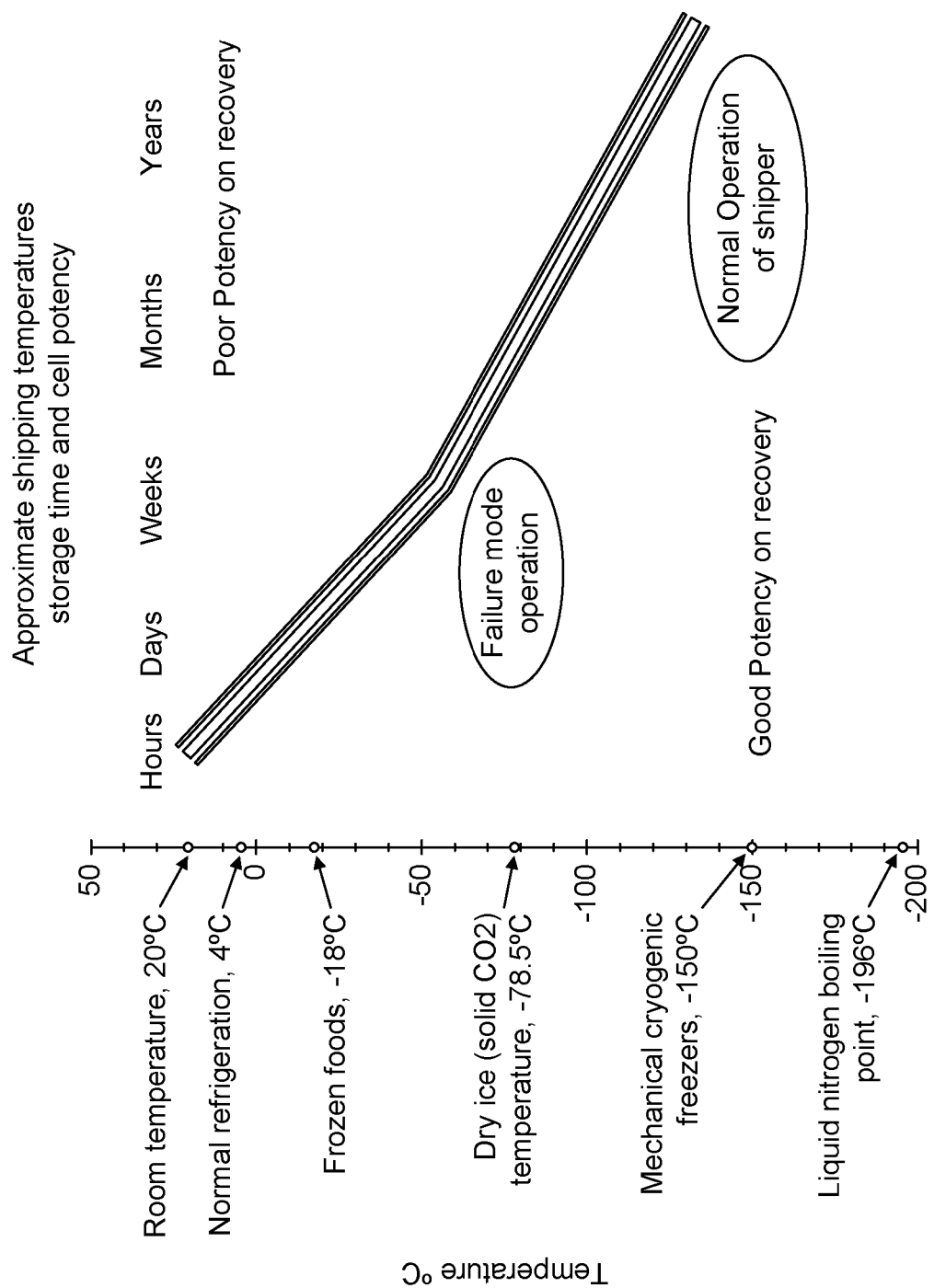
FIG. 6 shows typical cell potency at different temperatures and where the shipper is designed to operate in normal and failure mode operation.

FIG. 6 shows typical cell potency at different temperatures and where the shipper is designed to operate in normal and failure mode operation. It can thus be appreciated that even in failure mode operation the shippers according to the present invention are capable of maintaining cryopreserved samples at temperature at which the integrity of the sample is not compromised for a period of days or weeks.

In embodiments, the gravitational thermal diodes of the shipping containers may operate in two states. In a first operational state, heat may be actively extracted from the thermal diode through heat exchange from inside the cavity to the exterior of the shipping container. In this state, a cooling circuit is established with heat being removed from working fluid located at the vertically uppermost part of the cavity, the cooled working fluid then descends to the vertically lowermost portion of the cavity while any relatively warm working fluid rises to the vertically uppermost portion of the cavity. In this first operational state, the cavity is cooled to establish or maintain a temperature suitable for cryopreservation. The temperature at the vertically lowermost portion of the cavity can be brought to temperatures below the phase transition temperature of a phase transition material contained with a cartridge located therein. For example, a cartridge containing solid carbon dioxide may be placed at the base of the cavity along with a sample for cryopreservation and the vertically lowermost portion of the cavity can be cooled to temperature of −150° C. or below whilst the transition temperature of solid carbon dioxide to gas is −78.5° C. The cartridge of phase transition material can be inserted via an opening at the top of the cavity without disturbing the integrity of walls, floor or opening of the cavity. The replaceable cartridge may be fixably attached to the walls and/or floor of the cavity and can define a location, e.g. a slot, niche or well independently or in conjunction with the walls and floor of the insulated housing. The working fluid of the thermal diode may be contained in a closed loop or may be in the form of a simple air blanket. In order to operate the thermal diode in this first operational state a heat pump or an alternative cooling means such as liquid nitrogen is typically coupled to a heat exchanger located within the cavity defined by the insulated housing in use.

In a second operational state, the thermal diode operates to maintain the vertically lowermost portion of the cavity of the shipping container at a lower temperature than the vertically uppermost portion of the cavity. This relies on gravity maintaining a thermal gradient across the cavity wherein the coolest air and/or working fluid resides at the vertically lowermost portion of the cavity. Details of specific thermal diodes that may be used in embodiments of the shipping containers are provided herein.

In embodiments, the shipping containers may be capable of maintaining a sample at a temperature of −78.5° C. or less than −150° C. or below for a prolonged period of time, for example many weeks to many months with power applied. Without external power being applied, e.g. when no power is provided to a Stirling cryocooler or similar heat engine, temperatures in the container can be maintained from 2 hours to up to weeks. The thermal diodes may be capable of maintaining a temperature difference between the vertically lowermost point of the cavity and the vertically uppermost portion of the cavity of from 20° C. to 150° C., for example 80° C., 100° C. or 120° C. or more. The ratio of the cross sectional area of the cavity to its height can be tailored to the desired operational performance. For example, a temperature difference of 220° C. can be obtained by using a height to cross sectional area ratio of 75 cm to 230 cm$^2$ with a heat loss of less than 1 W. The diameter of the system is optimally wide enough for bags of cryopreserved therapy to be inserted (typically these bags are less than 160 mm wide) which is also wide enough to allow adequate convection within the cavity.

In embodiments, the shipping containers may have a maximum power loss of less than 10 W depending on cavity size and temperature difference from the top to the bottom of the cavity. In preferred embodiments, the power loss from the shipping container is less than 5 W and most preferably less than or equal to 3 W.

The insulated housing may have an opening at the top of the cavity through which a sample, for example a biological sample, for cryopreservation and a replaceable cartridge of phase transition material can be loaded. In use the shipping container may be fitted with a lid that covers the cavity in the housing. The lid serves to close the cavity to protect the contents of the cavity from contamination and provides insulation to the top of the container thus preventing or substantially reducing ingress of heat into the container into the cavity. The lid typically comprises an insulating element made from any suitable insulated material such as vacuum insulated panels as discussed herein, an insulating foam or the like. The lid can also comprise a hard shell material to protect the container from impact damage, the shell can be made from any convenient material such as a plastics material, a composite material, a metal or metal alloy with selection being made on the balance of weight and strength requirements.

The insulated housing may, for example, be a Dewar vessel, i.e. a vessel with a vacuum jacket with said vacuum providing for very low thermal conductivity and thus good insulating properties. The use of Dewar vessel does provide some design limitations as the need to balance pressure on the walls of a Dewar usually dictates that such vessels are substantially spherical or cylindrical in section (as otherwise much thicker wall sections will be required to withstand atmospheric pressure) and typically have an opening (through which e.g. a sample and a user replaceable phase transition cryogen cartridge can be introduced) that is often much narrower (of smaller cross section) than the internal cavity of the Dewar vessel and this restricts the size and shape of sample and the user replaceable cartridge of phase transition material. To modify the shape of a Dewar much thicker walls sections are required and such vessels are heavier, more difficult to construct and thermal performance of the Dewar may deteriorate. Nonetheless Dewar vessels generally have excellent insulation properties.

In some preferred examples, the insulated housing may be formed from vacuum insulated panels (VIPs), for example the vacuum insulated panels supplied by Kevothermal (www.kevothermal.eu) and related panels of this type such as Kingspan OPIM-R®. In general terms, the VIP features a microporous core that is evacuated and then encased and sealed in a thin gas tight envelope. Kevothermal VIPs are made from an amorphous silica based low thermal conductivity core, with added infra-red opacifiers, encased in a multi-layered metallised barrier film, giving thermal conductivity as low as 0.0036 W/m/K as measured according to ASTM C518, EN 12667 in the centre of panel. The insulating properties of the VIPs compares very favourably with insulants such as expanded polyurethane foam, expanded polystyrene and fibre glass insulation that have thermal conductivities in the region of 0.025 W/m/K, 0.034 W/m/K and 0.05 W/m/K respectively. A plurality of VIPs can be combined in a laminate structure to deliver sufficient insulation to the container.

Vacuum insulated panels are advantageously relatively inexpensive. VIPs can also be easily formed into any convenient shape as there is no need to balance pressure as is the case for Dewar vessels. Thus, the cross-section of the cavity can continue through to the opening of housing and may be shaped in any suitable shape for receiving a sample and a replaceable cartridge of phase transition material. For example, the cavity can be square or rectangular in cross section rendering insertion of sample and replaceable cooling cartridge facile. VIPs are also much more robust against damage that than Dewar vessels and, if damaged, the VIPs forming the walls of the housing can be replaced to repair the container.

It has also been found that the insulating properties of the insulated housings of shipping containers comprising vacuum insulated panels (VIPs) are superior to the insulating properties provided by many conventional Dewar vessels in certain temperature ranges, notably in the range of temperatures greater than −78° C. As a result, cooling of the sample containing cavity of a shipping container constructed from VIPs can advantageously be achieved with a Stirling cryocooler of lower capacity than that that would be required to cool a shipping container with a conventional Dewar of the same volume. This is advantageous in terms of cost of goods and, commonly, in terms of container weight as the lower capacity pumps are usually lighter than higher capacity pumps. Furthermore, cryocoolers operating down to −100 to −120° C. are considerably less expensive than those operating to −196° C.

This variation in thermal performance of conventional Dewars across the range from room temperature to −196° C. stems from the fact that conventional Dewar vessels for cryopreservation are principally designed to operate at liquid nitrogen temperature and are directly cooled to that temperature with liquid nitrogen. As a result, the insulating properties of the Dewar across the temperature range from liquid nitrogen temperatures to room temperature are less important design criteria than the ultimate insulation properties at liquid nitrogen temperatures (−196° C.). The interior of a Dewar vessel's vacuum jacket is partially coated with a getter material that, at low temperatures, serves to absorb any residual gas within the vacuum jacket thereby improving the vacuum and thereby reduce the thermal conductivity of the Dewar (i.e. improve the insulating properties of the vessel). This effect is known as the cryopumping effect. The inventors of the present invention identified that this cryopumping effect often only works efficiently at temperatures below the temperatures convenient for the shipping containing application wherein cooling is performed in situ by a heat pump. The result of the cryopumping effect in conventional Dewars only working at reduced pressures is that the effective thermal conductivity of the Dewar is higher than that of a vessel formed from VIPs at temperature greater than approximately −80° C. To avoid this problem with conventional Dewars, modified Dewar vessels with advantageous and better heat loss properties at higher temperatures that comprise new types of getters (e.g. charcoal) have been developed. As a result of using this new type of getter materials, Dewar vessels have been developed that function well across the targeted operation temperature range of the shipping containers.

At present VIPs are provided as flat panels and can be combined as laminates to form the walls and floor of the shipping container. While this construction provides excellent insulation properties the flat panel nature of the VIPs means that where the panels meet at an angle there is a potential path for heat ingress. To address this issue it is envisaged that a VIP can be formed as a box with an opening, or other suitable shape for use as an insulated housing in the shipping containers of the invention. Thus the invention provides a method for forming an insulated structure comprising the steps of forming a microporous core with a floor and at least one wall projecting upwards therefrom such that a cavity between the wall and floor is produced, evacuating said core under reduced pressure, and then sealably encasing the core in a thin gas tight envelope. The invention also relates to an insulated structure with a floor and at least one wall projecting upwards therefrom defining a cavity between the floor and the at least one wall comprising a continuous microporous core held under reduced pressure in a gas tight envelope. It is preferred that the gas tight envelope encasing the microporous core comprises a foil element to reduce radiative heat transfer thus further improving the insulating properties of the housing.

In some embodiments the shipper structure combines an insulated housing comprising Dewar vessel and a vacuum insulated panel. This particular structure is advantageous because a common failure mode for Dewars is failure through loss of vacuum in the Dewar vacuum jacket. If Dewar failure occurs in a conventional Dewar cryoshipper, the temperature within the Dewar vessel can rise rapidly since the thermal conductivity of the Dewar can increase by a factor of 10 or more and compromise the integrity of a cryopreserved sample contained within that Dewar vessel. It is thus advantageous to provide an additional, secondary, layer of insulation to the shipper outside the Dewar vessel that, in the instance where the Dewar vessel vacuum fails, provides sufficient insulation to maintain an acceptably low temperature to maintain sample integrity. A shipper structure in which the insulated housing comprises a Dewar vessel surrounded by VIPs that advantageously allows an adequate window of time for transfer of a cryopreserved sample to a replacement vessel/shipper should the Dewar vacuum fail is thus provided by the present invention.

It has been found that use of VIPs of a cross sectional thickness of circa 50 mm around a Dewar vessel is sufficient to keep power loss from the sample cavity of the shipper to less than 30 W at −78.5° C. (in the event that the vacuum in the Dewar vessel fails). The thickness of the VIPs providing the back-up insulation can be varied to meet the target thermal performance criteria and to satisfy any applicable weight requirements. In practical terms, this secondary insulation allows an alarm to be raised and an adequate window of opportunity to transfer the sample to an alternative shipper or static storage container that would not be available with a standard Dewar cryoshipper. With this dual Dewar/VIP insulated housing structure a cryopreserved sample at the base of the cavity of the shipping container can be maintained in the target operational range for up to approximately 2 days in the event that the Dewar vacuum fails.

The VIPs that surround the walls of the Dewar can be formed in a complementary shape to the outer walls of the Dewar vessel so that optimal thermal contact is maintained between the VIP and the Dewar. In some preferred embodiments the insulating layer outside the Dewar vessel can be formed from a plurality of VIPs. For example, in the case where the Dewar is of circular cross section about its vertical axis, two, three, four or more VIPs of complementary arcuate cross section can be provided so that the cross section of the entire circumference of the curved outer wall of the Dewar vessel is insulated by a complementary arcuate VIP. Alternatively, flat VIPs may be used to form a box in which the Dewar resides and any voids between the inner wall of the VIP and the outer wall of the Dewar may be filled with a further insulant, for example a foamed insulant that may also cushion the Dewar against external shock. Advantageously, the shipper can be constructed to allow repair by replacement of any failed Dewar unit or VIP element in the structure.

The insulated housing typically has an outer shell to protect the housing from impact damage. The cavity of the housing, or the shipping container as a whole, may be lined with a material that can be sterilised under standard conditions such as, but not limited to, steam sterilisation, chemical sterilisation, such as hydrogen peroxide vapour sterilisation, radiation sterilisation, and high temperature sterilisation e.g. and autoclave. Exemplary materials for the shell or the cavity lining may be selected from metals, metal alloys, ceramics, glasses, laminates for example glass or carbon fibre based laminates, resins or polymers. Strong, lightweight materials are particularly preferred as these minimise the total weight of the container.

The lid and/or housing may also comprise other functional components. The other functional components as described below may be provided for individually or in combination. For example, the lid and/or housing preferably comprises a heat exchanger that is provided with means for coupling to a heat pump such as a Stirling cryocooler (sometimes referred to herein as a Stirling engine) or a reservoir for receiving a cryogen such as liquid nitrogen so that heat can be extracted from the cavity to effect cooling of the cavity when the thermal diode is operated in its first operational state. In this case a Stirling cryocooler can be incorporated into the lid of the shipping container or attached to the insulated housing so long as it is in thermal contact with the heat exchanger. In cases where the heat exchanger is present it is preferred that the heat exchanger is surrounded by an infra-red (IR) shield to prevent heat radiating from the heat exchanger back into the cavity. The IR shield in this case can comprise a simple metallic foil.

An electrically powered means of driving heat extraction from the cavity of the shipping container is generally preferred as this reduces reliance on external sources of cryogens that are not readily available in all locations. It will thus be understood that in preferred embodiments described herein and above either the lid or housing may be equipped with a Stirling cryocooler configured to cool the cavity when the lid is located on the housing and when the Stirling cryocooler is powered.

The lid or body may also provide a display to indicate the temperature of, for example, the sample, a portion of the cavity or the cartridge, the fill level of the cartridge or other information relating to the status of the contents of the container, for example whether the sample has been maintained at the appropriate temperature since the sample was introduced. The status indications will be derived from readings obtained from sensors located within the cavity, in or on the sample, in or on the replaceable phase transition cartridge or in a combination of these locations. The lid and or housing may comprise a location sensor, for example a GPS sensor so that the location of the container may be tracked and verified remotely. Also as the thermal diodes of the present invention are gravitational thermal diodes it is important that the shipping container is maintained in an upright state and so the lid and/or housing may be equipped with a tilt sensor to ensure that the shipping container is maintained in an upright position. A sensor can also be provided to provide a report on the power required to maintain the temperature within the cavity at a constant temperature and this in turn can be used to determine whether the insulation is intact, for example whether a Dewar vessel has failed or not. A sensor may also report on the operational state of any heat engine, or the remaining power of any on board power source that might be present, for example to power a heat pump or a communication unit.

The housing may also be equipped with a locking means to engage with complementary locking means on the lid. For example, the shipping container may be provided with a manual or electronic lock. Opening of the lock and/or lid may trigger a report from sensor to a remote node or to a display on the shipping container to allow monitoring of sample status and the handling of a cryopreserved material in compliance with a protocol, such as a regulatory protocol for material to be used in a therapeutic or non-therapeutic intervention.

In some embodiments the lid and or housing will comprise communication means for reporting the status of the shipping container and its contents to a remote server or node. The information that is reported may for example be the fill status of the cartridge and/or the temperature of the container. The report may trigger dispatch of a replacement replaceable cartridge to replace that already installed in the shipping container to ensure continuity of cryopreservation. Sensor readings on the condition of the sample or container can likewise be reported to a remote node to ensure that any necessary user intervention is reported in a timely manner. The communication means can communicate with a remote server via standard protocols such as Wi-Fi, Bluetooth®, GSM or satellite messenger modules. The communication means can also be configured to receive information from a remote server, for example to allow the shipping container to be released to an end user when it is determined that the sample has been maintained under the appropriate conditions.

The housing or lid may also be provided with a connector adapted for introducing cryogen into a cartridge located in the cavity defined by the insulated housing wherein said connector is in use in sealable fluid connection with that cartridge. This configuration advantageously allows for introduction of phase transition cryogen without opening the shipping container thus avoiding risking introducing contamination into the container or triggering heat loss therefrom. In such configurations, the connector will be provided with venting means to avoid excessive build-up of pressure.

The thermal diode of embodiments of the present invention may be operable in a first state to provide cooling to the cavity and in a second state to impair heat transfer into the cavity. The thermal diodes of the shipping containers may be gravitational thermal diodes. A gravitational thermal diode requires that the diode is maintained in an upright position in order to maintain a temperature gradient between its vertically uppermost and lowermost extremities. As will be evident to those skilled in the art heat will rise from the lowest end of the diode to its upper end thus establishing a thermal gradient across the diode. Thus, the coldest zone of the thermal diode and by extension the cavity in the shipping container is located at the vertically lowest end of the thermal diode and the warmest zone of the thermal diode. For the avoidance of confusion, the discussion of the thermal diode herein and above refers to the elements of the thermal diode by their position when in use, thus reference to top and bottom elements, upper and lower element refer to the elements that are located at e.g. the top of the device when in use.

The inventors have discovered that in its simplest form the thermal diode can be a simple blanket/circulation of gaseous working fluid, for example air, located above the sample and the opening located at the top of the cavity provided that the ratio of the cross sectional area around the vertical axis of the cavity and the vertical height of the diode section is of an appropriate minimum value. The present inventors have found that the power loss associated with using an air blanket as a thermal diode can be 3 W or less, for example 1 W or less, without having an excessively or impractically high cavity that would prohibit manual loading of sample and cartridge or render transport and storage in conventional vehicles and rooms impossible. The air blanket thermal diode according to the invention thus operates in a passive state to minimise heat ingress into the cavity by exploiting the low thermal conductivity of air. It is necessary to maintain the air blanket thermal diode in an upright state as otherwise the equilibrated insulating blanket of air can be disturbed and this would lead to increased heat ingress into the cavity.

In order to receive a reasonable amount of sample a replaceable cartridge of phase transition cryogen the cross sectional area of the cavity is typically in the range of 150 $cm^2$ to 2000 $cm^2$. The ratio of the cross sectional area of the cavity in $cm^2$ to the height of the thermal diode in cm is typically greater than 1:2 and preferably 1:3 or more. For example, an insulated housing with a heat loss of 1 W of cross sectional area of 230 $cm^2$ and a height of 75 cm can maintain a temperature difference across the thermal diode of 220° C. Routine calculations can be used to determine the aspect ratio (height to cross sectional area) of a thermal diode based on the thermal power loss from the cavity and the target temperature differential across the thermal diode. For example, shipping containers designed to maintain a greater temperature differential will have a greater aspect ratio (i.e. the ratio height:cross sectional area).

The air blanket/circulation thermal diode, and indeed the other gravitational thermal diodes according to the invention can operate to positively cool the sample when cooling means are applied at the uppermost portion of the thermal diode. This advantageously allows the section of the shipping container to be cooled without changing the replaceable cartridge containing phase transition material. In addition, in the instance where the phase transition material contained with the replaceable cartridge is a material that undergoes a solid to liquid phase transition the cartridge can be regenerated by application of cooling means to the thermal diode. For cartridges containing other phase transition material, i.e. solid to gas or liquid to gas phase transition materials the application of cooling means to the thermal diode arrests the phase or substantially reduces the rate of the phase transition and substantial maintains the cooling capacity of the cartridge.

In some cases, the cooling means for the thermal diode comprises a Stirling cryocooler. Stirling cryocoolers are devices that convert mechanical energy into heat energy that can be conveniently driven under electrical power. To improve the efficiency of heat transfer from the cavity defined by the insulated housing the Stirling cryocooler is preferably attached to a heat sink. The heat sink provides a large interfacial surface area over which heat from the gas in the air blanket thermal diode can be extracted. The relative density of cooled air ensures that the cooled air sinks to the base of the blanket while less dense warmer air rises to the top of the blanket thus establishing a cyclical cooling current in the air blanket thermal diode when cooling means are applied to the diode. The heat sink is preferably located towards the uppermost section of the thermal diode, for example at the top of the cavity defined by the insulated walls of the housing. The heat sink can be attached to the insulated wall sections of the housing or to the lid of the container. The Stirling cryocooler itself can be located in the lid of the shipping container or can be engaged with the lid or the housing so that it is in thermal contact with the thermal diode, optionally via an intermediate heat exchanger that is integrated to the lid, the housing or the Stirling engine.

The cooling means provided to the thermal diode can also be phase transition cooling means. Thus a cryogen such as liquid nitrogen or solid carbon dioxide can be coupled to a heat exchanger to extract heat from the top of the thermal diode. The charge of cryogen used to operate the thermal diode can be conveniently provided in a user replaceable cartridge adapted for this purpose or from a liquefied gas or gas cylinder such as carbon dioxide which is then used to produce a solid or liquid medium as the refrigerant using the Joule-Thompson effect.

Any heat exchanger present can be provided with an infra-red reflective foil surround or shroud. This shroud can be a multilayer insulating foil and advantageously prevents radiation of heat into the cavity when cooling is not supplied to the thermal diode. The shroud has at least one aperture to allow air flow to and from the heat exchanger.

In some embodiments the thermal diode is a thermal diode of the closed circuit condenser/evaporator type, for example a thermal diode comprising a thermosiphon. A closed circuit condenser/evaporator thermal diode comprises a closed loop containing a working fluid. It is preferred that the working fluid in the loop is a gas that liquefies at a temperature between −100° C. and −200° C. Preferred working fluids are nitrogen and argon. It is preferred that the pressure of the working fluid is not greater than 200 bar at room temperature and a volume of 1 litre, thus avoiding significant complications with regulations for containment of pressurised vessels. The closed circuit typically has the form of two chambers in fluid communication, an upper chamber and a lower chamber, connected by a plurality, for example two, thin walled pipes. The pipes are thin walled pipes to minimise thermal conduction via the pipe walls from the top end of the thermal diode to the bottom end of the diode. The pipes are also of a relatively small wall cross section, this provides for a better temperature gradient across the thermal diode and improved circulation of working fluid within the circuit. The lower chamber in both operational states absorbs heat energy from the base of the cavity into the working fluid causing that working fluid to rise through the pipe into the upper chamber. Heat energy can then be transferred from the working fluid located in the upper chamber via a heat exchanger. Condensation of working fluid occurs in the upper chamber of the closed loop, for example on the cooled inner roof of the upper chamber.

In an advantageous arrangement for the closed circuit condenser/evaporator thermal diode, the roof of the upper chamber slopes downward to a lowest point to which condensate will gravitate and fall from in drips. In the floor of the chamber below this point in the roof is located a first pipe linking the upper and lower chambers, the entry to said first pipe is located at the lowest point of the floor of the upper chamber. A second pipe linking the upper chamber and the lower chamber terminates at a point in the floor of the upper chamber, the entry to the second pipe in the floor of the upper chamber is vertically above the entry to the first pipe. The condensation and dripping process favours rapid flow of condensate to the lower chamber through one tube preferentially. Such a system can have a vertical height of 0.2 m upwards although typically the systems have a height of circa 0.7 m. The circuit volume can be vary depending on the cooling power required but in the systems tested this was relatively small at approximately 50 ml. FIG. 4A shows this arrangement of thermal diode. In practice these systems are operated at raised pressure (typically less than the supercritical pressure of the fluid or 200 bar for safety reasons at room temperature) with nitrogen or argon gas with can produce a heat pipe with a difference in temperature of thermal gradients in the range of approximately 1° C. per Watt of cooling power delivered. Whilst argon is advantageous due to its higher boiling point (thus starting the gas to liquid heat exchange cycle at warmer temperatures) when running systems to low temperatures (less than −180° C.) which require high cooling powers greater than approximately 10 W then the argon can freeze and stop the liquid flow through the system thus causing the thermal diode to stop functioning. In these situations, due to its lower freezing point nitrogen is preferred.

The gravitational thermal diode of the closed circuit condenser/evaporator type (also referred to as a gravity thermosiphon type thermal diode) can operate in two states. In a first, actively cooled operational state, the heat is extracted from the upper chamber of the thermal diode by active cooling that is provided by cooling means, for example by a Stirling cryocooler in thermal contact with the upper chamber or through cooling with a phase transition cryogen thermally coupled to the upper chamber as described above for the air blanket thermal diode. The active cooling causes the working fluid to condense and the liquid, that has a higher density than gaseous working fluid descends to the lower chamber via a pipe in the closed circuit under the action of gravity. Heat absorbed by the lower chamber is conducted into the liquid working fluid causing evaporation of the working fluid. The heated gaseous working fluid then rises up into the upper chamber wherein it condenses under the action of the active cooling to complete the cooling circuit. In a second state a gravitational cooling cycle based on the rise and fall of the gaseous working fluid that is dictated by the relative density of the working fluid that increases as the temperature of the working fluid decreases.

The cavity of the shipping container according to the invention is adapted to receive a replaceable cartridge of cryogenic phase transition material. As used herein and above, a cryogenic phase transition material is a material that undergoes a phase transition at a temperature of −78° C. or below. In use and in some embodiments the shipping container comprises a replaceable cartridge for receiving a phase transition material or containing a phase transition material. The phase transition material to be received in the replaceable cartridge or contained therein is selected so that it undergoes a phase transition at a temperature that is sufficiently low for preservation of a cryopreserved sample for a prolonged period of time, typically this temperature is below the glass transition temperature of the sample, for example a temperature below −70° C. Preferred examples of phase transition materials are liquid to gas phase transition material such as liquid nitrogen which undergoes a liquid to gas phase transition at −196° C., solid to gas phase transition materials such as solid carbon dioxide which undergoes a solid to gas transition at −78° C. and solid to liquid phase transition materials such as solid ethanol that undergoes a solid to liquid phase transition at −114° C. Other solid to liquid phase transition material are well known in the art and include dimethyl sulfoxide (DMSO), salt (NaCl) and water mixtures, for example in the weight ratio of 62:5.56:38.44. In some cases, it is preferable to use a phase transition material that does not transition into a gas as this avoids the need to provide venting of the gas that is generated by the phase transition. It can also be advantageous to use a material solid to liquid phase transition material such as ethanol as the cooling capacity of the cartridge can be regenerated by cooling of the cartridge in situ, for example by operating the thermal diode comprised by the container with cooling means, for example cooling the thermal diode with a Stirling cryocooler or by direct introduction of a cryogen onto the cartridge surface to solidify any liquid phase transition material that has formed within the cartridge. If direct refreezing is to be performed it is preferable to remove the cartridge from the shipper to avoid/minimise contamination.

The invention also relates to the user replaceable cartridges that are adapted to fit within the shipping containers according to the invention. The invention also relates to shipping containers as described herein that are fitted with a replaceable cartridge as described herein and above. The replaceable cartridges or cartridges comprise a housing in which the solid or liquid phase transition material is received or contained. The phase transition material can be selected from any materials that undergo a phase transition at a temperature that is sufficiently low for the preservation of a cryopreserved sample for a prolonged period of time, typically this temperature is below the glass transition temperature of the sample, for example a temperature of −70° C. or below. Preferably the phase transition material is non-toxic and non-explosive thus avoiding any safety concerns under standard operating conditions. Preferred examples of phase transition materials are liquid to gas phase transition material such as liquid nitrogen which undergoes a liquid to gas phase transition at −196° C., solid to gas phase transition materials such as solid carbon dioxide which undergoes a solid to gas transition at −80° C. and solid to liquid phase transition materials such as solid ethanol that undergoes a solid to liquid phase transition at −114° C. In some cases, it is preferable to use a phase transition material that does not transition into a gas as this avoids the need to provide venting of the gas that is generated by the phase transition. Reference to replace cartridges herein refer to the cartridge in its filled or empty state, i.e. to a cartridge containing cryogenic phase transition material or empty cartridges that can be charged with a cryogenic phase transition material.

Replaceable cartridges that are adapted to contain a phase transition material that undergoes a liquid to gas phase transition contain a vent to allow escape of gas generated during the phase transition, thus avoid the risk of excessive pressure generation. Replaceable cartridges that are adapted to contain a phase transition material that undergoes a liquid to gas phase transition may contain molecular sieves to absorb the cryogenic phase transition material, this advantageously avoids the risk of liquid cryogen escape should the cartridge be punctured or opened in any way.

The replaceable cartridges can be disposable, i.e. single use cartridges, or can be recyclable, i.e. multiple use cartridges. The replaceable cartridges can be provided in a sterilised form to ensure compatibility with use in operating theatres and other sensitive environments. The replaceable cartridges can be provided in a cooled form, optionally in an aseptic package. In the case wherein the replaceable cartridge is provided in an aseptic package the aseptic package is preferably provided with venting means to avoid excessive pressure generation within the aseptic package.

The replaceable cartridge for receiving a phase transition material or containing a phase transition material can comprise a charging port allowing loading of the cartridge with phase transition cryogen material such as solid $CO_2$ or liquid nitrogen. In some instances, the charging port can be provided with a tamper proof seal. In some instances, the charging port is sealed irreversibly after charging.

In one advantageous arrangement, the charging port can sealably engage with a conduit provided in the housing for recharging of the cartridge with cryogen, in which case the sealable engagement between conduit and cartridge avoids escape of the cryogen into the cavity. In the arrangement where the load of phase transition cryogen in the cartridge can be recharged through a conduit in the housing, the conduit, i.e. the recharging conduit, is sealable to avoid unwanted escape of cryogen during transit. Recharging of the cartridge in this arrangement can be effected by engaging an external source of cryogen to a fitting, for example a push fit fitting, on the housing at the end of the conduit distal to the cartridge. Once the external cryogen source is engaged control means located in the shipping container or in the cryogen source can communicate with a fill sensor or temperature sensor in the cartridge allowing automatic recharging of the cartridge to the appropriate level. An exemplary external cryogen source would be a Dewar with a control valve at its entry and a dip tube for immersion into liquid cryogen at a first end and engagement with the recharging conduit of the shipping container at its other end. In operation the control means can operate the control valve to deliver the liquid nitrogen into the cartridge until a fill state sensor in the cartridge indicates the cartridge is full.

The replaceable cartridge can be made from any suitable material, for example materials that can withstand the temperature at which the phase transition of the cryogenic phase transition material undergoes phase transitions. Exemplary materials from which the cartridge can be formed include plastics materials, for example polymer derived plastics materials, ceramics and metals, including metal alloys.

It is preferable that the cartridge is provided with means for releasable engagement within the cavity of the shipping container, for example mechanical attachment means, for example a catch, lock or slider arrangement that interact with a complementary element in, on or close to the cartridge receptacle in the cavity. The attachment means can also form an electric contact between the cartridge and the container. Means for establishing electrical contact between the cartridge and the shipping container can be separate to any attachment means that may be present. The electrical contact can for example be used to confirm the presence of the cartridge in the shipping container or to relay information on the temperature or fill status of the cartridge from a sensor within, on or adjacent to the cartridge.

In some preferred cases the replaceable cartridge for receiving a phase transition materials or containing a phase transition material may be provided with one or more sensors configured to monitor the temperature and/or fill state of the replaceable cartridge. In some examples, a plurality of thermocouples may be provided to allow the temperature at different locations within the cartridge to be established. The provision of sensors to provide information on the temperature or fill status of the cartridge advantageous allows for user, local and/or remote monitoring of the temperature and/or fill state of the cartridge without opening the shipping container. These sensors can be located in, on or adjacent to the cartridge when it is located in the shipping container. Information on the temperature or fill state of the cartridge may also be relayed through a communication means, for example a wired or wireless network, to trigger a further action. The fill state or temperature may for example be indicated on a display on the container or may be indicated on a remote device. Actions that are triggered by the report on fill state or temperature may be the provision of a prompt, for example by e-mail or text message, to replace or recharge the replaceable cartridge.

Thus, in the instance wherein the container comprises a Stirling cryocooler the report may be to report the need to activate the Stirling cryocooler, to connect the container to external power or, if the container is connected to a power source power, to activate Stirling cryocooler automatically. In one example the information on the fill state or temperature of the cartridge may trigger despatch, for example by courier or other delivery means, of a replacement cartridge to the location in which the container is stored. In a further example the information could prompt the user to refill the cartridge with cryogen and could automatically despatch a refill vessel containing a cryogen for this purpose. In a further example the information provided by the sensor can indicate that the cryopreserved sample has been maintained under the set of conditions required to maintained sample integrity during the shipping and storage process, for example the tilt state, temperature history or the like.

The information on the fill state or temperature of the cartridge may be sent in a continuous or periodic manner, the temperature status of the vessel over time can be monitored over time thus ensuring that the integrity of the sample within the container is not compromised. This can advantageously ensure that the sample storage history is logged and is verifiably in accordance with storage protocols, for example those set down to ensure that the sample is fit for use, for example that the sample is fit for clinical use.

The user replaceable cartridge may be provided with a handle to facilitate handling of the cartridge. In some preferred examples when the replaceable phase transition material containing or receiving cartridge is located in the shipping container the cartridge handle has a portion that is located at or towards the vertically uppermost portion of the thermal diode. This ensures that the cartridge can be withdrawn and replaced without exposing the user to extremely low temperatures. To ensure that any such handle does not cause excessive heat transfer to the cartridge the handle should ideally be formed in narrow cross section to minimise conduction to the phase transition material cryogen.

To provide for optimal performance in situations where the shipping container is off-grid, i.e. where it is removed from external power sources, the shipping containers according to the invention may be provided with an on-board power source, for example a battery such as a rechargeable lithium ion, lithium polymer, nickel cadmium battery or any other suitable conventional battery, suitable for driving the thermal diode in the operational state wherein a heat pump, e.g. a Stirling cryocooler, operates to provide active cooling to the cavity of the shipping container. The on-board power source will be selected as appropriate to the intended application. For example, for units that are intended for transit of samples between vehicles with an on-board power source the unit it may only be necessary to power a heat pump such as a Stirling cryocooler for up to and including one hour or two hours. In other cases, for example where the shipper is to be used in air freight it may be desirable to incorporate an on-board power source that provides at least 24 hours autonomy to the shipper.

In addition to the on-board power source intended to drive the thermal diode in the active state, in preferred embodiments the shipping container is provided with an on-board power source to provide for operation of communications means that report on the status of the sample or the conditions within the insulated housing of the shipping container to a remote node. In some embodiments, the power source provided for the communication means can be the same as that provided for driving the heat pump. In some embodiments, the power source provided for the communication means is separate to any power source provided for driving the heat pump. It is preferred that a reserve of power for powering the communication means is provided so that if user intervention is required to ensure sample integrity is maintained an alert can be sent from the container.

Practical considerations dictate that in use any sensor in the replaceable cartridge, i.e. when installed in the shipping container, is in electrical communication with an electrical control element. Furthermore, effective electronic function in the control element requires that the operational temperature of the electrical control element is at a temperature above for example −140° C. since at low temperatures standard electronics will no longer function electrically, for example because there is a transition in the properties of otherwise semi-conductor materials into electrical insulators at this point. When the cartridge contains one or more sensors, the electronic control element that is in electrical communication with the sensor, for example a thermocouple, is therefore positioned towards the vertically uppermost portion of the thermal diode or outside the cavity and may, for example by integrated into or attached to the side or top wall of the insulated housing or integrated to the handle element of the replaceable cartridge. It can therefore be understood that the control electronics, if present, are positioned in a region of the container that is warm relative to the area in which the sample and cryogen reside.

The shipping containers according to the invention may also comprise means for performing a controlled rate freezing operation as described in more detail below. As the person skilled in the art will be aware there are a number of stresses that can be encountered during the cryopreservation process and these can be mitigated by controlling the rate freezing. This is of particular interest as the shipping containers are of a suitable size to be used in an operating theatre environment and could be used in such a context to cryopreserve samples, for example tissue samples.

There are a number of options for controlled rate freezing. In a first example the temperature gradient inside the cavity of the shipping container may be exploited to perform the controlled rate freezing. In more detail the temperature difference between the top of the cavity and the bottom of the cavity is typically of the order of 100° C. A sample for cryopreservation may be introduced into the top of the cavity and then lowered into the cavity, for example on a platform, lift or by a winch arrangement. The rate of descent can be controlled by feedback from a sensor, for example a thermocouple in, on or adjacent to the sample or sample holder. The rate of descent of the sample and thus its freezing rate can thus be performed according to a cooling algorithm to deliver a cryopreserved sample ready for despatch in its shipping container. This approach is advantageously efficient in terms of phase transition cryogen use as heat ingress into the system is minimised. In some cases the cavity of the shipping container can be sealed with a lid once the sample is inserted and active cooling to the cavity can be provided with a Stirling engine. Power supply to the Stirling cryocooler can be controlled by feedback from a sensor(s) located in the cavity or on the sample to match heat extraction from the cavity/cooling thereof to a predetermined cooling algorithm as appropriate to the nature of the sample and any medium in which it may be contained. These procedures can be performed in reverse order, for example to conform with a predetermined warming algorithm, to allow a controlled thawing of the sample as a function of the ascent of a sample from the base of the container or to the power delivered to a Stirling cryocooler driving the thermal diode. The practical means for performing controlled cryopreservation and thawing will be evident to those skilled in the art.

In a further example of how controlled rate freezing may be performed with shipping container according to the invention the sample can be immersed directly to the base of the cavity of the shipping container. In this case the sample holder or platform is equipped with a temperature sensor in, on or adjacent to the sample and a heating element. The temperature from the sensor is monitored and used to control the heating. As with the previous example this configuration can be used in reverse to allow a controlled rate thawing procedure, albeit in this instance this will involve depletion of the phase transition cryogen.

In a yet further example of how controlled rate freezing may be performed with a shipping container according to the invention a bed of cooling beads can be provided at the base of the cavity. The sample can be introduced directly into the bed of cooling beads. The rate of cooling of the sample is controlled by the thermal contact between the sample and the cooling beads. The contact surface between the sample and the cooling beads is in turn dictated by the size of the beads and this can be selected to deliver the desired rate of cooling.

The shipping containers as described herein that are adapted for controlled rate freezing can thus be used to generate cryopreserved samples. For example, a tissue sample can be harvested and placed into a bag containing a suitable cryopreservation medium that is sealed and then introduced into the shipper unit for cryopreservation according to an automatic protocol as described above.

The shipping containers described herein and above provide a number of advantages over those containers presently in use. The combination of a thermal diode arrangement and a replaceable cartridge of cryogenic phase transition material allows for shipping and medium term storage of cryopreserved samples in locations such as hospital and clinics where cryogenic coolants are not routinely available. The shipping container can serve as a storage container for a period of months when it arrives at its destination. This long term cryopreservation can be achieved in a number of modes. For example, mains electricity can be used to drive a Stirling pump integrated or attached at destination or in transit to the thermal diode. Replacement of cooling cartridges can also be used for long term storage, the despatch of cartridges to the container location at its destination or in transit can be triggered by a report from the sensor in the container or the existing cartridge installed therein. Similarly, recharges of cryogenic phase transition material to be used to recharge the cryogenic phase transition material in the cartridge or to drive the thermal diode in off grid locations, with despatch of cryogenic recharges to destination being operable in an automatic manner based on report from the container to base thus prompting despatch of the appropriate recharge. In addition to this on-board power sources for powering a heat pump can be provided in the container and these can be rechargeable or replaceable to ensure continuous operation of the heat pump (e.g. Stirling cryocooler) when the shipping container is in an off-grid location. Thus, as well as plugging in to a mains supply to maintain cooling, a battery source, e.g. a rechargeable battery source, can be used to maintain active cooling while the shipping container is in transit.

The use of VIPs to form the insulated housing of the shipping container rather than Dewars can be advantageous in certain circumstances. The inventors of the present invention have discovered that temperatures of around −120° C.

are effective for cryopreservation of cryogenically preserved samples for a period of months. Furthermore, for the reasons described above, namely that VIPs delivery a better thermal insulation of relative to standard Dewars in the temperature range of −60 to −100° C. cooling of the container by driving the thermal diode with a Stirling cryocooler is more efficient with a VIP housing. This is economically advantageous as a lower capacity Stirling cryocooler can be used to drive the Stirling engine. A combination of a Dewar vessel and VIPs advantageously allows for a container with sufficient insulation properties should the Dewar fail to maintain a cryopreserved sample in the viable temperature range for user intervention and is of an acceptable weight for shipping.

The shipping containers of the present invention can also be used to cryopreserve biological samples via controlled freezing protocols as described above. The physical size of the container means that this controlled freezing can be performed in an operating theatre thus minimising the time at which samples are kept, and can degrade, at ambient temperatures. The containers are also compatible with samples cryopreserved prior to introduction into the container. The need for containers as described herein is increasing as a function of the developments in tissue regeneration/regenerative medicine, in cell based therapies as CAR T therapy and other therapies based on genetically modified tissues or cells.

Figure 5:
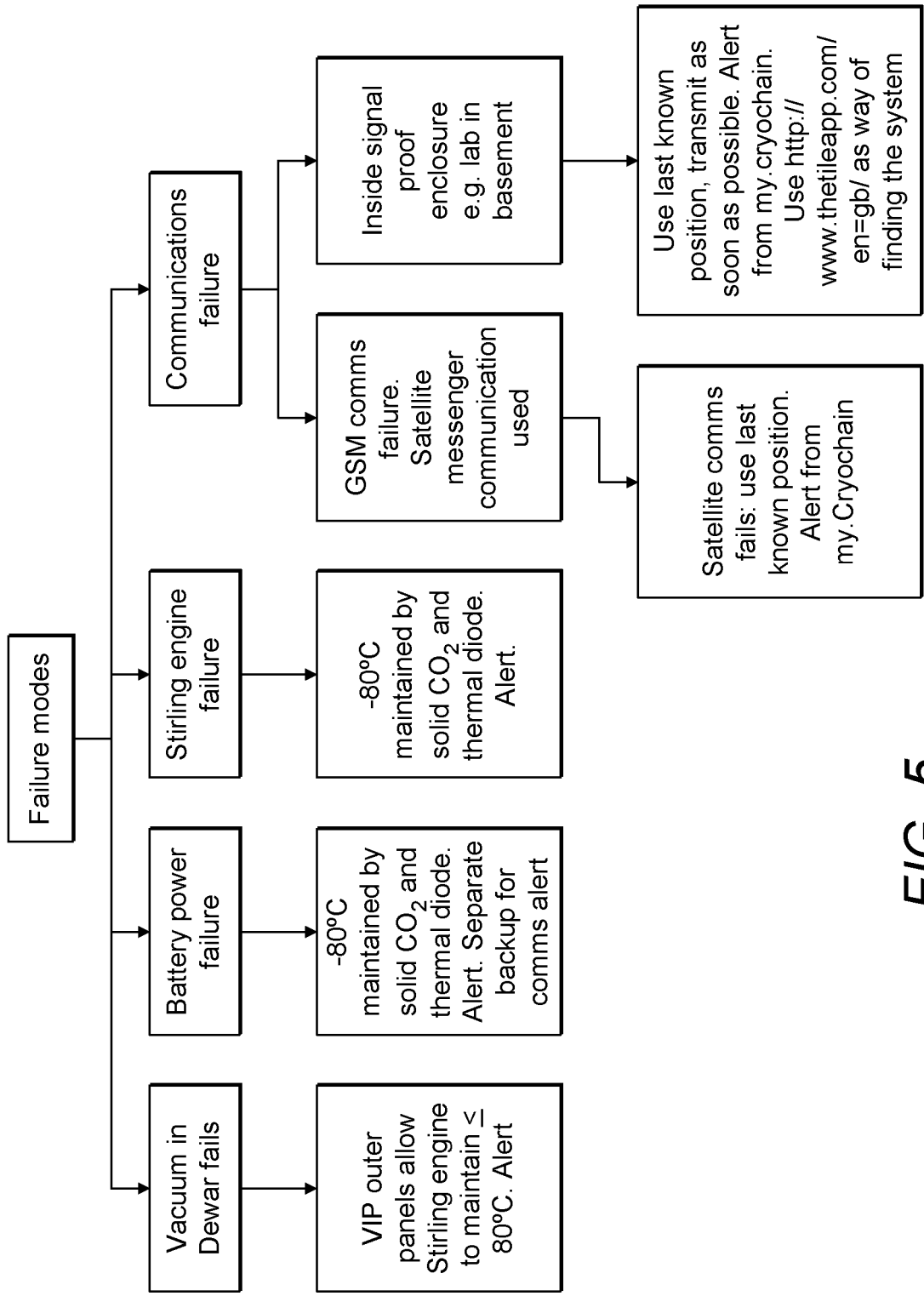
FIG. 5 is a schematic showing the failure modes are associated with cryogenic shipping containers and how containers may be adapted to deal with such failures.

There are a number of ways in which cryogenic shipping containers of the art and according to the invention could potentially fail as is shown in FIG. 5. For example, Dewar vessels are subject to cracking and loss of vacuum that results in a rapid deterioration of the insulating properties of the Dewar vessel and a correspondingly small time window in which a user can intervene to ensure that the integrity of a cryopreserved vessel is not lost. The present inventors have developed new container structures that combine a Dewar vessel with a jacket of vacuum insulated panels to provide an extended window for user intervention should such a failure occur and this, combined with the remote reporting functionality of shipping containers according to the invention provides for a more robust system for dealing with potential Dewar failure. In cases where the Stirling pump operates via an on-board power source the provision of an internal cartridge of phase transition cryogen material provides an extended window of opportunity to maintain the integrity of a cryopreserved sample should the internal power source fail. Likewise, in cases where the Stirling pump fails the provision of an internal cartridge of phase transition cryogen material provides an extended window of opportunity to maintain the integrity of a cryopreserved sample. In each of these cases the failure will trigger an alert to be sent to the remote server/node that can be relayed to the end user so that the end user can intervene to ensure that the cryopreserved material is saved. The alert can trigger despatch of the appropriate remedial means, for example despatch of a fresh shipping container or cryogen or both simultaneously or sequentially.

In the instance where a communication unit failure occurs, the shipping container can be provided with a backup, secondary, communication means to ensure traceability and sample integrity. This can involve an autonomous GSM or satellite communication unit that reports on location so that the last known position of the shipping container is stored remotely.

Condensed Gas as Working Fluid

In embodiments of the present techniques, a gas (such as air, oxygen, nitrogen, etc.) may be used as a working fluid within the shipping container. As mentioned above, the working fluid is a means to provide a temperature gradient within the shipping container—the top of the shipping container (which, in use, is where a cooling mechanism is provided) contains the warmest working fluid (which is to be cooled down), and the bottom of the shipping container (which, in use, is where a cryopreserved sample is located) contains the coolest working fluid. The build-up of condensed working fluid at, or near to, the bottom of the shipping container causes any relatively warm working fluid to flow up towards the top of the shipping container. During the above-described second operational state of the shipping container, active cooling is applied to enable heat to be extracted from the warm working fluid at the top of the shipping container, and the cooled working fluid flows down towards the bottom of the shipping container.

The working fluid may be, or comprise, nitrogen gas, argon gas, air (e.g. from the environment in which the shipping container is provided), oxygen gas, or a liquified gas (e.g. liquified air). Liquid air is air that has been cooled to very low temperatures such that it has condensed and become a liquid. Air (and liquid air) typically comprises nitrogen, oxygen, argon and other inert gases. Liquid air can absorb heat rapidly and revert to its gaseous states. Thus, within the shipping container, the cool liquid air sinks towards the bottom of the shipping container, where it may assist in keeping a cryopreserved sample cold. The cool liquid air at the bottom of the shipping container may absorb heat, which may cause the warmed liquid air to rise towards the top of the shipping container and potentially revert to a gas state.

Using air, or liquified air, as the working fluid may be advantageous because a separate, dedicated supply of working fluid does not need to be provided to the shipping container (e.g. a canister of liquid nitrogen). Instead, air from the environment surrounding the shipping container may be input into the shipping container and cooled (condensed) to a cryogenic temperature. This may simplify the shipping container design, and/or may lower operation costs.

Figure 7:
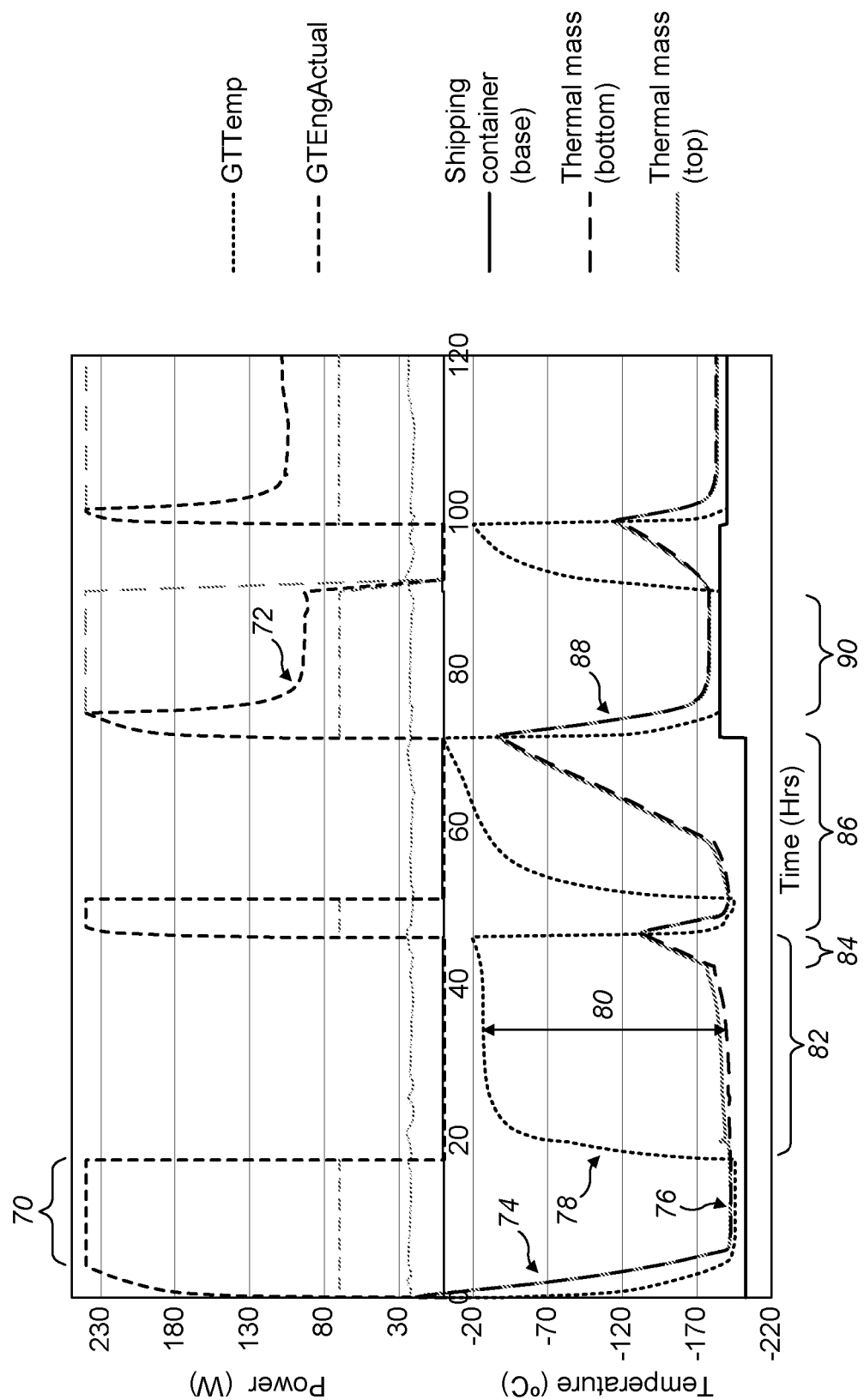
FIG. 7 shows a graph of temperature change over time in a shipping container during cooling and warming, and a graph of cryocooler engine power over time during cooling and warming.

FIG. 7 shows a graph of temperature change over time in a shipping container during cooling and warming (bottom), and a graph of cryocooler engine power over time during cooling and warming (top). The graphs relate to tests performed on a shipping container to determine how the shipping container operates using condensed air and liquified air as a working fluid. The tests were performed using a cryocooler (e.g. a Stirling cryocooler) to cool air input into the shipping container. A thermal mass was placed at the bottom of the shipping container around a cryopreserved sample in a sample bag. The thermal mass was 0.54 kg and formed of aluminium. For the purposes of the tests, at least, a temperature sensor is provided at two points on the thermal mass—one at the bottom of the thermal mass (closest to the base of the shipping container), and one at the top of the thermal mass (further away from the base of the shipping container)—to enable the temperature to be measured across the thermal mass, and across a height/length of the cryopreserved sample that is surrounded by the thermal mass. (Thermal masses are described in more detail below with respect to FIG. 11).

When the cryocooler is turned-on and begins performing the function of cooling down the air that is input into the shipping container, the power consumed by the cryocooler rapidly increases, as shown in FIG. 7. The power consumed by the cryocooler is constant for a period 70, during which time the cryocooler is working to cool down/condense the input air. Thus, as indicated by arrow 74, the temperature of the cryocooler, as well as the thermal mass (top and bottom)

and temperature of the shipping container decreases rapidly. During the period 70 when the power consumption of the cryocooler is constant, air condensation takes place—thus, as indicated by arrow 76, the temperature of the cryocooler, thermal mass and shipping container also becomes constant. The temperature reached at this stage is between −170° C. and −220° C., i.e. a temperature required to keep a cryopreserved sample cool. As shown in FIG. 7, there is a small difference in the temperature of the cryocooler and the temperature of the thermal mass and shipping container.

Once the temperature required to keep a cryopreserved sample cool has been reached by condensing the air to liquid air, the cryocooler is switched-off and no power is consumed by the cryocooler, as shown in FIG. 7. The reduction in power is almost instantaneous. However, the cryocooler temperature does not increase instantaneously—arrow 78 shows that the temperature of the cryocooler increases at a slightly slower rate relative to the power consumption. The cryocooler itself is located at the top of the shipping container, i.e. at the opposite end of the shipping container relative to the cryopreserved sample. Thus, the temperature of the cryocooler may increase relatively quickly compared to the temperature of thermal mass and the bottom of the shipping container. This is because any warmer air/warmer liquid air rises towards the top of the cryocooler and acts as an insulative layer that prevents the heat of the shipping container from transferring to the bottom of the shipping container. Any warmer air/liquid air around the top of the cryocooler functions as thermal insulation that keeps the cooler air/liquid air at the bottom of the shipping container. Thus, the duration 82 for which the liquid air remains cool and at the required temperature is much longer (~20 hours) than the duration for which the cryocooler remains cold.

Liquid air evaporation begins during duration 82, but takes place quite slowly until enough liquid air has evaporated from the bottom of the shipping container that the thermal mass has started to warm-up. Duration 84 shows how the temperature of the thermal mass and bottom of the shipping container increases rapidly (by about 50° C. in a few hours). At this point, the cryocooler is switched-on again and begins consuming power (as shown in FIG. 7), and as the temperature of the cryocooler decreases, the temperature of the thermal mass and bottom of shipping container also decreases, as shown in FIG. 7. As the temperature of the thermal mass and shipping container has not increased to the original starting temperature, the cryocooler does not need to operate for as long to decrease the temperature, and therefore, does not consume power for as long as time as in the original condensation period 70. However, as the cryocooler is powered-off fairly quickly and the active cooling stage is shorter this time around, the thermal mass and shipping container begin heating-up quicker too, as shown by duration 86 in FIG. 7. In the test, it was determined how quickly the thermal mass and shipping container warm-up when active cooling is not applied—duration 86 shows that the temperature of both increases by ~150° C. in around 15-20 hours when the cryocooler is not powered-on and active cooling is not taking place. Arrow 88 shows the rate of temperature decrease when the cryocooler is restarted and active cooling begins again. This time, it takes a longer time for the thermal mass and bottom of the shipping container to cool down compared to the start (arrow 74). As shown at point 88, there is also a larger temperature difference between the temperature of the cryocooler and the temperature of the thermal mass. This is because liquid air has not been produced by the cryocooler during this active cooling period, i.e. condensation is not taking place. As shown by arrow 72, less power is consumed by the cryocooler because no condensation is taking place.

FIG. 7 shows an advantage of providing a thermal mass around a cryopreserved sample in a shipping container. The temperature data recorded at the top of the thermal mass and the bottom of the thermal mass are very similar throughout the test period shown in the graph. Thus, the temperature across the cryopreserved sample will likely be the same. This reduces the risk that, for example, the portion of the cryopreserved sample that is closer to the cryocooler/top of the shipping container warms-up at a different rate to the portion of the cryopreserved sample that is furthest away from the top of the shipping container. If different portions of a cryopreserved sample are exposed to different temperatures, the viability of the sample as a whole may be adversely affected.

FIG. 7 shows that air (and liquified air) is an effective working fluid, and that the shipping container is capable of maintaining a cryopreserved sample at a required temperature for a prolonged period of time without applying power to the cryocooler. However, techniques to maintain the required temperature when power is not applied to the cryocooler are also desirable—these are described in more detail below. Furthermore, problems may occur when the liquid air begins to warm-up and evaporate. The boiling point of liquid air is between the boiling points of liquid nitrogen and liquid oxygen. As a result, as the liquid air boils and evaporates (caused by absorbing heat at, or near to, the bottom of the shipping container), the nitrogen component evaporates more rapidly than the oxygen component of the liquid air. This may result in a liquid air mixture that contains up to approximately 50% concentration of oxygen. Liquid oxygen contains 4000 times more oxygen by volume than normal air, and materials that are usually considered non-combustible (such as carbon, stainless steel, aluminium in powdered form, etc.) may burn in the presence of liquid oxygen. Many organic materials may react explosively with liquid oxygen. Accordingly, it is desirable to reduce, minimise or eliminate the build-up of liquid oxygen within the shipping container.

Thus, in embodiments, there is provided a shipping container for cryopreserved biological samples, the shipping container comprising: an insulated housing comprising a cavity for containing a cryopreserved biological sample; and a thermal diode operable in a first state to provide cooling to the cavity and in a second state to impair heat transfer into the cavity, the thermal diode comprising a gas.

Figure 8:
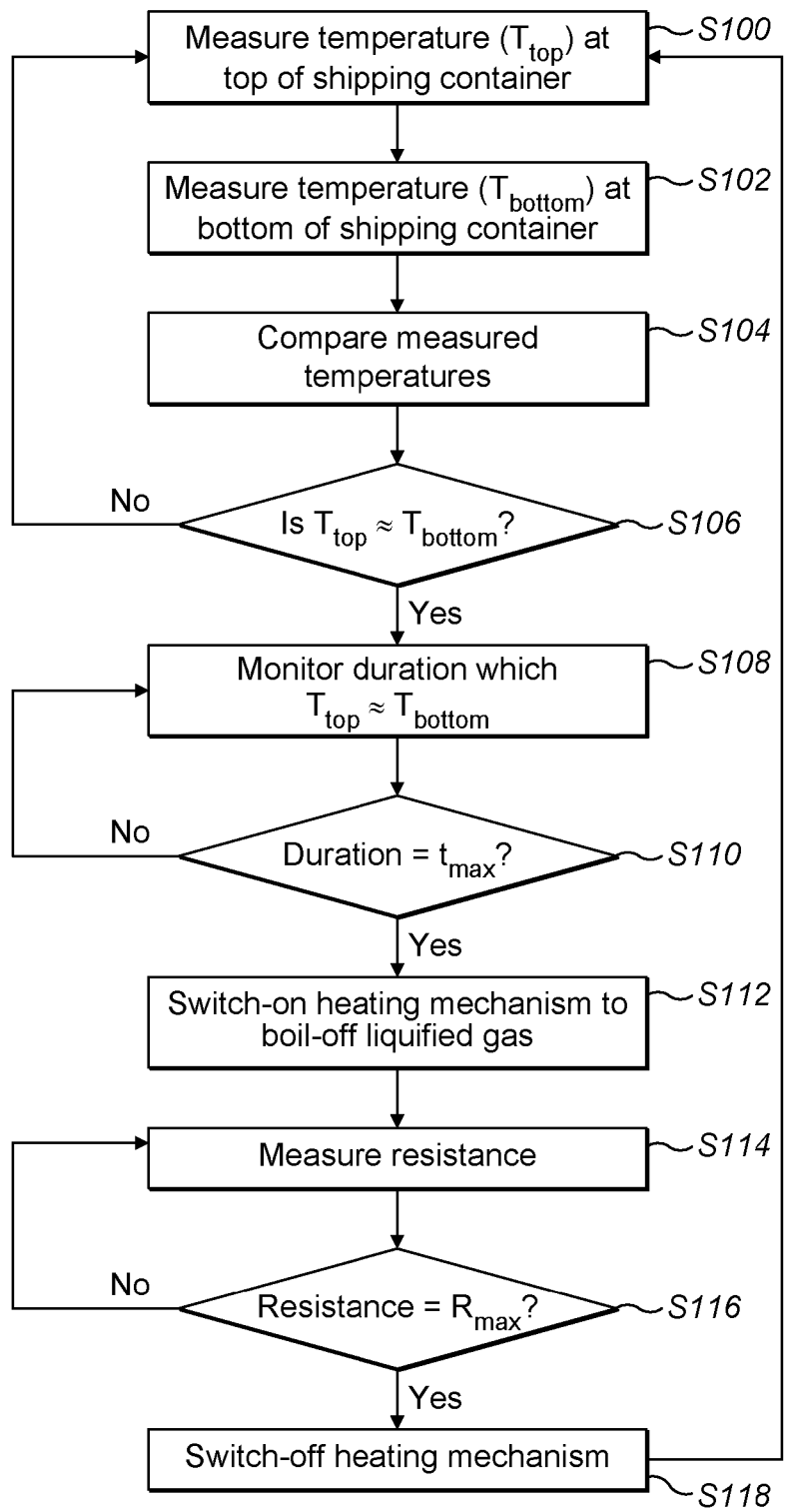
FIG. 8 shows example steps performed by a system to reduce build-up of liquified gas within a shipping container.

FIG. 8 shows example steps performed by a system (e.g. a control system) to reduce build-up of liquid gas within a shipping container. The control system may be a dedicated control system specifically for reducing liquid oxygen build-up, or may be part of a larger control system of the shipping container. (The control system may be part of a portable housing for the shipping container, such as the portable housing described below in relation to FIG. 14A). The control system may comprise at least two temperature sensors, one located at, or near to, the top of the shipping container, and one located at, or near to, the bottom of the shipping container. The temperature sensors may be located on an inner surface of the shipping container, and/or may be attached to components within the shipping container, e.g. on the cryocooler, on the thermal mass, on a base of the shipping container, on a lid of the shipping container, between the cryocooler and the thermal mass/cryopreserved sample, etc. The control system may comprise more than two temperature sensors. The control system may comprise additional components, such as comparators, processors, memory, user interfaces, controllers, etc.

For the sake of simplicity, the example steps shown in FIG. 8 are based on a control system having at least two temperature sensors, one located at or near to the top of the cavity of the shipping container (i.e. near the cryocooler), and one located at or near to the bottom of the cavity of the shipping container (i.e. near the cryopreserved sample). To reduce or minimise the build-up of liquid oxygen, the temperature within the cavity of the shipping container is monitored to determine if liquid oxygen has started to form. As mentioned above, liquid air comprises liquid nitrogen and liquid oxygen, but as liquid nitrogen evaporates at a lower temperature than liquid oxygen, liquid air can end-up comprising a higher concentration of liquid oxygen as the liquid nitrogen boils-off and evaporates. When the active cooling of the shipping container/working fluid ends, the temperature within the shipping container may remain at the temperature required to maintain a cryopreserved sample for several hours to several days. Even if the temperature at the top of the shipping container ($T_{top}$) increases, it is likely that the temperature at the bottom of the shipping container ($T_{bottom}$) will remain at the required temperature (or within a desired temperate range) for a long time due to a thermal air insulating barrier within the shipping container (as mentioned above with respect to FIG. 7). Thus, it is likely that a large temperature difference between $T_{bottom}$ and $T_{top}$ will exist while the bottom of the shipping container is at the required temperature. A reduction in the temperature difference between $T_{bottom}$ and $T_{top}$ may indicate that the bottom of the shipping container is beginning to warm-up. This may itself indicate that liquid nitrogen has boiled-off/evaporated, and that the amount of liquid oxygen in the shipping container may be increasing. The degree of closeness between $T_{bottom}$ and $T_{top}$ and the duration during which the two temperature measurements are close, may indicate that a substantial amount of liquid oxygen has formed in the shipping container.

Accordingly, at step S100, the control system measures the temperature $T_{top}$ at the top of the shipping container, and at step S102, the control system measures the temperature $T_{bottom}$ at the bottom of the shipping container. It will be understood that steps S100 and S102 may be performed in the opposite order or at substantially the same time. At step S104, the two measured temperatures $T_{bottom}$ and $T_{top}$ are compared. If at step S106 $T_{bottom}$ and $T_{top}$ are determined to be close, or if the difference between $T_{bottom}$ and $T_{top}$ is determined to be within a specific range that indicates the temperatures are close to each other, then the duration during which the temperatures remain close to each other is monitored (step S108). If at step S106 the measured temperatures are not determined to be close, the process returns to step S100, as the difference between the measured temperatures is not indicative of liquid oxygen formation.

The duration for which the two measured temperatures remain close to each other (or indeed, become closer), may indicate that liquid air formation has occurred (i.e. that liquid nitrogen has evaporated). To reduce the amount of liquid air in the shipping container, it may be desirable to heat the liquid air at the bottom of the shipping container to cause it to evaporate into its gaseous state. However, a constant heat supply to the bottom of the shipping container is undesirable, particularly as this may cause the cryopreserved sample to warm up. Similarly, applying heat at regular, short intervals, may cause the shipping container to warm-up and may use a significant amount of power. It has been determined that to reduce the amount of liquid oxygen within the shipping container without increasing the temperature of the shipping container substantially or using much power, it is advantageous to wait a predetermined duration/period before applying heat to the bottom of the shipping container. Thus, at step S110, the control system determines if the monitored time during which the two measured temperatures are close is approaching, or is equal to, a maximum time $t_{max}$. The maximum time may be, for example, an a few minutes or a few hours. The maximum time may be determined experimentally.

If the maximum time has been reached, the control system switches-on a mechanism to reduce build-up of liquid air/liquid oxygen in the shipping container (step S112). An example (heating) mechanism is described below with respect to FIGS. 9A to 9C. If the maximum time has not been reached, the control system waits and returns to step S108.

The control system may, in embodiments, switch-off the heating mechanism automatically after a specified time (e.g. after a few minutes), when the liquified gas is expected to have boiled-off. In embodiments, the control system may determine when to switch-off the heating mechanism. To maintain the cool temperature of the shipping container (and maintain the cryopreserved sample therein at the required temperature), it is vital to switch-off the heating mechanism to prevent the temperature in the shipping container from increasing too much. In embodiments, the control system may determine, using a resistive element provided within the heating mechanism (or elsewhere), if the liquified gas collected at the bottom of the shipping container has substantially evaporated away/boiled-off. Thus, at step S114, the control system may measure resistance to determine if the resistance is indicative of the liquified gas having evaporated. (For example, if the resistive element, e.g. a resistor, is provided in a location where the liquified gas collects, the resistance may be low when the resistor is at least partly covered by/surrounded by or in proximity to liquefied gas, while the resistance may be high when the liquified gas has evaporated and the heating mechanism is on.) At step S116, the control system may determine if the measured resistance is equal to $R_{max}$, which is indicative of there being substantially no liquified gas. If the measured resistance is indicative of there being substantially no liquified gas in proximity to the resistive element, the control system switches-off the heating mechanism (step S118) and the process returns to step S100. If the measured resistance indicates some liquified gas remains within the shipping container, the control system returns to step S114. In embodiments, the control system may automatically switch-off the heating mechanism after a specific maximum duration, as a fail-safe in case the resistive element is faulty, to prevent the shipping container and cryopreserved sample from warming-up.

Figure 9A:
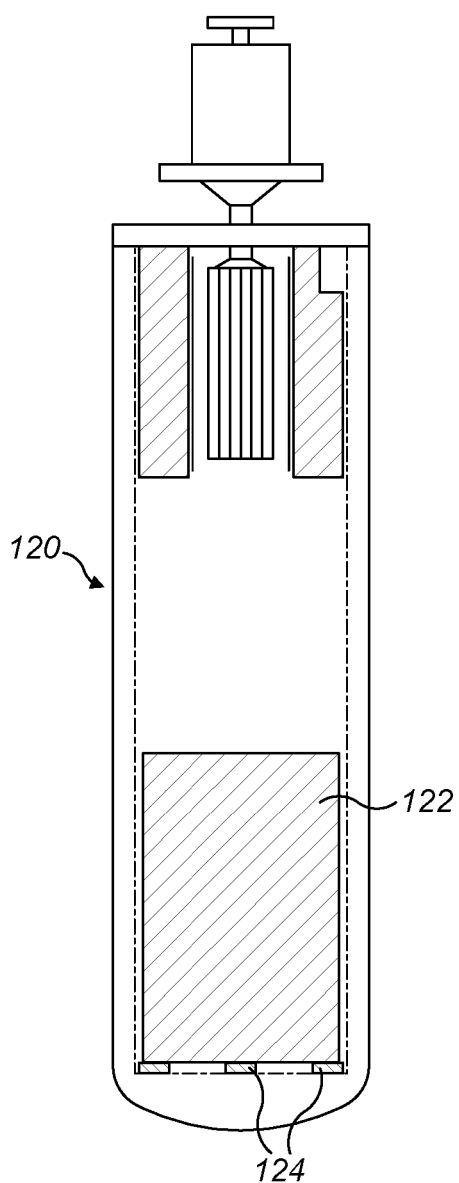
FIG. 9A shows a cross-sectional view through a shipping container comprising a mechanism to reduce build-up of liquified gas within the shipping container.
Figure 9B:
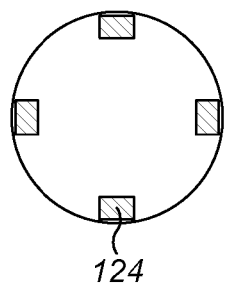
FIG. 9B shows a plan view of the mechanism.

FIG. 9A shows a cross-sectional view through a shipping container 120 comprising a mechanism to reduce build-up of liquified gas (e.g. liquid air) within the shipping container. The mechanism may be a heating mechanism. The mechanism may be part of, or used in conjunction with, the control system described above with respect to FIG. 8. The shipping container 120 comprises a thermal mass 122, which is provided in the vicinity of a cryopreserved sample (not shown). In embodiments, the thermal mass 122 may be shaped to at least partly contain or hold or surround one or more cryopreserved samples. The heating mechanism to reduce build-up of liquified gas comprises one or more shallow vessels 124 that are provided at the base of the shipping container 120. The vessels 124 are provided at the lowest point (also referred to as a "sump") in the shipping container 120 as this is likely to be the coldest portion of the shipping container 120 and therefore, where liquified gas will form or collect. The or each vessel 124 functions to hold liquified gas that forms within the shipping container 124. In embodiments, a single shallow vessel 124 may be provided in the centre of the base of the shipping container 120. In embodiments, one or more shallow vessels 124 may be provided at various positions on the base of the shipping container 120. FIG. 9B shows a plan view of one particular design of the mechanism to reduce build-up of liquified gas, which comprises four vessels 124 that are positioned around the edge/perimeter of the base of the shipping container 120 in an equidistant arrangement.

Liquified gas may be formed at the top of the shipping container, and may drip down the shipping container. In embodiments, at least one shallow vessel 124 may be provided on the base of the shipping container cavity in a location where liquified gas may drip (or be caused to drip).

Figure 9C:
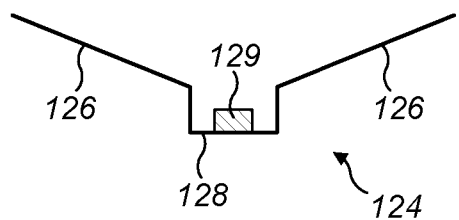
FIG. 9C shows a cross-sectional view of the mechanism.

FIG. 9C shows a cross-sectional view through a shallow vessel 124. The shallow vessel 124 may comprise a sloped surface 126 (or bowl-shaped portion comprising a sloped surface) to cause any liquified gas which falls on the sloped surface 126 to flow into a recess 128. The recess 128 may be within the bowl-shaped portion. The recess 128 may comprise or be coupled to a heating element (not shown) arranged to apply heat to the recess 128 to evaporate the liquified gas within the recess 128. The shallow vessel may comprise a resistive element 129, for the purpose of determining when to switch-off the heating element, as described above with respect to FIG. 8.

In embodiments, the shipping container described herein may comprise a mechanism to reduce a volume of liquified gas in the cavity of the shipping container.

The mechanism to reduce a volume of liquified gas in the cavity may comprise: at least one vessel provided in the cavity to collect liquified gas; and a heating element to apply heat to the at least one vessel to evaporate the liquified gas collected in the vessel.

The vessel may, in embodiments, comprise: a shallow bowl-shaped portion comprising a sloped surface; and a recess within the bowl-shaped portion for collecting liquified gas.

In embodiments, the mechanism to reduce a volume of the liquified gas in the cavity of the shipping container may comprise a controller for controlling when the heating element is to apply heat to the at least one vessel. The mechanism may comprise at least one sensor in the recess of the vessel to sense when the vessel is empty, and wherein the at least one sensor is coupled to the controller. The at least one sensor may be a resistive element provided in the recess of the vessel.

In embodiments, the shipping container may comprise at least one sensor to sense tipping or tilting of the shipping container. In embodiments, the at least one sensor may be provided as part of the shallow vessel for collecting liquefied gas. The at least one tilt sensor to sense tilting of the shipping container may be coupled to the controller of the mechanism to reduce a volume of the liquified gas in the cavity of the shipping container. Wherever the at least one tilt sensor is located, if the at least one tilt sensor senses that the shipping container is tilted, the controller may prevent the heating element from applying heat to the at least one vessel. This may be useful because if the shipping container is tilted, the liquified gas may not have collected within the vessel(s), and thus, applying heat to the vessel may not result in evaporation of the liquified gas but may instead cause heating of the shipping container. This tip/tilt detection method may also be used to shut down the cryocooler to prevent the build-up of liquified gas within the cavity of the shipping container. In embodiments, if the least one tilt sensor senses that the shipping container is tilted, and the container is in a liquification state, then the controller may prevent further liquification in the vessel.

In embodiments, the shipping container comprises a single vessel to collect liquified gas, wherein the vessel is located in a base of the cavity. In alternative embodiments, the shipping container comprises a plurality of vessels in the cavity to collect liquified gas. Each vessel of the plurality of vessels may be coupled to a heating element. This may enable each vessel to be separately controlled to cause evaporation of any liquified gas in each vessel. This may be useful if the shipping container is tilted, because only those vessels which are likely to contain liquified gas (due to the angle of and/or degree the tilt), may be heated to evaporate liquified gas.

Figure 10A:
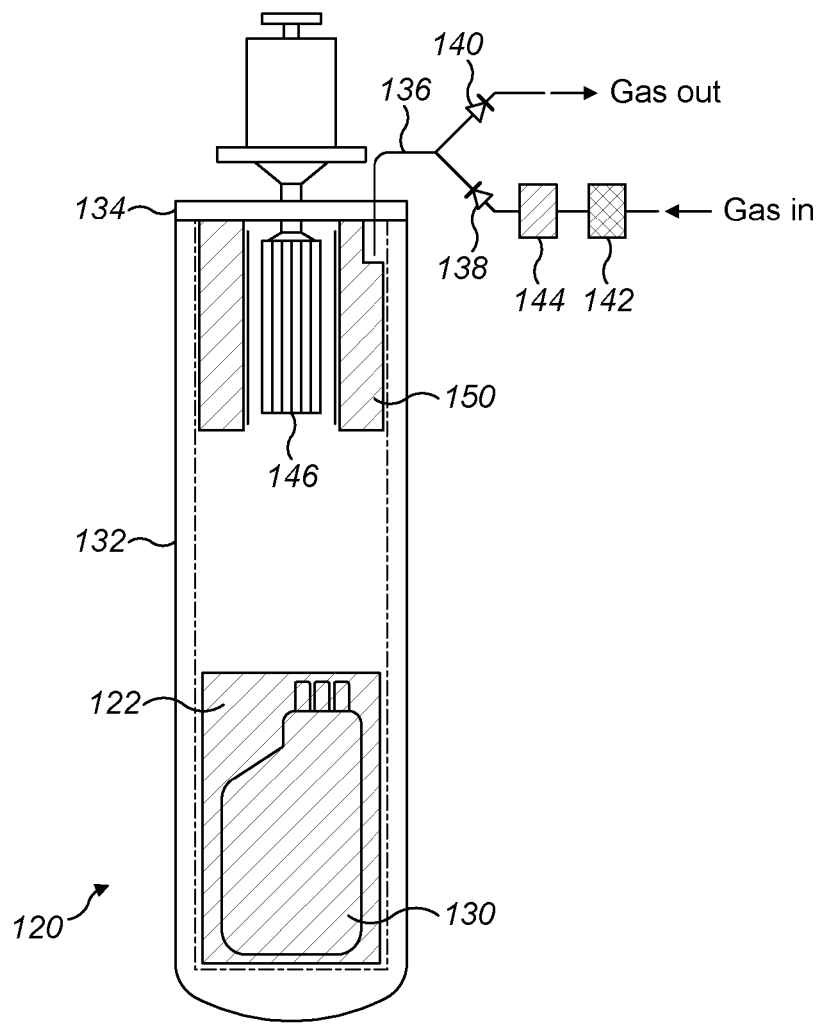
FIG. 10A shows a cross-sectional view through a shipping container comprising a mechanism to reduce build-up of liquid oxygen and frost within the shipping container.
Figure 10B:
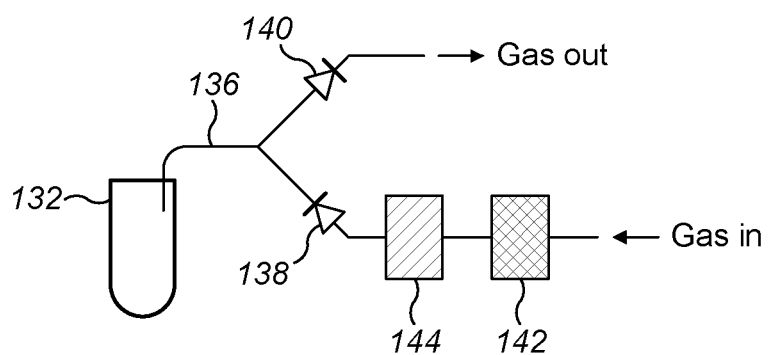
FIG. 10B is a close-up view of the mechanism.

FIG. 10A shows a cross-sectional view through a shipping container comprising a mechanism to reduce build-up of liquid oxygen and frost within the shipping container, and FIG. 10B is a close-up view of the mechanism.

FIG. 10A shows an airflow mechanism to enable gas to flow into the cavity of the shipping container 120 and to enable gas (e.g. evaporated—and therefore warm—liquified gas) to flow out of the cavity. The airflow mechanism may comprise a pipe 136 which is provided through a surface of the shipping container 120, e.g. through a lid or cover 134 of the shipping container which seals an insulated housing 132 of the shipping container. FIG. 10A also shows a cryopreserved sample 130 surrounded by a thermal mass 122 at the bottom of a cavity of the insulated housing 132. A heat exchanger/heat sink/cool sink 146 is shown at the top of the cavity of the insulated housing 132. The cool sink 146 is coupled to, or part of, a cryocooler to cool and condense gas which flows into the cavity of the shipping container 120. The gas may be air from the environment in which the shipping container 120 is located. The cool sink 146 may be surrounded by an insulating collar 150, which is described in more detail below. The insulating collar 150 may be shaped to enable the pipe 136 of the airflow mechanism to extend into the cavity of the shipping container 120. In embodiments, input air may be directed through a channel between the insulating collar 150 and the insulated housing 132. When the input (warm) air flows into the space below the cool sink 146, it may then flow upwards towards the cryocooler and cool sink 146 where it can be condensed. This may be useful as it prevents warm air flowing directly towards the cryocooler and cool sink 146. However, in embodiments, the pipe 136 may direct input air directly towards the cryocooler and cool sink 146.

As shown in FIGS. 10A and 10B, a first part of the pipe 136 extends into the cavity. A second part of the pipe extends out of the shipping container 120. The second part of the pipe 136 is bifurcated or shaped into a first branch and a second branch. An inlet is provided on the first branch of the second part of the pipe 136, to enable gas to flow into the cavity of the shipping container 120. A one-way valve 138 is provided along the first branch of pipe 136. This may prevent evaporated air from within the shipping container to flow through the first branch of pipe 136, which may prevent the inlet from functioning correctly.

In embodiments, the first part of the pipe 136 extends into the cavity in proximity to the at least one cold finger or cryocooler or cool sink 146. In embodiments, the first part of the pipe 136 extends into a top of the cavity (when the shipping container is in the use position).

The airflow mechanism comprises an outlet provided on the second branch of the second part of the pipe 136, to enable gas (including evaporated liquified gas) to flow out of the cavity of the shipping container 120. A one-way valve 140 is provided along the second branch of the pipe 136. This may prevent gas from outside of the shipping container to flow through the second branch of pipe 136, which may prevent the outlet from functioning correctly.

In embodiments, to reduce build-up of liquid oxygen within the shipping container the airflow mechanism may comprise a chamber 142 located between the inlet and the one-way valve 138 on the first branch of pipe 136. The chamber 142 may contain an oxygen scavenger. An oxygen scavenger, or oxygen absorber, is a material that helps to remove or decrease the level of oxygen. The oxygen scavenger may be an iron-based oxygen scavenger, or may be a non-ferrous oxygen scavenger. Thus, oxygen from the gas (e.g. air) that flows into the inlet of pipe 136 may be at least partly removed, which reduces the potential build-up of liquid oxygen when the gas is condensed within the cavity of the shipping container 120. In embodiments, the chamber 142 may be removably provided on the first branch of pipe 136. This may enable the entire chamber 142 to be removed to enable the oxygen scavenger to be disposed of and replaced with fresh oxygen scavenging material. In embodiments, the entire chamber 142 may be disposed of, and replaced with a new chamber 142 containing fresh oxygen scavenging material. Additionally or alternatively, the chamber 142 may be openable in situ to enable the oxygen scavenger to be removed and replaced with fresh material.

In embodiments, to reduce build-up of frost within the shipping container (particularly within the cavity of the insulated housing 132), the airflow mechanism may comprise a chamber 144 located on the first branch of pipe 136. If no chamber 142 is provided, the chamber 144 is located between the inlet and the one-way valve 138 on the first branch of the pipe 136. If chamber 142 is also present, chamber 144 is located between chamber 142 and the one-way valve 138 on the first branch of the pipe 136, i.e. after the chamber containing the oxygen scavenging material. Chamber 144 contains a desiccant or other suitable material for absorbing moisture/water from the input gas. Removing moisture/water from the input air reduces the potential for frost or ice to form within the shipping container. Frost or ice may reduce the useable volume within the cavity of the insulated housing, may make it more difficult to place cryopreserved samples into the cavity or to remove them, and may reduce the efficiency of the thermal diode of the shipping container. For example, frost build-up on inner surfaces of the insulated housing may block air flow channels/paths within the cavity, which may inhibit the correct functioning of the thermal diode/working fluid.

In embodiments, the chamber 144 may be removably provided on the first branch of pipe 136. This may enable the entire chamber 144 to be removed to enable the desiccant to be disposed of and replaced with fresh desiccant. In embodiments, the entire chamber 144 may be disposed of, and replaced with a new chamber 144 containing fresh desiccant. Additionally or alternatively, the chamber 144 may be openable in situ to enable the desiccant to be removed and replaced with fresh material.

Figure 13:
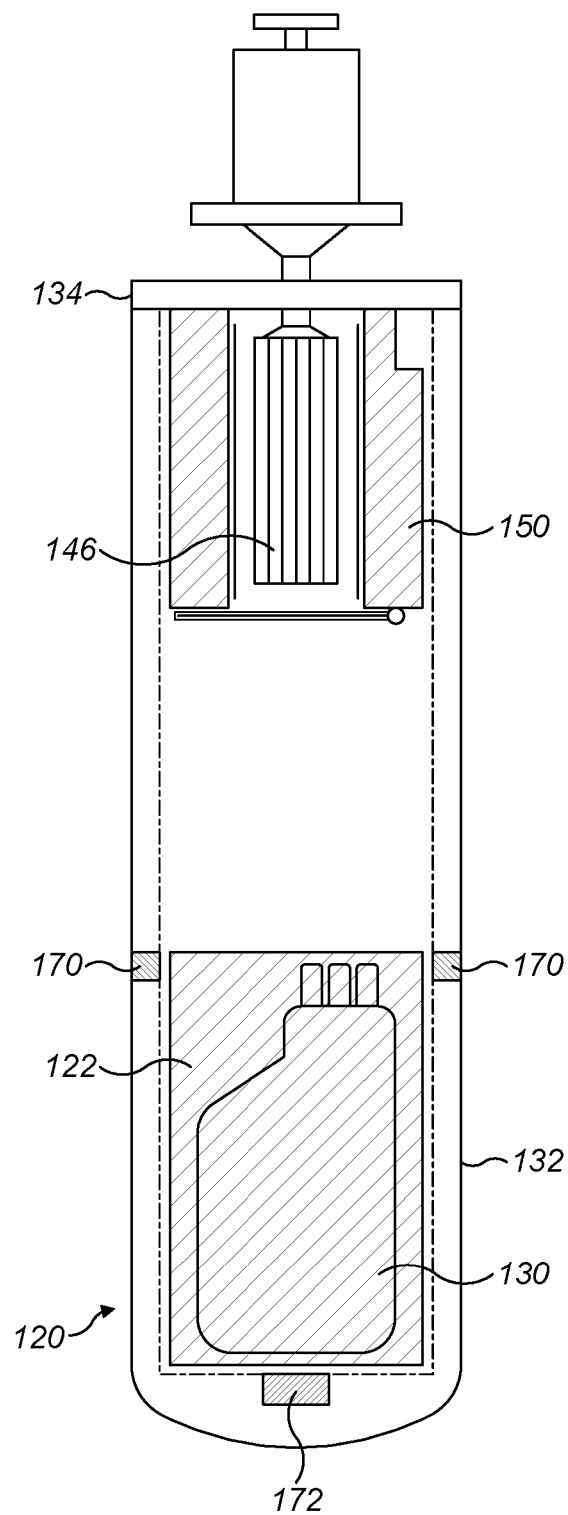
FIG. 13 shows a cross-sectional view through a shipping container comprising at least one getter.

In embodiments, the shipping container may comprise at least one getter. Turning to FIG. 13, this shows a cross-sectional view through a shipping container 120 comprising at least one getter. A getter is a deposit of a reactive material that is typically used to remove small amounts of gas from vacuum systems. When gas molecules (or liquid molecules) strike the getter, the molecules combine with the getter chemically or by absorption. The getter 170, 172, may be provided within the vacuum portion of the shipping container 120, as shown in FIG. 13. (In embodiments, the getter may be provided within the cavity to absorb condensed gases, or to absorb any liquified gas. The getter may also help to reduce moisture within the cavity, which may otherwise result in frost build-up.)

In embodiments, the at least one getter may be provided in the insulated housing 132 of the shipping container 120. The at least one getter may be provided as a coating on a surface of the cavity of the insulated housing 132. The at least one getter may be provided in proximity to the location of a cryopreserved biological sample 130 within the cavity, i.e. in or near to the coolest place within the cavity. Thus, getter 172 is provided on, or near to, the base of the cavity of the insulated housing 132. The coolest place within the cavity may not always be towards the bottom/base of the cavity—at some points during the cryocooling process, the coolest place may be just above the location of the cryopreserved biological sample 130, e.g. when the coolest condensed gas has not yet reached the bottom of the cavity. Thus, getter 170 may be provided in the insulated housing 132 at, or near to, the point where the top of the cryopreserved sample 130 will be located when the sample is provided in the cavity.

Thus, in embodiments, the at least one getter is provided on, or near to, a base of the cavity, and/or on a side wall of the cavity. In embodiments, the at least one getter may be formed of charcoal. In embodiments, more than one type of getter material may be used.

Maintaining Temperature of Cryopreserved Sample

As mentioned above, in the second operational state of the thermal diode, in which no active cooling is provided (i.e. the cryocooler is switched-off/powered-off), a temperature gradient between the top of the cavity of the shipping container and the bottom of the cavity of the shipping container (where the cryopreserved sample is located) is maintained under gravity, as the coldest working fluid will reside at the vertically lowest point in the cavity, and the warmest working fluid will rise to the top of cavity. Once active cooling has been performed, it is desirable to maintain the cool/cold temperature within the shipping container (and therefore, of the cryopreserved sample) without having to revert back to active cooling regularly. This is particularly important when the shipping container is being shipped, and when active cooling may not be possible (because of safety requirements, or because of the lack of a power supply). If the temperature of the cavity of the shipping container increased rapidly, active cooling would have to be used regularly, which may also reduce the power-efficiency of the shipping container. Thus, techniques to maintain the temperature of the cavity, and cryopreserved sample, for as long as possible without performing active cooling are now described.

Figure 11A:
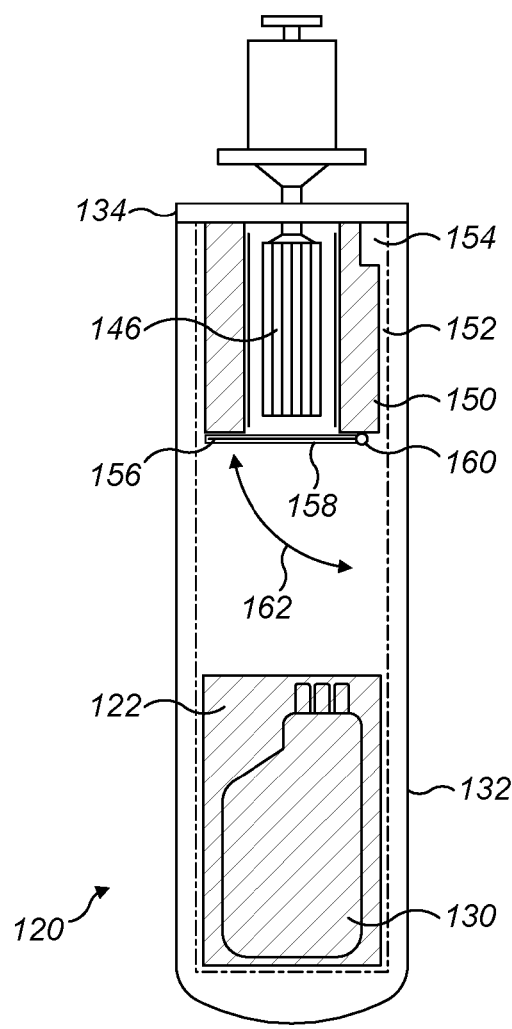
FIG. 11A shows a cross-sectional view through a shipping container comprising a thermal mass that surrounds a cryopreserved sample and a shield to reduce heat losses.
Figure 11B:
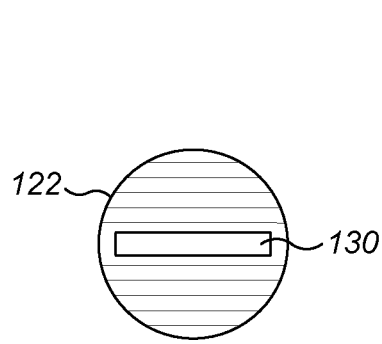
FIG. 11B shows a plan view of the thermal mass.
Figure 11C:
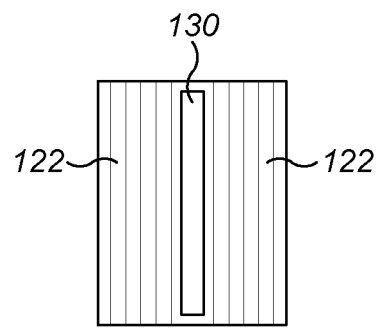
FIG. 11C shows a cross-sectional view of the thermal mass.

In embodiments, a passive cooling technique may be used to maintain the cryopreserved sample at the required temperature for sample viability. FIG. 11A shows a cross-sectional view through a shipping container 120 comprising a thermal mass 122 that surrounds a cryopreserved sample 130, wherein the thermal mass 122 is used to slow down the rate of temperature change (increase) within the cavity of the shipping container 120 (and more importantly, of the cryopreserved sample 130) when active cooling is not being used. The thermal mass 122 is a block of material that is resistant to changes in temperature and therefore, stays cold for a long time after active cooling has ended. As shown in FIG. 11A, the thermal mass may be provided around the cryopreserved sample 130, to reduce the rate of temperature change in the vicinity of the cryopreserved sample. FIG. 11B shows a plan view of the thermal mass, and FIG. 11C shows a cross-sectional view of the thermal mass. The thermal mass 122, or blocks/pieces of thermal mass, is arranged to surround the cryopreserved sample 130. As the thermal mass 122 takes a long time to heat-up after it has been cooled to a cryopreservation temperature (e.g. −80° C. or lower), if the thermal mass 122 is provided close to the cryopreserved sample 130, the cryopreserved sample is prevented from heating-up quickly. Thus, the thermal mass 122 provides passive cooling to the sample 130.

Thus, in embodiments, at least one block of thermal mass material is provided in the cavity of the shipping container. Preferably, the at least one block of thermal mass material is provided in proximity to a cryopreserved biological sample in the shipping container. The or each block of thermal mass material may be shaped to surround the cryopreserved biological sample.

The or each block of thermal mass material may have a low thermal emissivity. The or each block thermal mass material may comprise at least one surface having a low thermal emissivity. At least one surface may be a polished surface. The low thermal emissivity property means the thermal mass is poor at emitting thermal energy/thermal radiation. Consequently, the thermal mass 122 is able to keep the cryopreserved sample 130 cold, as thermal energy transfer between the thermal mass 122 and the sample is reduced.

In embodiments, the or each block of thermal mass material may comprise one or more fluid channels to enable gas to flow through the block. This may improve the flow/circulation of gas through the cavity, i.e. cold, condensed gas may flow through the fluid channels to the bottom of the cavity, and warmer gas, or evaporated liquified gas, may flow through the fluid channels towards the top of the cavity where it can be re-condensed and/or may flow out of the cavity via the above-described airflow mechanism. The fluid channels may advantageously prevent warmer gas from collecting at the bottom of the cavity, where it could cause the cryopreserved sample 130 to warm-up.

The or each block of thermal mass material is formed of any material suitable for passive cooling, such as, but not limited to, aluminium, ice, or a phase change material. Typically, a material with a high thermal capacity may be suitable for the thermal mass.

The thermal mass(es) keep the cryopreserved sample cool (i.e. at the required temperate for sample viability) for as long as possible when active cooling is not taking place. Another technique to maintain the temperature of the cryopreserved sample is to minimise the amount of thermal energy generated by the cryocooler that is transferred towards the bottom of the cavity and the cryopreserved sample.

FIG. 11A also shows a shield 158 in the shipping container 120. A cryopreserved sample 130 surrounded by a thermal mass 122 at the bottom of a cavity of the insulated housing 132. A heat exchanger/heat sink/cool sink 146 is shown at the top of the cavity of the insulated housing 132. The cool sink 146 is coupled to, or part of, a cryocooler to cool and condense gas which flows into the cavity of the shipping container 120. The gas may be air from the environment in which the shipping container 120 is located. The cool sink 146 may be surrounded by an insulating collar 150, which is described in more detail below. Shield 158 is provided in proximity to the cool sink 146 and cryocooler.

Shield 158 may be an infra-red shield, to reflect thermal radiation up towards the upper portion of the cavity or towards the cool sink 146, and away from the cryopreserved sample 130. The shield 158 may comprise a layer of insulating material 156 (e.g. a foam layer) that is covered by a reflective material (e.g. aluminium foil). The shield 158 may be coupled to the insulating collar 150, via a hinge 160.

The shield 158 may be moved between a 'closed position' (as shown in FIG. 11A), in which the shield 158 acts as a barrier between the cryocooler and cool sink 146, and the cryopreserved sample 130, and an 'open position', in which the shield 158 is moved out of the way so that cooled gas may flow from the cryocooler towards the cryopreserved sample 130. The direction of motion of the shield 158 is indicated by arrow 162. The shield 158 may be coupled to a controller and mechanism to enable the shield 158 to be automatically moved between the closed and open positions. In embodiments, the shield 158 may be controlled to move into the open position when the cryocooler is switched-on/is consuming power, and the shield 158 may be controlled to move into the closed position when the cryocooler is switched-off/is not consuming power. When the cryocooler is switched-off, the temperature of the cryocooler increases rapidly. When the shield 158 is in the closed position, the insulating layer 156 prevents/reduces thermal energy transfer from the cryocooler to the cryopreserved sample 130, and the reflective surface reflects thermal radiation away from the shield, insulating layer 156 and cryopreserved sample 130.

Thus, in embodiments, an infra-red or thermal shield is provided between the at least one heat (cool) sink and the cryopreserved biological sample, and is arranged to impair heat transfer from the heat (cool) sink towards the cryopreserved biological sample.

The shield may be moveable between a first position in which the shield impairs heat transfer from the heat sink, and a second position in which the shield enables the condensed air (and any liquid air) to flow towards the cryopreserved biological sample.

The shield may be coupled to a control mechanism configured to: move the shield into the first position when the cryocooler is powered-off; and move the shield into the second position when the cryocooler is powered-on.

In embodiments, the shield 158 may be positioned in an intermediate position (i.e. somewhere between the open and closed positions) to control the dripping of any liquified gas towards the bottom of the cavity. For example, the shield 158 may be positioned in a position during active cooling which enables any liquified gas to drip down towards one of the liquified gas collecting vessels described above with reference to FIGS. 9A-C. The shield 158 may be positioned in a position during active cooling which enables any liquified gas to drip away from a container for holding a cryopreserved sample within a shipping container. For example, a container for holding a cryopreserved sample within a shipping container may be formed from a foam material (as described below with reference to FIG. 18A). in this case, it is undesirable for liquified gas to drip onto the foam material, as it may be absorbed by the foam. The foam-based container enables a user of the shipping container to easily remove the container and sample therein from the shipping container, as the foam can be handled without gloves or specialist equipment. However, if the foam has absorbed the liquified gas, then when the foam-based container is handled by a user, skin damage may occur as the liquefied gas begins to evaporate. Thus, the intermediate position of the shield 158 may minimise or reduce the amount of liquified gas that drops onto the foam-based container. The foam-based container may be positioned within the cavity to reduce the possibility of liquified gas falling onto the container, e.g. by being rotated by 90° along the axis of the cavity, i.e. so that the foam-based container lies along the same axis as the shield 158 in the fully open position.

As mentioned above, FIG. 11A shows a shipping container 120 having an insulating collar 150. The insulating collar 150 may be coupled to, or part of, the lid or seal 134 of the shipping container. The insulating collar 150 may help to maintain the temperature of the cryopreserved sample 130 at the required temperature when active cooling has ended. The insulating collar 150 may reduce or prevent any warm gas from the external environment from entering the cavity of the shipping container 120, as the insulating collar 150 may function like a plug in the cavity. The insulating collar 150 may reduce thermal energy transfer from the cryocooler when the cryocooler has powered-off after an active cooling stage, to the rest of the cavity, and in particular to the cryopreserved sample 130. The insulating collar 150 may help to keep the cooler air within the bottom of the cavity. The insulating collar 150 may extend to the base of the cold sink 146, and/or be provided as multiple collars that extend to the top of the thermal mass 122. In these embodiments, the collar may reduce thermal losses during transport caused by the 'sloshing' of the cold air which result from the movement and tipping of the shipping container.

As mentioned earlier, the insulating collar 150 may be shaped to enable air to flow into the cavity for condensing when active cooling is taking place. (The airflow mechanism described above may, in embodiments, function only when active cooling is taking place, and the inlet and outlet may be blocked/closed when passive cooling is taking place. In embodiments, the inlet and outlet may always be open, but airflow in and out of the system may be minimal when passive cooling is taking place). Thus, as shown in FIG. 11A, a gap or void 154 may be provided by the shape of insulating collar 150 to accommodate the pipe 136 of the airflow mechanism. A channel 152 may be provided from the gap 154 into the cavity to enable airflow in and out of the airflow mechanism. The channel 152 may be provided by shaping the insulating collar 150 in a way that it is not entirely flush to the cavity in a part of the insulating collar, or by providing channel 152 in the insulating collar 150.

Thus, in embodiments, the shipping container may comprise an insulating collar or plug. The insulating collar may be provided around the at least one heat sink and/or cryocooler of the shipping container to impair thermal energy transfer from the heat sink/cryocooler into the cavity during passive cooling (i.e. when the cryocooler is not operational). The insulating collar may extend further into the cavity than the at least one heat sink and/or cryocooler (as shown in FIG. 11A, for example). In embodiments, the shipping container comprises a lid for sealing the cavity, and the insulating collar may be coupled to, or part of, the lid, or may be separate from the lid.

In embodiments, the shipping container may comprise a thermal shield (as described above). The shield may be coupled to the insulating collar and positioned between the cryocooler and the cryopreserved biological sample, and be arranged to impair thermal energy transfer from the cryocooler towards the cryopreserved biological sample when the cryocooler is not operational (i.e. during the passive cooling state). The shield may be moveable between a first position in which the shield impairs thermal energy transfer from the cryocooler, and a second position in which the shield enables the condensed gas and liquified gas to flow towards the cryopreserved biological sample. The shield may be coupled to a control mechanism configured to: move the shield into the first position when the cryocooler is powered-off; and move the shield into the second position when the cryocooler is powered-on.

The insulating collar or plug may be formed of any suitable insulating material. In embodiments, the insulating material may extend down towards the thermal mass in the shipping container cavity, when the insulating collar/plug is inserted into the shipping container. Preferably, the insulating collar is formed from a material which offers high thermal insulation per unit weight. As the lid and insulating collar need to be removed from the cavity when a cryopreserved sample is being stored in or removed from the shipping container, it is preferable that the insulating collar is made from a relatively lightweight material. In embodiments, the insulating collar may be fabricated from a foam material, such as, but not limited to a PVC foam or a closed cell PVC foam or an aerogel.

Figure 12:
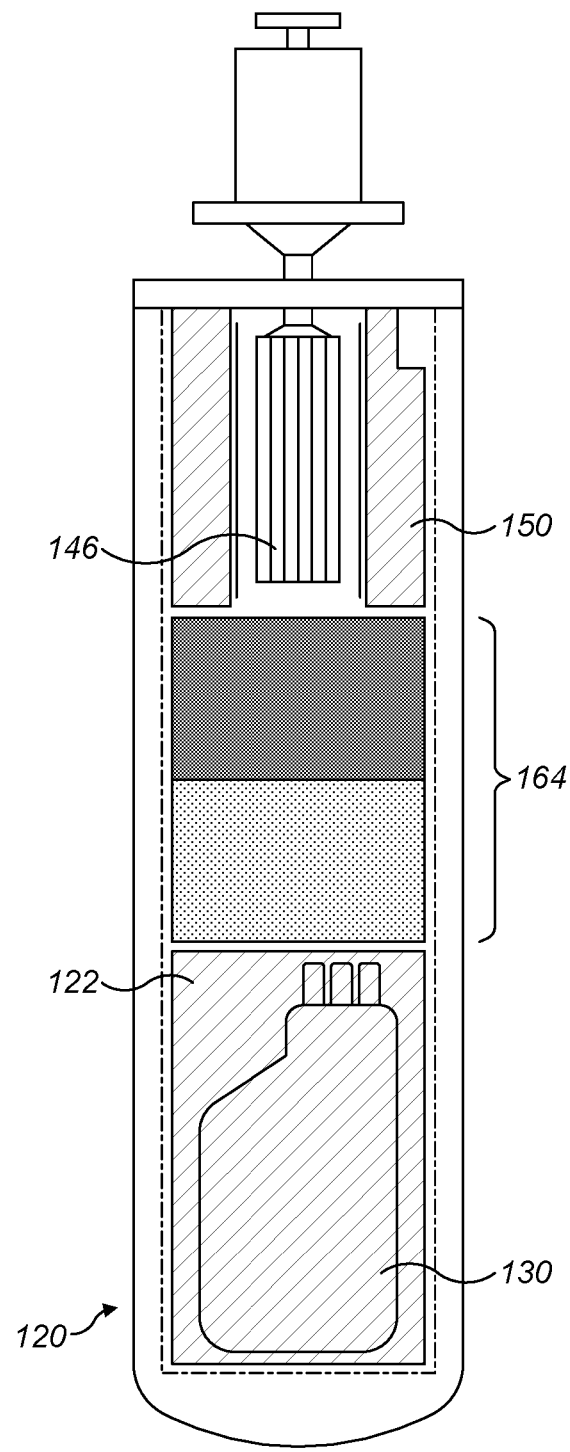
FIG. 12 shows a cross-sectional view through a shipping container comprising a thermal mass and an insulating plug.

FIG. 12 shows a cross-sectional view through a shipping container comprising a thermal mass 122 and an insulating collar 150. During passive cooling, i.e. when the cryocooler 146 is switched-off, the above-described properties of the thermal mass 122 and insulating collar 150 enable a thermal gradient to form in the space 164 between the thermal mass and insulating collar 150. The warmest gas rises to the top of the space 164, and is prevented from flowing further up due to the insulating collar 150. The coolest gas sinks towards the bottom of the space 164, above/around the cryopreserved sample 130. During passive cooling, there is no significant gas circulation within the cavity, and the stationary air functions as thermal insulation itself. In this way, the stationary air in space 164 helps to maintain the cryopreserved sample 130 at a required temperature.

Figure 24A:
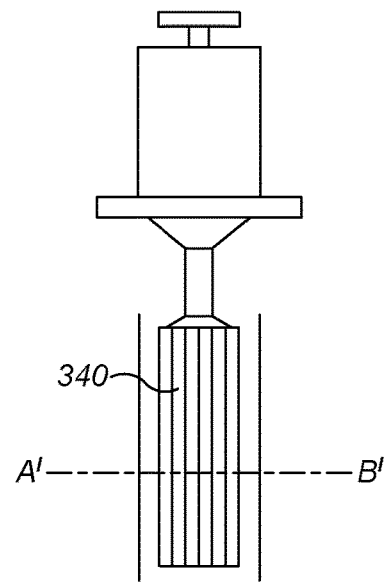
FIG. 24A shows a heat sink (or cool sink) of a shipping container.
Figure 24B:
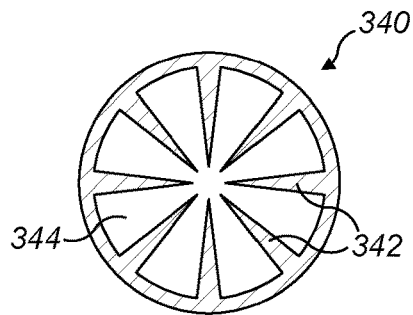
FIG. 24B shows a cross-sectional view through an example heat sink having a circular form.
Figure 24C:
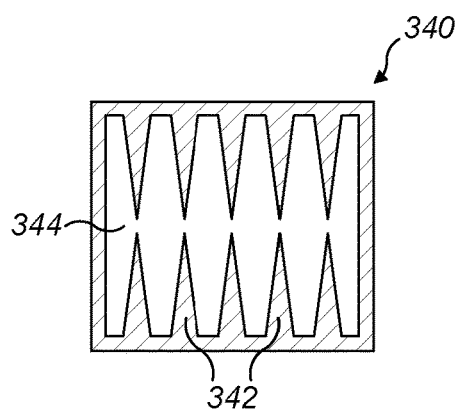
FIG. 24C shows a cross-sectional view through an example heat sink having a rectangular form.

Turning to FIG. 24A, this shows a heat sink 340 (or cool sink) of a shipping container. The cool sink 340 may help to cool gas which circulates within the shipping container during active cooling. The cool sink may increase the efficiency and/or speed at which gas within the shipping container is cooled by the cryocooler, by causing/encouraging convective circulation of gas within the cavity of the shipping container. The cool sink 340 is located at, or near to, the top of the cavity of the shipping container, in proximity to the cryocooler. The cold sink 340 helps to draw warm gas within the cavity towards the cryocooler, where it can be cooled/condensed. The cold sink 340 may comprise multiple fins. Preferably, the cold sink 340 comprises fans along the length of the cold sink, to provide an improved convective chimney effect. In embodiments, the cold sink may have a length of between 50 mm and 300 mm, e.g. 150 mm. The length of the cold sink 340 may depend on other design constraints of the shipping container (such as the length of the cavity). The cold sink 340 may have a circular cross section—FIG. 24B shows a cross-sectional view (taken at line A'-B' in FIG. 24A) through an example heat sink having a circular form. The cold sink 340 may have a rectangular cross section—FIG. 24C shows a cross-sectional view through an example heat sink having a rectangular form. As shown in FIGS. 24B and 24C, the cold sink 340 may have multiple fins 342, which increase the surface area of the cold sink 340, and therefore, the efficiency of the cold sink 340. In embodiments, the cold sink 340 may have a fin spacing of approximately 5 mm. Thus, gas is drawn through the void 344 and flows through/past the fins of the cold sink 340, which enables the cold sink 340 to cool the gas.

In embodiments, the shipping container comprises a cryocooler (e.g. a Stirling cryocooler) to condense the gas of the thermal diode, wherein the condensed gas provides cooling to the cavity.

The shipping container may comprise at least one cold finger coupled to the cryocooler and extending into the cavity. The shipping container may comprise at least one heat sink (cold sink) in proximity to the at least one cold finger. The heat sink may surround the at least one cold finger. The heat sink may function as an inverted chimney which draws relatively warm gas towards the at least one cold finger for cooling. The heat sink may have a larger surface area than a surface area of the cold finger.

The heat sink may be at least partly formed of copper. The heat sink may be at least partly formed of aluminium.

Figure 21C:
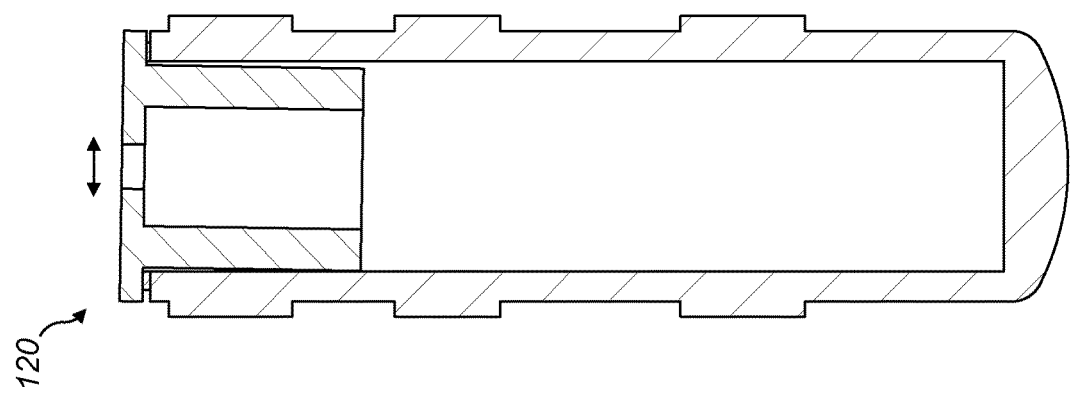
FIGS. 21A to 21C show cross-sectional views through a shipping container having an insulating plug and sealing mechanism.
Figure 21B:
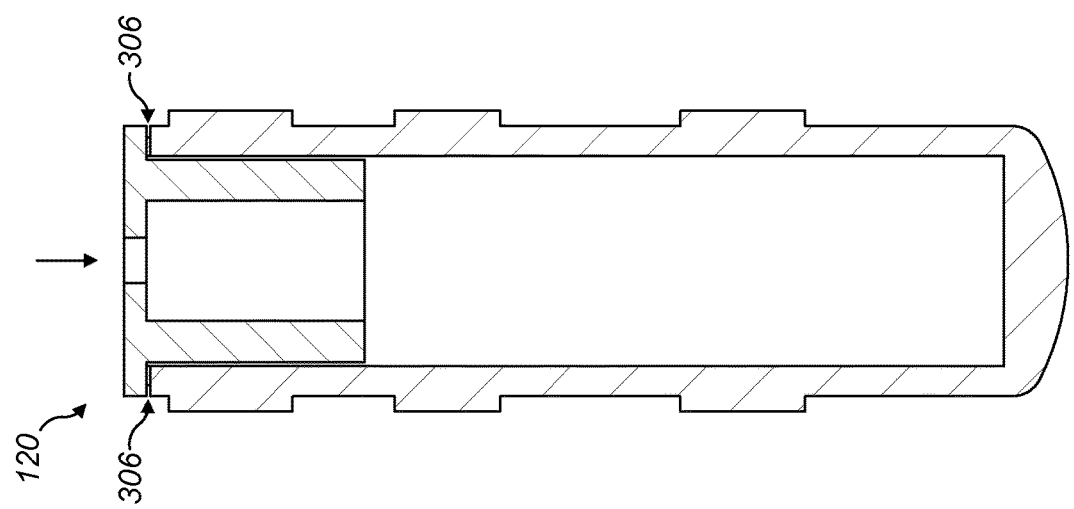
Figure 21A:
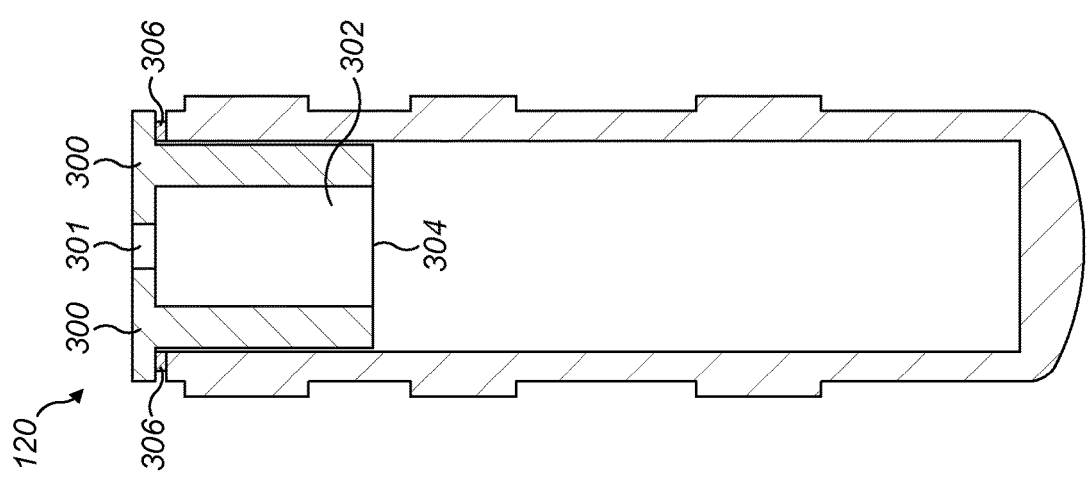

FIGS. 21A to 21C show cross-sectional views through a shipping container 120 having an insulating collar 300 and a sealing mechanism. FIG. 21A shows a shipping container 120 comprising an insulating collar 300, such as the insulating collar 300 described above. The insulating collar 300 may be coupled to a thermal shield 304, such as the shield described above. The insulating collar 300 may be coupled to a lid of the shipping container, or may provide the lid as shown in FIG. 21A. The void 302 within the insulating collar 300 provides the space in which the cryocooler, cold finger, and heat sink may be provided. A gap 301 in the insulating collar 300 in the lid portion may enable the cryocooler to be coupled to the engine which operates the cryocooler. A seal 306 is provided between the lid portion of the insulating collar 300 and the insulated housing of the shipping container, as shown. The seal 306 may be provided by an O-ring in, or coupled to, the underside of the lid portion of the insulating collar 30. In embodiments, the seal 306 may be, or may comprise, a foam material. The foam seal may be compressed, as shown in FIG. 21B. This is advantageous as if there is relative vertical movement between the engine and the cavity/insulated housing, the seal remains intact. The seal may need to be sufficiently thick such that it can be compressed down or can expand to fill a varying gap between the insulated housing and insulating collar 300. The seal may also remain intact if there is an angular misalignment between the engine and the cavity/insulated housing, as shown in FIG. 21C. This misalignment may occur if the shipping container experiences a shock, or if someone tries to twist apart the engine and the insulated housing.

Figure 18A:
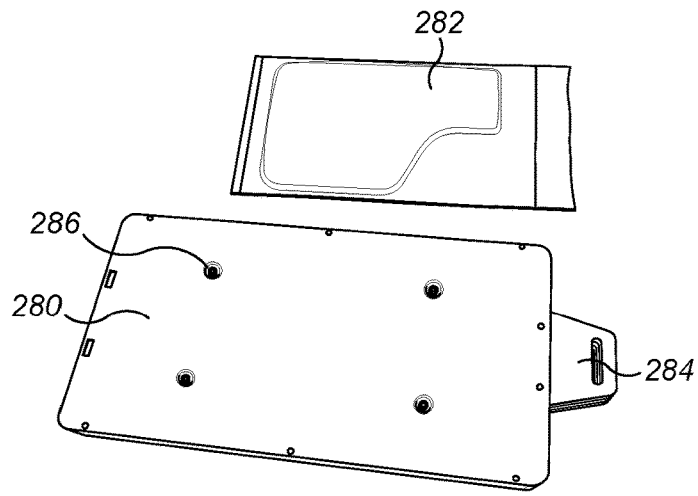
FIG. 18A shows a container for holding a cryopreserved sample within a shipping container and for maintain the sample at a required temperature when removed from the shipping container.

A further technique for maintaining a temperature of the cryopreserved sample when active cooling is no longer taking place involves providing the sample within an insulated container. FIG. 18A shows a container for holding a cryopreserved sample within a shipping container and for maintaining the sample at a required temperature when removed from the shipping container. It is important that a cryopreserved sample is thawed in a way that prevents ice formation within the sample, which could impact the viability of the sample. Thus, a specialised thawer may be required to thaw the cryopreserved sample, which controls the rate of change of temperature. however, when a cryopreserved sample is removed from the shipping container, it will begin heating up quickly and in an uncontrolled manner. Thus, it is desirable to keep the cryopreserved sample at the temperature it was at in the shipping container when the sample is removed from the shipping container, for a few minutes. This allows the cryopreserved sample to be removed from the shipping container and transferred to a thawer without the temperature of the sample increasing, or increasing too rapidly.

The container 280 shown in FIG. 18A comprises a foam skin and at least one thermal mass within the container (not visible here). A void within the container provides a space for a cryopreserved sample. the container comprises a plate (not visible) on which a cryopreserved sample 282 may be placed. The container and cryopreserved sample 282 may be slotted into the void of container 280. The plate comprises a handle 284 for handling the plate, both when the plate is being inserted into the void of container 280, and when the plate and cryopreserved sample are removed and transferred to a thawer. This means a user does not have to directly touch or handle the cryopreserved sample 282, which prevents heat transfer from the user to the sample. The thermal mass may be coupled to the foam skin in any suitable manner. However, as the thermal mass may expand and contract by a different amount compared to the foam skin, there may be limitations to the coupling technique. In the depicted embodiment, the thermal mass is a layer/block of aluminium and the block of aluminium is screwed to the foam skin using screws 286. Here, four screws 286 are used as this is sufficient to couple the aluminium layer to the foam skin while allowing the aluminium layer and foam skin to expand and contract freely (and without the foam skin cracking). The foam skin enables the whole of the container 280 to be handled by a user with their bare hands, and without specialist equipment, even when the temperature in the shipping container was −200° C. the handle 284 of the plate may also be covered in the foam material for similar reasons.

Figure 18B:
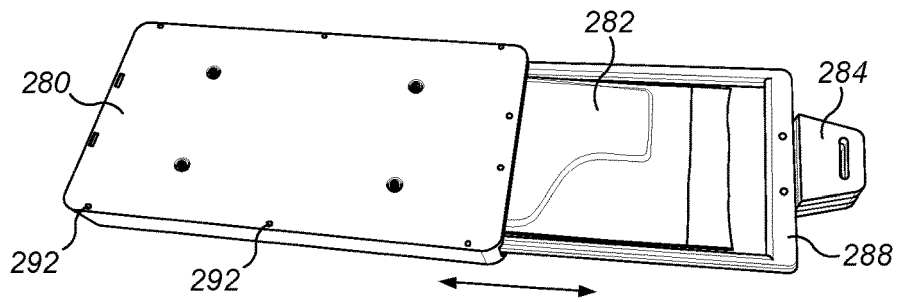
FIG. 18B shows how a cryopreserved sample is inserted into and extracted from the container.

FIG. 18B shows how a cryopreserved sample 282 is inserted into and extracted from the container 280. The sample 282 is placed on plate 288, and plate 288 is inserted into (slides into) the void of the container 280. The container 280 comprises two foam skins, which are each coupled to a thermal mass. The two foam skins are shaped in a manner such that when the foam skins are brought into contact, a void is formed between the foam skins. The foam skins comprise a plurality of magnets 292 to couple together the two skins when brought into contact with each other, and to enable the container 280 to be quickly and easily disassembled (e.g. to extract a sample). the magnets 292 may be provided along edges of the foam skins, as shown in FIG. 18B.

Figure 18C:
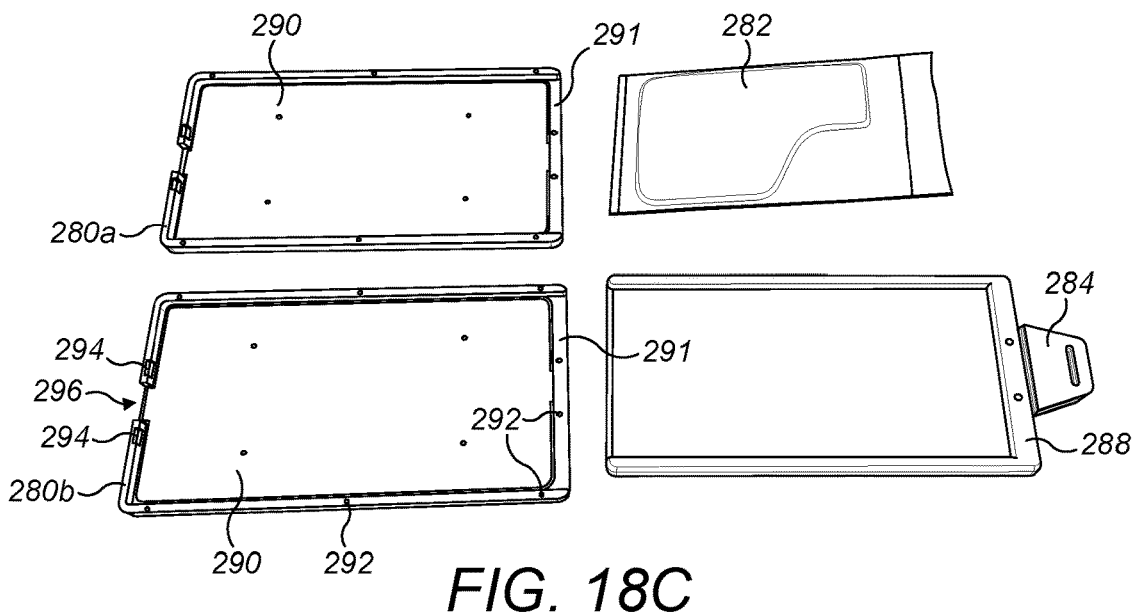
FIG. 18C shows the structure of the container.

FIG. 18C shows the structure of the container 280 in more detail. The container 280 comprises a first foam skin 280a and a second foam skin 280b. each foam skin 280a and 280b is coupled to a thermal mass 290, e.g. an aluminium block. The aluminium block 290 sits within a recess within a foam skin. A plurality of magnets 292 are provided around the edges of each foam skin 280a, 280b. one edge 291 of each foam skin 280a,b is shaped to enable the plate 288 to be slotted into the container 280, and the edges 291 of the foam skins are aligned when the container 280 is formed. Edges 291 define the top of the container 280. The bottom edge of each foam skin comprises at least one magnet 294. The magnet(s) 294 magnetically engage with a magnetic element within the cavity of the shipping container, which is located within or on the base of the cavity. This enables the container 280 to be inserted into the shipping container and positioned and held in a controlled, fixed manner within the shipping container. The bottom edge of each foam skin may comprise a cut-away section 296, which may be used to enable a temperature sensor within the cavity of the shipping container to be coupled to at least one of the aluminium blocks 290. This may enable the temperature of the aluminium block 290 to be measured in situ when the container and cryopreserved sample is within the shipping container. The temperature of the aluminium block 290 will provide a good indication of the temperature of the cryopreserved sample 282.

Figure 19A:
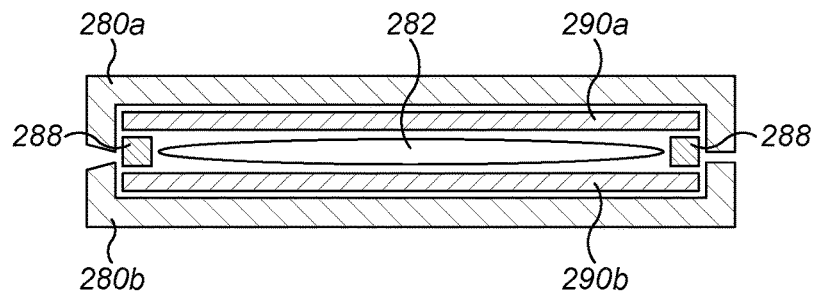
FIG. 19A shows a cross-sectional view through the container of FIG. 18A.

FIG. 19A shows a cross-sectional view through the container of FIG. 18A. The container 280 comprises a first foam skin 280a and a second foam skin 280b. Foam skins 280a and 280b are coupled to thermal masses 290a and 290b, respectively. The shape of the foam skins 280a and 280b creates a void when the skins are coupled together. This enables plate 288 carrying the cryopreserved sample 282 to be inserted between the foam skins.

Figure 19B:
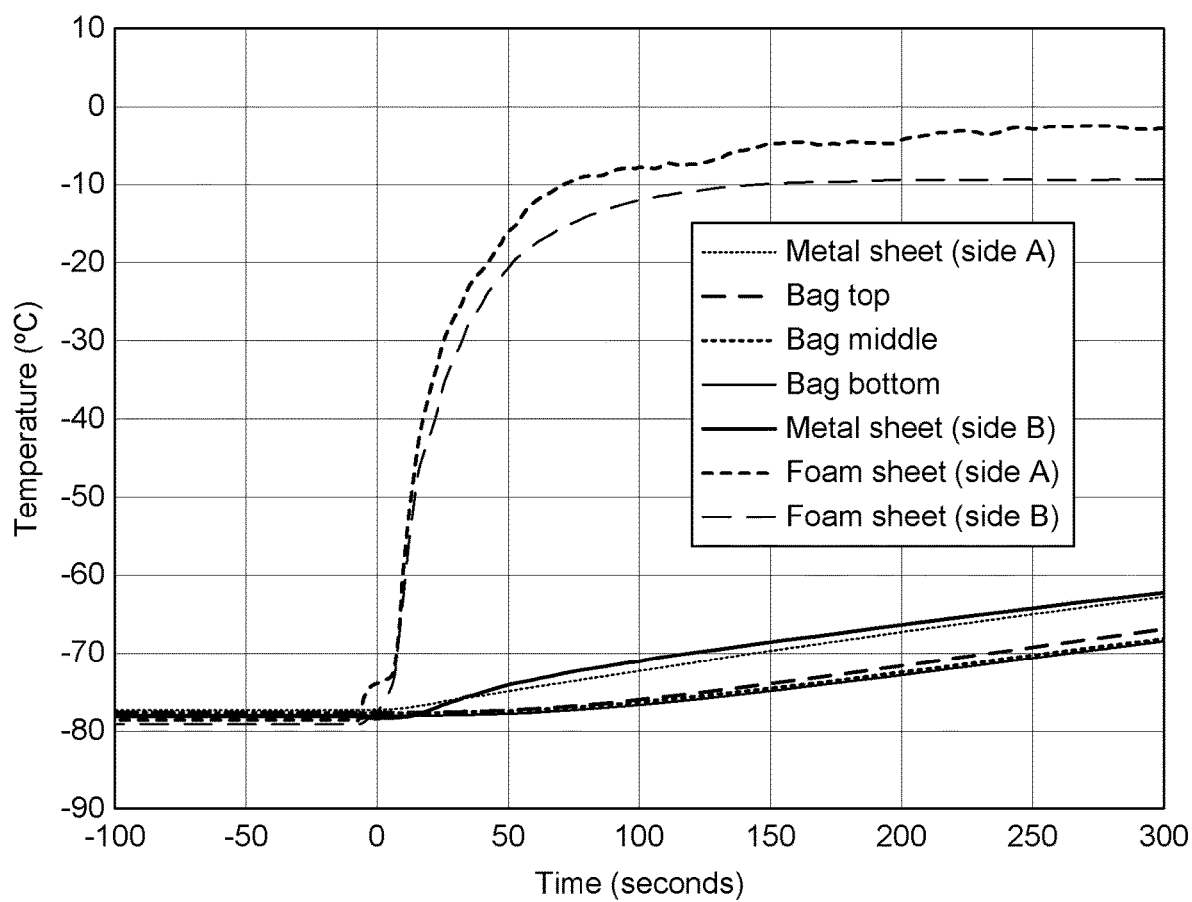
FIG. 19B shows how a graph of the rate of temperature increase of a cryopreserved sample and elements of the container of FIG. 18A when the container is removed from the shipping container.

FIG. 19B shows how a graph of the rate of temperature increase of a cryopreserved sample and elements of the container of FIG. 18A when the container is removed from the shipping container. As shown, the temperature of the foam skins of the container increases very quickly and by a large amount when the container is removed from the shipping container. Here, the temperature of the foam skins increase by over 50° C. in under a minute, which is very fast and unsuitable for the thawing of a cryopreserved sample. in contrast, the temperature of the aluminium blocks and the cryopreserved sample (bag top, bag middle, bag bottom) increases by only a few degrees in a minute. This shows that the thermal masses of the container help to keep the cryopreserved sample cold even when the container is removed from the shipping container. This provides a user with sufficient time (e.g. a few minutes) to extract the container and transfer the container and sample to a thawer, without impacting the viability of the sample.

Figure 20A:
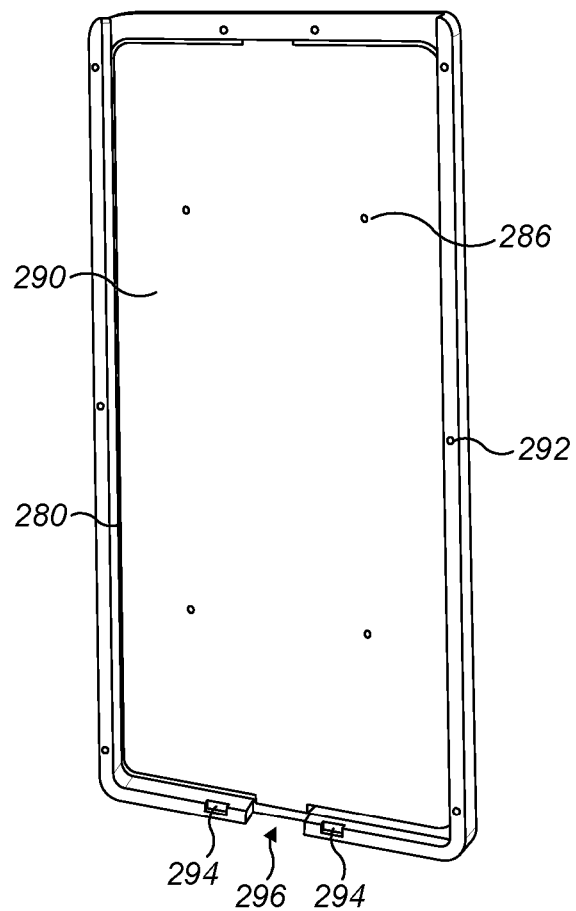
FIG. 20A shows how elements of the container of FIG. 18A that enable the container to be held within the shipping container.

FIG. 20A is another view of a foam skin of the container 280 which shows two positioning magnets 294 in a bottom edge of the foam skin. The positioning magnet(s) 294 magnetically engage with a magnetic element within the cavity of the shipping container, which is located within or on the base of the cavity. this enables the container 280 to be inserted into the shipping container and positioned and held in a controlled, fixed manner within the shipping container. The bottom edge of each foam skin comprises a cut-away section 296, which may be used to enable a temperature sensor within the cavity of the shipping container to be coupled to at least one of the aluminium blocks 290.

Figure 20B:
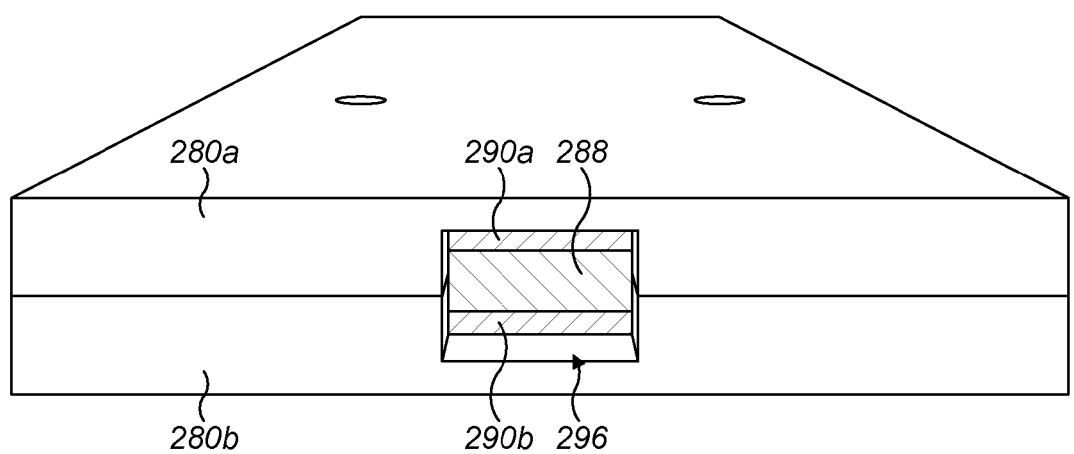
FIG. 20B shows how the temperature of the cryopreserved sample within the container may be monitored when the container is in situ.

FIG. 20B shows a view of the bottom edge of a container 280, and the cut-away section within foam skins 280a, 280b that enables the insertion of at least one temperature sensor/probe into the container 280. Just visible are the thermal masses 290a, 290b, which the temperature probe(s) would contact to measure temperature and infer the temperature of the cryopreserved sample.

Thus, in embodiments there is provided a container for holding at least one cryopreserved biological sample within a shipping container of the types described herein.

The container may comprise: an outer insulating layer; a cavity within the container for at least one cryopreserved biological sample; and at least one thermal mass provided as an inner layer, and coupled to at least part of the outer insulating layer.

The container may comprise a pair of container halves adapted to be engaged together to form the container. Each container half of the pair of container halves may comprise an outer surface formed of an insulating material, and an inner surface formed of a thermal mass. The pair of container halves may engage together using a releasable engagement means. The releasable engagement means may be a magnetic engagement means. Each container half may comprise a plurality of magnets.

The container may comprise at least one aperture. A temperature sensor may be coupleable to the container via the at least one aperture.

The container may comprise a docking mechanism for docking the container into a shipping container having a compatible docking mechanism. The docking mechanism may comprise at least one magnet.

The container may comprise a loading means for loading the at least one cryopreserved biological sample into the container. in embodiments, this may take the form of a plate (as described above), which may be suitable for samples in cryobags. In embodiments, this may take a form suitable for samples provided in other types of containers, such as vials, multi-well plates, tubes, etc. in embodiments, more than one sample container (e.g. cryobag, vial, multi-well plate, etc.) may be loadable into a single container.

Portable Housing for a Shipping Container

Figure 14C:
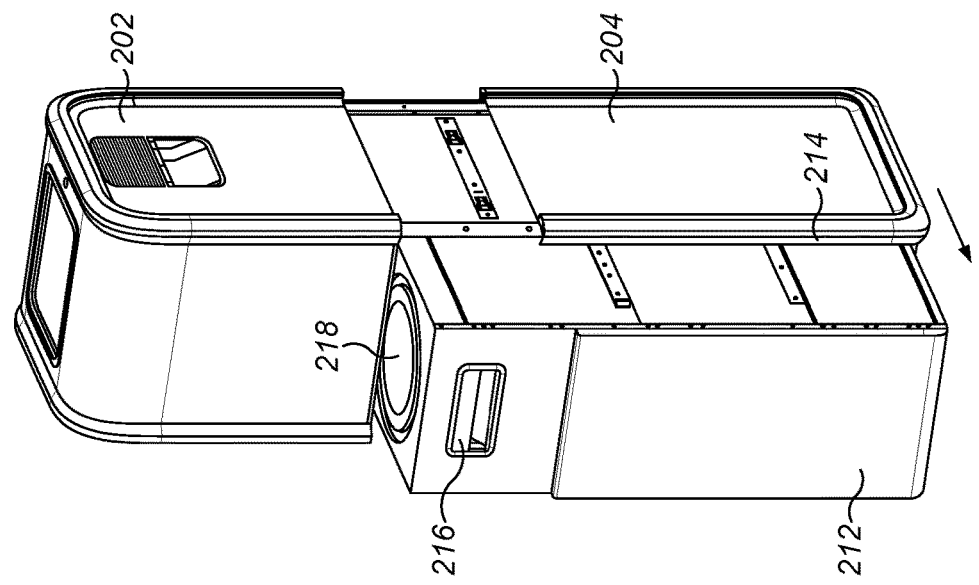
FIG. 14C shows a view of the portable housing with the upper portion raised and the shipping container pulled-out.
Figure 14B:
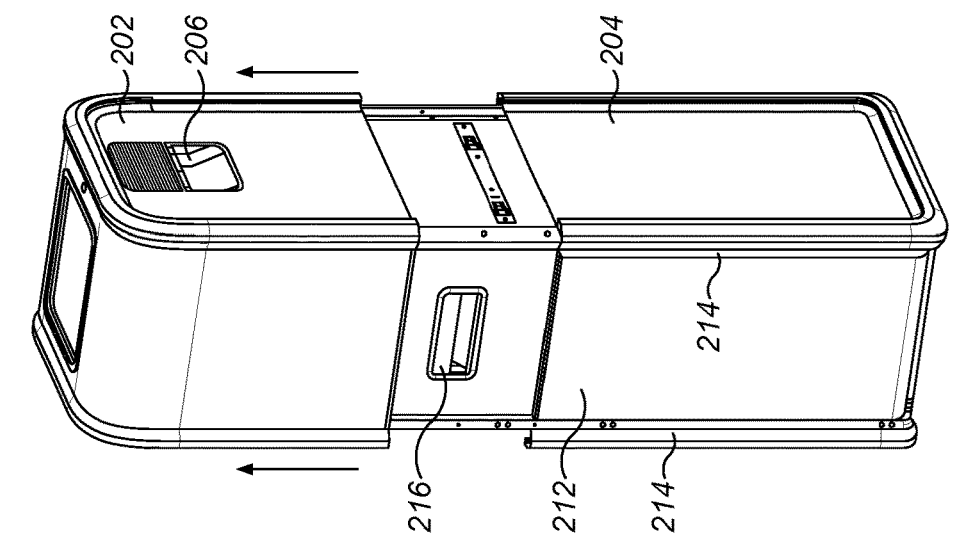
FIG. 14B shows a view of the portable housing with the upper portion raised.
Figure 14A:
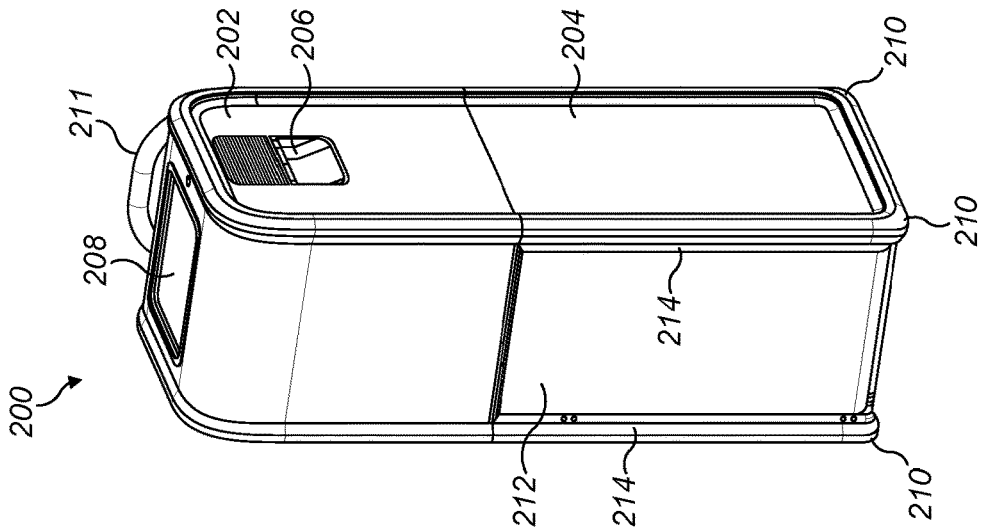
FIG. 14A shows a view of a portable housing for housing a shipping container, the portable housing comprising upper and lower portions.

FIG. 14A shows a perspective view of a portable housing 200 for housing a shipping container, the portable housing comprising an upper (top) portion 202, and a lower (bottom) portion 204. The portable housing comprises a drawer mechanism which is slideably engaged with the lower portion 204 of the portable housing. A shipping container 212 of the type described herein is mountable in/couplable to the drawer mechanism. The portable housing 200 comprises a user interface or display 208 in the upper portion 202. The portable housing 200 may comprise a handle 211 or other mechanism to move the portable housing. The lower portion 204 may comprise guide rails 214 or a similar mechanism to enable the shipping container 212 to slide in and out of the portable housing 200. The portable housing 200 may comprise wheels to help transport the portable housing 200, e.g. at positions 210 on the lower portion 204. The upper portion 202 may comprise at least one handle 206 for moving the upper portion 202 into engagement with the lower portion 204 and for disengaging the upper portion 202 from the lower portion 204. Preferably, two handles 206 are provided on opposite surfaces of the upper portion 206. The upper portion 202 may comprise at least the engine of the cryocooler. The lower portion 204 may comprise the insulated housing.

When the upper portion 202 is engaged with the lower portion 204 (as shown in FIG. 14A), the drawer mechanism of portable housing 200 is locked, such that the shipping container 212 is locked within the portable housing 200. the portable housing 200 may comprise clasps or other locking mechanisms to retain the shipping container 212 in the portable housing 200. When the upper portion 202 is engaged with the lower portion 204, the engine is also coupled to the cryocooler of the shipping container and therefore, it is undesirable for the shipping container 212 to be pulled out of the portable housing 200 as this may damage the engine, housing and/or shipping container.

FIG. 14B shows a view of the portable housing with the upper portion raised. In this position, the upper portion 202 is disengaged from the lower portion 204, and the engine (not visible) is disengaged from the cryocooler in the shipping container 212. Part of the shipping container 212 is located within the upper portion 202 when the upper portion 202 is engaged with the lower portion. When the upper portion 202 is disengaged, this part of the shipping container 212 is freed. A handle 216 on the shipping container may be revealed, which can be used to pull the shipping container 212 out using the drawer mechanism. FIG. 14C shows a view of the portable housing with the upper portion raised and the shipping container pulled-out. The lid/seal 218 of the shipping container 212 is now visible—this can be removed to extract any cryopreserved sample within the shipping container 212 or to place a sample within the container.

In embodiments, the shipping container 212 may not be fully extractable from the portable housing 200 by a user, to prevent damage to any electronics, circuitry, etc. which is provided between the shipping container 212 and the portable housing 200. The portable housing 200 may be returned by a user to a manufacturer/supplier for maintenance requirements.

Not visible in FIGS. 14A-C is the means for coupling the portable housing to a power supply (e.g. a mains supply), for the purpose of powering the engine and cryocooler. The portable housing may also comprise one or more batteries for a back-up power supply, to perform low-power tasks such as temperature sensing, or to maintain the display 208 when mains power is disconnected. The portable housing may also comprise means for communicating with a remote server. This may be used to provide information on the location of the portable housing 200, the status of the portable housing (e.g. temperature, remaining duration for which the cryopreservation temperature can be maintained, etc.) to a remote server/cloud service.

FIG. 15A shows a cross-sectional view of a mechanism to raise and lower the upper portion 202 of the portable housing 200 of FIG. 14A, with the upper portion 202 in a raised position. When the upper portion 202 is in a raised position, the upper portion 202 remains in the raised position until a requisite amount of force is applied to lower the upper portion 202. Resilient members 264 within the upper portion 202 and coupled to the engine 268 cause the upper portion and engine 268 to move up to a datum surface 252. The resilient members 264 may be springs. Similarly, when the upper portion 202 is disengaged from the lower portion 204, the shipping container 212 moves up to datum surface 254 by means of the resilient members 262. The lower portion 204 comprises shock absorbers 258 to protect the shipping container 212 from shocks imparted to the side of the portable housing. The lower portion comprises an end stop 260 on the base of the lower portion 204 to protect the shipping container 212 from hitting the base of the lower portion/portable housing. The upper portion 202 comprises shock absorbers 258 to protect the engine 268 from shocks imparted to the side of the upper portion 202, and stops 266 to protect the engine from vertical shocks and to prevent the engine from moving any further. the shock absorbers 258, end stop 260 and stops 266 may be formed of rubber.

FIG. 15B shows the upper portion in a lowered position, and FIG. 15C shows how the end stop 260 protects the shipping container 212. As the engine 268 and upper portion is lowered, the engine 268 makes contact with the shipping container, and has sufficient load to push the shipping container down beyond its datum surface 254. As shown in FIG. 15C, the shipping container 212 is pushed down against end stop 260. The end stop, shock absorbers and stops 268 restrict movement of the shipping container and engine in all three planes. The spring rates of the resilient members 264 and forces required to lower the upper portion are chosen to enable the shipping container 212 to be pulled-up towards the datum surface 254 while remaining low enough for the engine 268 to overcome them to push the shipping container down towards the end stop 260.

Figure 16:
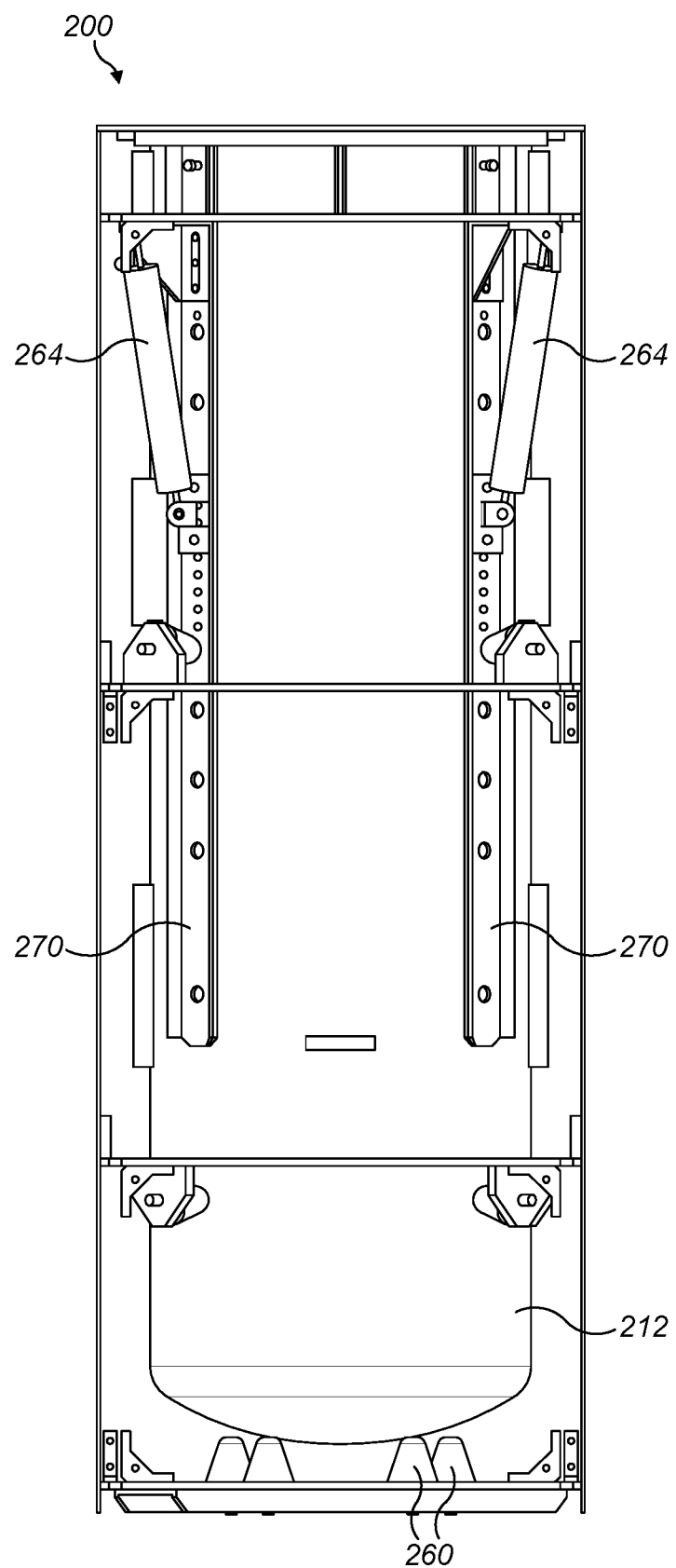
FIG. 16 shows a more detailed view of the portable housing and mechanism of FIG. 15A.

FIG. 16 shows a more detailed view of the portable housing 200 and mechanism of FIG. 15A. Here, guide rails 270 are visible. The upper portion 202 slides along guide rails 270, which enables the upper portion to be raised and lowered.

Figure 17:
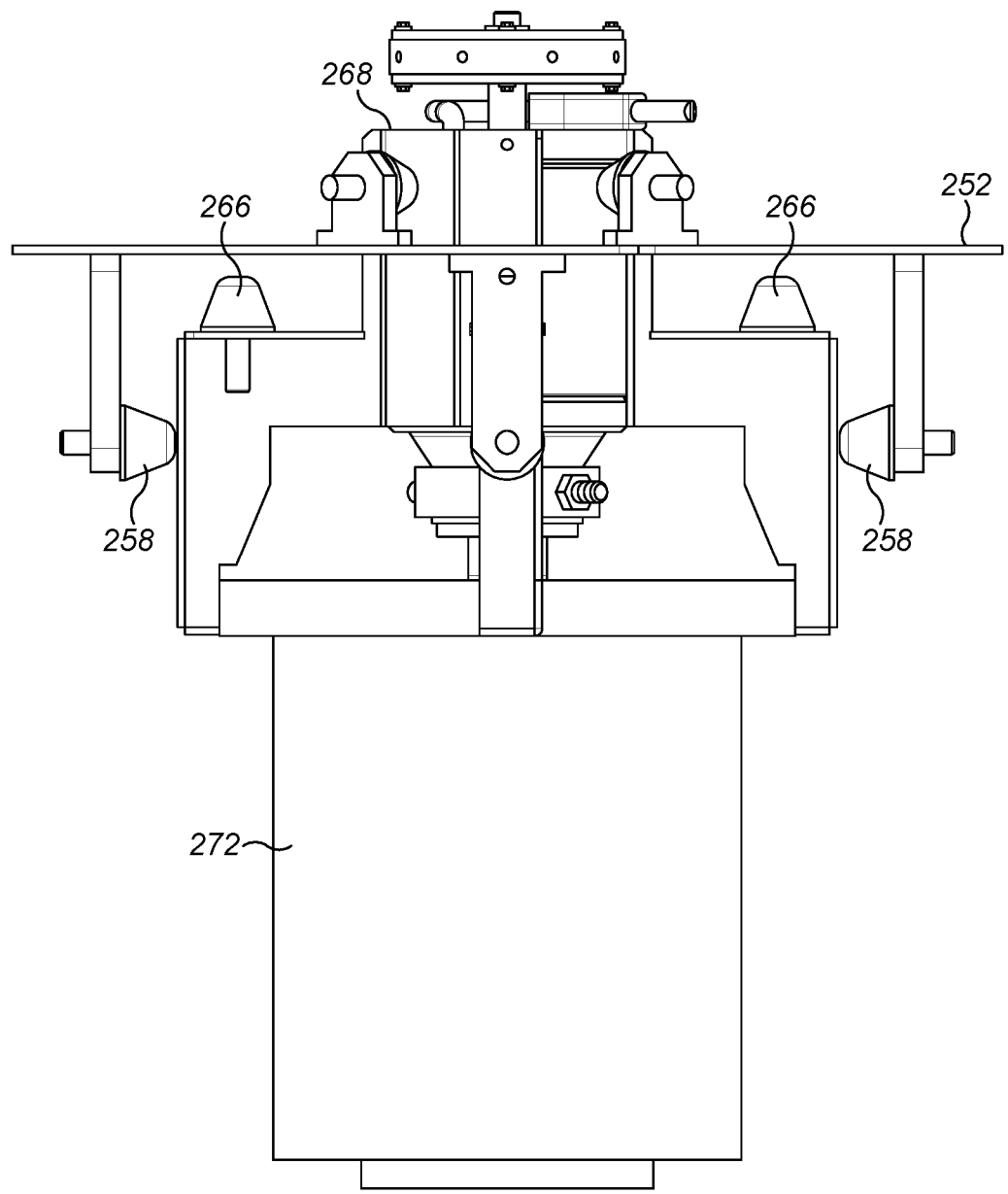
FIG. 17 shows a more detailed view of the upper portion of the portable housing and mechanism of FIG. 15A.

FIG. 17 shows a more detailed view of the upper portion of the portable housing and mechanism of FIG. 15A. Here, the engine 268 is engaged with the lid and insulating collar/foam plug 272 of the shipping container 212.

Thus, in embodiments, there is provided a portable housing for the shipping container described herein. The portable housing may comprise a top portion; a bottom portion; and a drawer mechanism slideably engaged with the bottom portion.

A shipping container of the type described herein may be mountable in the drawer mechanism.

When the top portion is engaged with the bottom portion, the drawer mechanism is locked within the bottom portion. When the top portion is disengaged from the bottom portion, the drawer mechanism is able to slide within the bottom portion, to thereby enable access to the shipping container.

The portable housing may comprise at least one handle on the top portion for raising and lowering the top portion.

The portable housing may comprise a user interface or display. The user interface or display may be provided on the top portion.

The portable housing may comprise at least one tilt sensor to detect tilting of the portable housing.

The portable housing may comprise comprising a suspension system to absorb shock during movement of the portable housing. The suspension system may comprise one or more shock absorbers.

Figure 22:
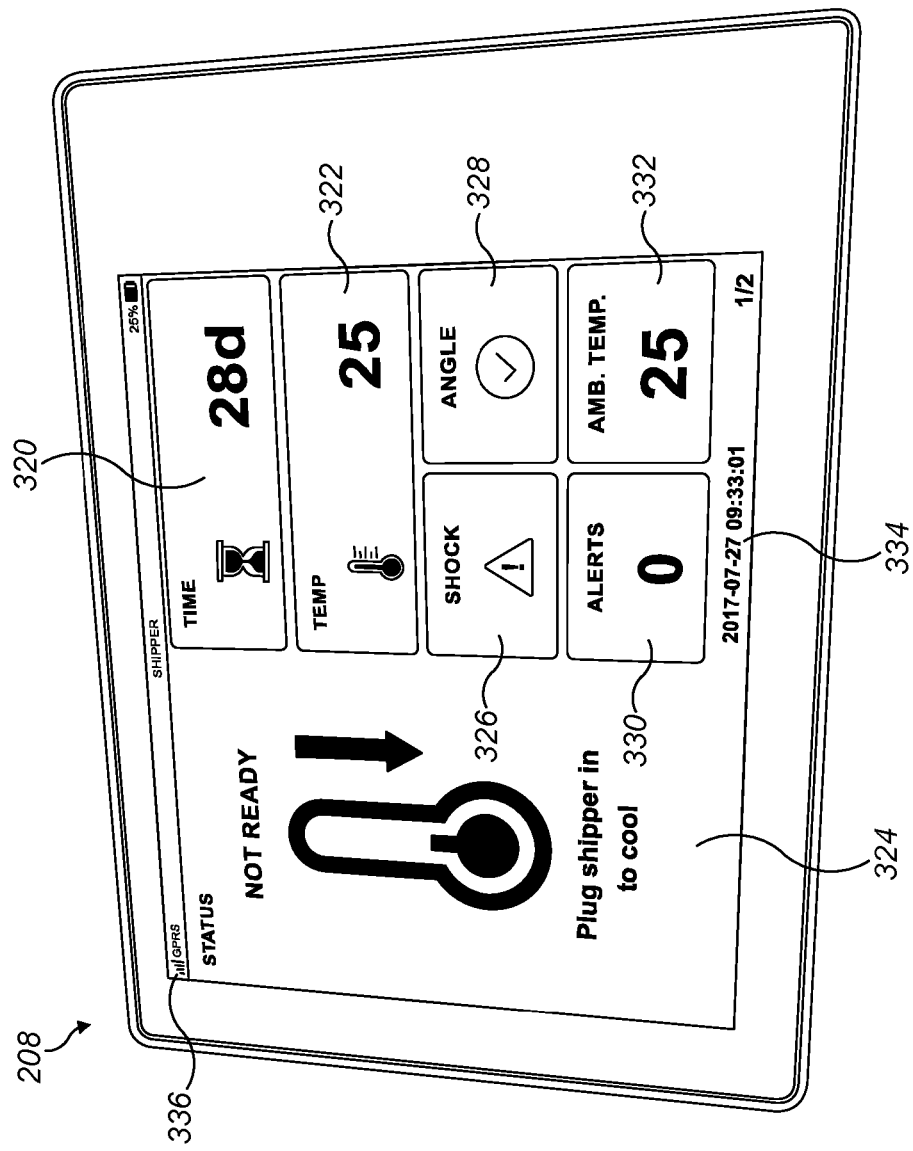
FIG. 22 shows an example user interface of a portable housing for a shipping container.

FIG. 22 shows an example user interface 208 of a portable housing for a shipping container. The user interface may be used to display any information to a user of the portable housing. For example, the user interface may display any one or more of:

a duration 320 indicating how long the shipping container may remain at the required temperature when power has been disconnected (i.e. during passive cooling);
 a temperature 322 of the cavity of the shipping container (or of the cryopreserved sample, as explained above);
 an indication 322 of whether the portable housing has received any shocks;
 a tilt angle 328, indicating whether the shipping container is tilted;
 any alerts 330;
 ambient/external temperature 332;
 current time and/or date 334;
 status information 324 (e.g. indicating whether the shipping container is at a temperature suitable for inserting a cryopreserved sample, or if the shipping container currently contains a cryopreserved sample);
 connectivity to a communication network for the purpose of transmitting data to a remote server; and
 a status of any liquified gas that maybe present in the shipping container.

Figure 23:
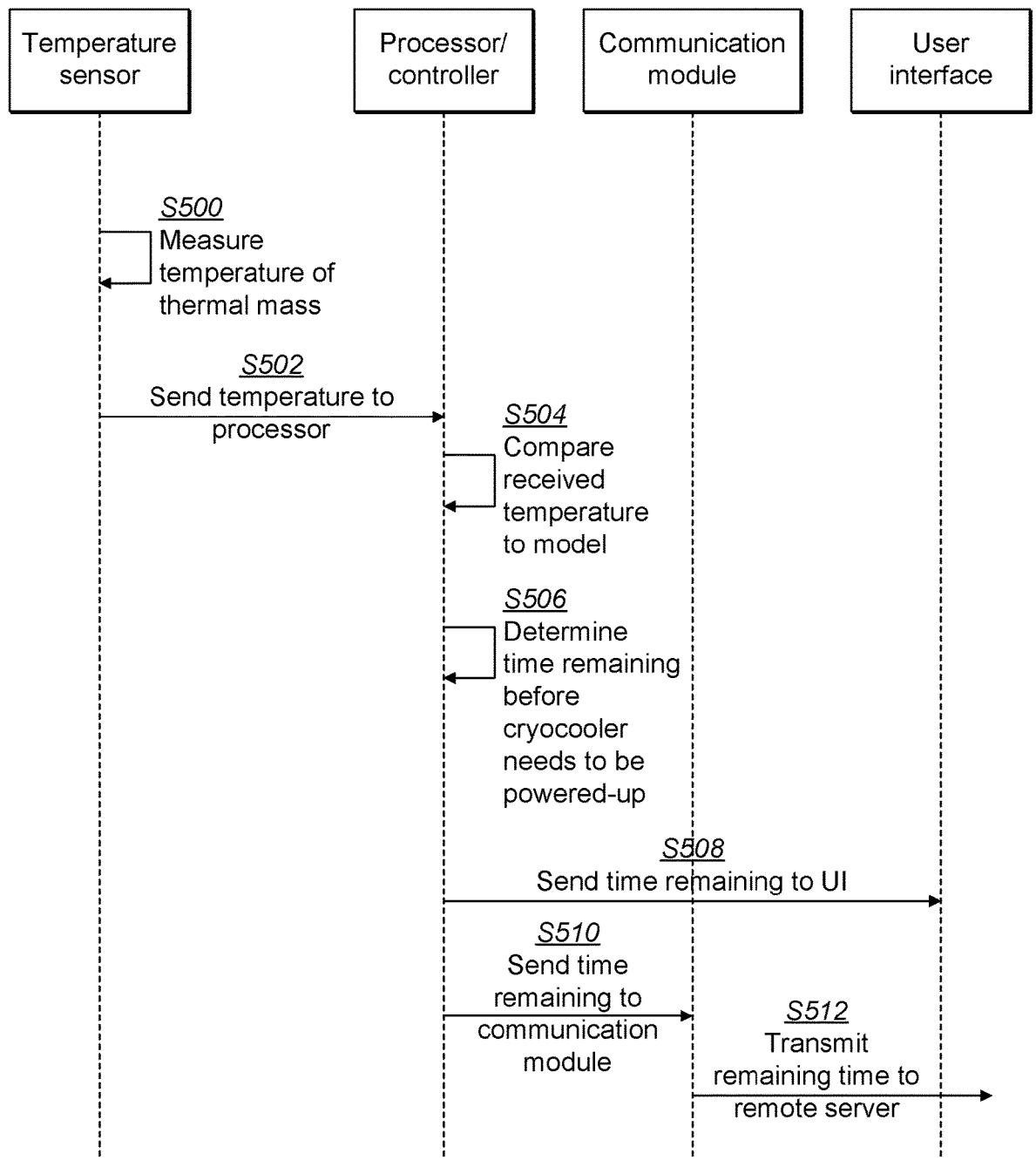
FIG. 23 shows a schematic diagram of example steps to determine how long a shipping container may remain at a required temperature when the cryocooler is switched-off.

FIG. 23 shows a schematic diagram of example steps to determine how long a shipping container may remain at a required temperature when the cryocooler is switched-off. At step S500, a temperature sensor coupled to the thermal mass within the container for a cryopreserved sample (as described above with respect to FIG. 18) is used to measure the temperature of the thermal mass. The measured temperature is sent to a processor or controller (S502). The processor/controller receives the temperature and compares the temperature to a temperature model (step S504). Generally speaking, a thermal mass such as aluminium will warm-up at a linear rate. The temperature model used by the processor may be generated from experiments conducted using the shipping container and based on the same type and quantity of thermal mass in the shipping container. the temperature model provides information on how long it will take for the shipping container to warm-up when no active cooling is taking place. Thus, at step S506, the processor determines, using the model and received temperature information, the time remaining before the cryocooler needs to be switched-on to prevent the temperature of the cryopreserved sample increasing to a point where the sample may start thawing. This may be range from minutes, to hours to several days. the remaining time is transmitted to a user interface (step S508) so that a user may determine if they need to take action to power-up the cryocooler. The processor may also transmit the remaining time to a communication module (step S510) which may in turn transmit the information to a remote server (step S512). The measured temperature and remaining time may be stored by the processor and/or remote server, so that it is possible to analyse the viability of the cryopreserved sample at a later time.

Figure 25:
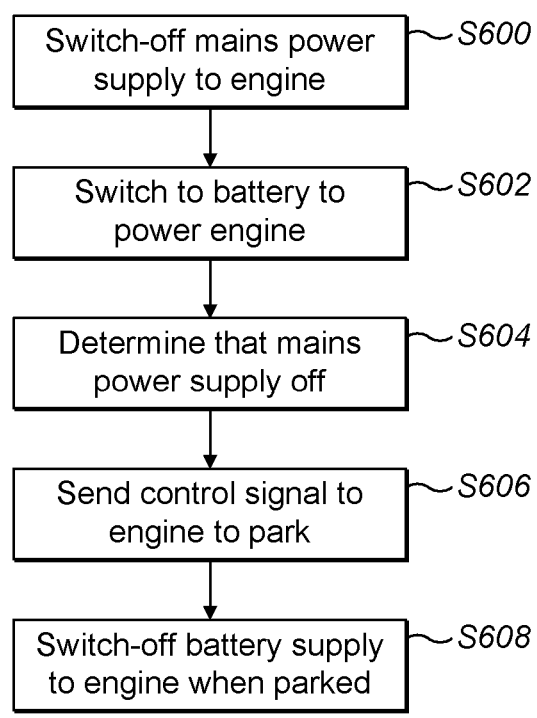
FIG. 25 shows a flow diagram of example steps to safely park a Stirling engine of a cryocooler.

FIG. 25 shows a flow diagram of example steps to safely park a Stirling engine of a cryocooler. When a Stirling engine is suddenly disconnected from a power supply (e.g. mains supply when the engine is being used for active cooling), the engine may not park itself correctly, which could damage parts of the engine or cause parts of the engine to misalign. To prevent damage to the engine or misalignment, it is useful to warn the Stirling engine that power is to be disconnected, to allow the engine enough time to park itself. this may take a few seconds, e.g. 20 seconds, i.e. is not instantaneous. When a mains power supply is disconnected from the engine, or when the power supply is turned-off, the Stirling engine relies on at least one battery to keep running. The battery supply may always be connected to the Stirling engine during active cooling, so that it is ready to be used when mains power is switched-off. The battery supply needs to be sufficient to enable the Stirling engine to complete the parking process. Thus, the shipping container and/or portable housing described above may comprise one or more batteries for use in this parking process (as well as other purposes, such as keeping the user interface on, communicating with a remote server, temperature sensing and analysis to determine remaining time at required temperature, etc.).

At step S600, a mains power supply to the engine is disconnected. The engine now relies on one or more batteries for power (step S602). A controller/processor/circuitry may determine that mains power supply has been turned-off and that the engine needs to safely park and switched-off (step S604). The controller sends a control signal to the engine to park (step S606). Once the engine has parked, the battery supply to the engine is disconnected so that the engine can be powered-down (step S608).

Thus, in embodiments, there is provided a method for safely switching-off an engine of a cryocooler, the method comprising: determining a mains power supply has been disconnected from the engine; sending a control signal to the engine to park; and de-coupling the engine from at least one battery. The engine may be connected to the at least one battery whenever the engine is connected to a mains power supply.

The method may comprise determining that the engine has parked before de-coupling the engine from the at least one battery. Alternatively, the method may comprise waiting a specified period between sending the control signal and de-coupling the engine from the at least one battery. the specified period may be approximately equal to or greater than a time required for the engine to park.

Figure 26B:
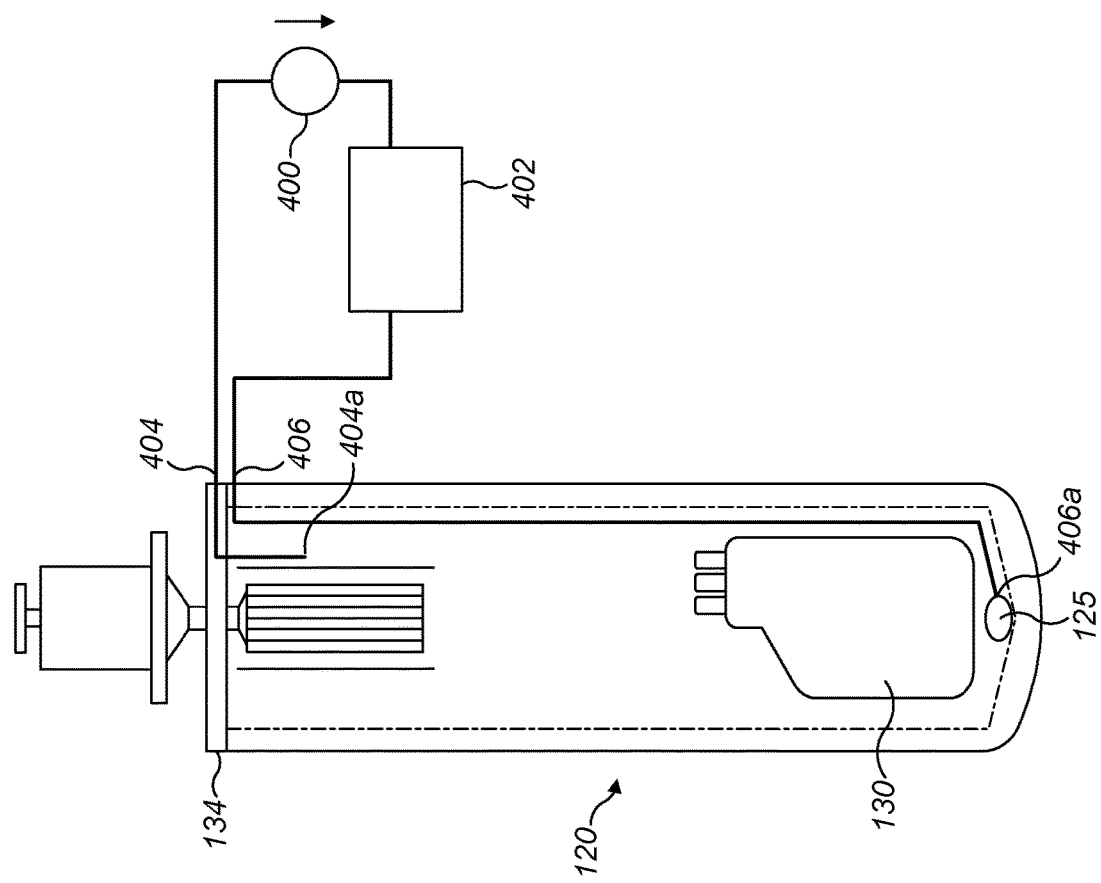
FIG. 26B shows a cross-sectional view through a shipping container comprising a mechanism to reduce build-up of liquified gas within the shipping container.
Figure 26A:
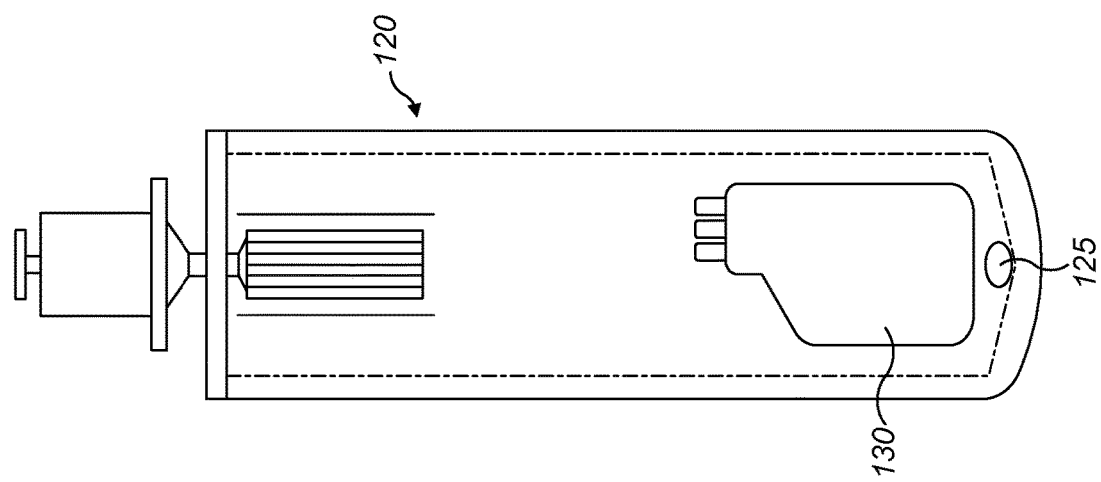
FIG. 26A shows a cross-sectional view through a shipping container and the location of liquified gas build-up within the container.

FIG. 26A shows a cross-sectional view through a shipping container 120 and the location of liquified gas build-up within the container. As explained above, liquified gas may form at the top of the shipping container, and may drip down the shipping container towards the base. To achieve the lowest temperature at the base of the shipping container cavity, and to thereby achieve the longest standby time (i.e. the time during which active cooling is not taking place), the cryocooler may need to be operating such that the temperature of the cryocooler is lower than the temperature of the shipping container base (as shown by arrow 76 in FIG. 7). Once liquified gas has been formed in the shipping container 120, due to partial pressures, the nitrogen and air may have substantially the same condensation temperatures, such that they condensate at similar rates. However, when the liquid nitrogen evaporates, the vapour within the shipping container may contain more nitrogen (e.g. ~6% oxygen, ~94% nitrogen). This mean that the liquid air that builds-up in the shipping container base may contain more oxygen (e.g. ~50% oxygen, ~50% nitrogen). This means that the liquified air which builds-up in the shipping container base may essentially be 50% liquid oxygen, and the quantity of liquid oxygen may be a safety concern. Accordingly, it may be important to control the amount of liquid oxygen that is present within the shipping container 120 at any time.

In embodiments, at least one vessel 125 may be provided on the base of the shipping container cavity in a location where liquified gas may drip (or be caused to drip), as shown in FIG. 26A. In embodiments, the internal surface of the shipping container may be shaped to provide a vessel or recess within the surface of the cavity for collecting liquified gas.

The build-up of liquified gas may be controlled by, for example, warming the entire shipping container cavity to the boiling point of oxygen, such that the liquified oxygen is able to evaporate. However, this results in the whole system warming-up, which reduces the standby time of shipping container 120. Furthermore, it may be difficult to quantify how much liquid oxygen is present within the shipping container, or predict how much liquid oxygen may be likely to form within the container. This may be a concern if the shipping container is used to transport cryopreserved samples by air, as air safety precautions may require stating how much liquid oxygen is within the shipping container 120. Similarly, the build-up of liquified gas may be controlled by operating the cryocooler engine at a temperature range (e.g. −185° C. to −190° C.) that results in a minimal amount of liquified gas build-up. However, it may be difficult to control the operation of the engine such that it does not run at a much colder temperature, and as a result, it may be difficult to quantify the volume of liquid oxygen in the shipping container. Furthermore, if the engine does not run at temperatures that result in some liquid air build-up, then the temperature gradient between the top of the shipping container cavity and the base of the shipping container may be large enough such that coldest possible temperature is achieved in the base of the shipping container.

FIG. 26B shows a cross-sectional view through a shipping container 120 comprising a mechanism to reduce build-up of liquified gas (e.g. liquid oxygen) within the shipping container. This mechanism may help to solve the above-described problem of not being able to control or quantify the amount of liquid oxygen present within the shipping container. The mechanism may be part of, or used in conjunction with, the control system described above with respect to FIG. 8. FIG. 26B shows a shipping container 120 comprising at least one cryopreserved sample 130. The heating mechanism to reduce build-up of liquified gas comprises a pumping mechanism to remove warm air from the top of the shipping container cavity, heat the air to approximately room temperature (e.g. ~21° C.), and inject the heated air near the base of the shipping container cavity. In embodiments, room temperature air from the external environment may be used instead of, or in addition to, heating the air extracted from the shipping container. Injecting/pumping heated air near the base of the shipping container cavity, near the vessel 125 which collects the liquified gas, causes the temperature near the base of the cavity to increase, such that the liquified gas evaporates out of the vessel 125. In this way, the liquified gas volume in the shipping container 120 may be reduced to keep the volume to acceptable, safe levels. This may be particularly important when the shipping container is used to transport cryopreserved samples via air.

The pumping mechanism shown in FIG. 26B may comprise a pump 400, to pump warm air from the top of the shipping container cavity, heat the air to approximately room temperature, and inject the heated air near the base of the shipping container cavity. The pumping mechanism comprises a first pipe 404 to direct warm air from the top of the shipping container cavity towards pump 400, and a second pipe 406 to direct heated air towards the base of the shipping container cavity. First pipe 404 comprises an inlet 404a to draw air into pipe 404, and second pipe 406 comprises an outlet 406a to eject heated air towards the base of the shipping container cavity and in the vicinity of vessel 125. The pumping mechanism may comprise a heat exchanger 402 between the pump 400 and outlet 406a, to heat the air pumped out of the shipping container cavity. In FIG. 26B, the first pipe 404 and second pipe 406 are shown to pass through the lid or cover 134 of the shipping container 120. It will be understood that FIG. 26B shows one example arrangement of the pipework of the pumping mechanism.

The pumping mechanism shown in FIG. 26B may have the advantage that the whole shipping container cavity does not need to be heated to above 183° C. Furthermore, the pumping mechanism may be switched-on only when liquified gas has collected in vessel 125, which may improve the power-efficiency of the pumping mechanism and shipping container, and may prevent heated air from being ejected into the shipping container cavity when liquified gas is not present. The pumping mechanism may comprise a thermocouple, temperature sensor or similar device (not shown). The thermocouple may be located in vessel 125, or in or near outlet 406a. When liquified gas has built up in the base of the shipping container 120, the thermocouple senses/measures a particular temperature. When heated air is pumped into the base of the shipping container 120 via second pipe 406, the thermocouple temperature increases when there is substantially no liquified gas in the vicinity of the thermocouple. Accordingly, the thermocouple may be used to determine when liquified gas has collected in vessel 125, such that the pumping mechanism should be switched-on, and when liquified gas has evaporated such that the pumping mechanism should be switched-off. In embodiments, the thermocouple status may be evaluated regularly (e.g. every few minutes) to determine if liquified gas has collected or has evaporated. This may prevent heated air from being ejected into the shipping container unnecessarily, which may prevent the overall temperature in the container from increasing.

In the embodiment shown in FIG. 26B, the first pipe 404 and second pipe 406 may be formed of a thermally insulative material, such as plastic. Thus, the pumping mechanism may not pose an electrical safety risk, and may be readily sterilised. Additionally or alternatively, the mechanism to reduce the build-up of liquified gas in the shipping container may comprise a resistive element that is coupled to the base of the shipping container (e.g. to the vessel 125). For example, the resistive element may be one or more thin wires (e.g. copper wires) which heat-up when an electrical current passes through the wires, and thereby heat the liquified gas. However, having electrical circuits in an oxygen-rich environment may pose a safety risk. In embodiments, the pumping mechanism and resistive element may be combined to reduce the build-up of liquified gas.

Figure 27:
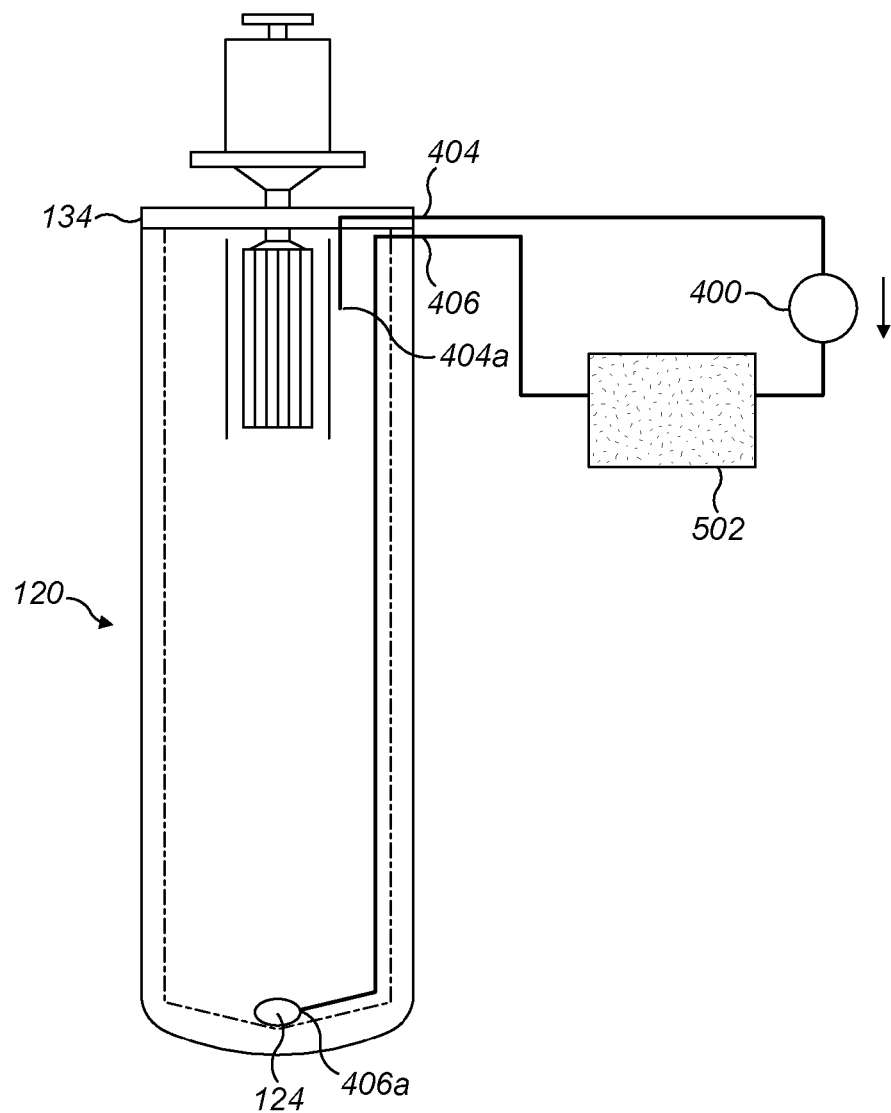
FIG. 27 shows a cross-sectional view through a shipping container comprising a mechanism for sterilising the shipping container.

FIG. 27 shows a cross-sectional view through a shipping container comprising a mechanism for sterilising the shipping container. Sterilisation may occur between shipping, i.e. when the shipping container 120 is not being used to ship or contain cryopreserved samples. The sterilisation mechanism may comprise a pump 400, to circulate a vapour-based sterilant through the shipping container. Thus, the sterilisation mechanism comprises a first pipe 404 to draw gas from within the shipping container cavity towards pump 400, and a second pipe 406 to direct sterilant into the cavity. First pipe 404 comprises an inlet 404a to draw gas into pipe 404, and second pipe 406 comprises an outlet 406a to eject sterilant and air back into the shipping container. The pumping mechanism may comprise a sterilant source 502 between the pump 400 and outlet 406a. The sterilant may be any suitable material for sterilising the shipping container, and is preferably a vapourised/gaseous sterilant. For example, the sterilant may be vapourised hydrogen peroxide, vapourised peracetic acid, or ethylene oxide, though it will be understood these are merely non-limiting, illustrative example materials. In embodiments, the sterilisation mechanism may comprise a decontamination device system, such as Fogact (http://www.pharmabio.co.jp/en/clean-room-solutions/#fogact). In embodiments, the sterilisation mechanism may comprise a UV light.

In FIG. 27, the first pipe 404 and second pipe 406 are shown to pass through the lid or cover 134 of the shipping container 120. It will be understood that FIG. 27 shows one example arrangement of the pipework of the sterilisation mechanism. In embodiments, the lid 134 of the shipping container 120 is placed on the shipping container when the sterilisation is taking place, which may reduce contact with any hazardous materials during the sterilisation, and ensures that the lid 134 is also sterilised. Other elements usually present within the shipping container 120, such as the thermal masses and sample holders, may be placed into the shipping container 120 during the sterilisation process, or may be separately sterilised.

In embodiments, the pipework of the pumping mechanism may be the same as that of the sterilisation mechanism. This may simplify the design of the shipping container 120. The heat exchanger 402 and sterilant source 502 may be swappable, so that the pump 400 can be used to either heat air or sterilise the shipping container. In embodiments, the pumping mechanism may be used to heat the shipping container before the sterilisation mechanism is used to sterilise the shipping container 120. This may be useful as warmer conditions may be required for the sterilant to work effectively, and it may be faster to use the pumping mechanism to heat the shipping container than to allow the shipping container to warm-up naturally over time.

In embodiments, there is also provided a sensor for a shipping container of the type described here, which may be configured to detect the presence of absence of liquified gas in the shipping container using temperature profiles experienced during heating. For example, the sensor may use (or a controller coupled to the sensor may use) the rate of change of sensed temperature during different operation modes (i.e. of the cryocooler), to determine whether liquified gas is present within the cavity of the shipping container. As explained earlier, if the temperature within the cavity of the shipping container changes too slowly/quickly when, for example, the cryocooler is not in operation, this may be indicative of liquified gas being present in the cavity.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. A shipping container for cryopreserved biological samples, the shipping container comprising:
   an insulated housing comprising a Dewar vessel, the Dewar vessel defining a cavity for containing a cryopreserved biological sample;
   a heat engine coupled to an exterior of the housing; and
   a thermal diode operable in a first state to provide cooling to the cavity and in a second state to impair heat transfer into the cavity,
   wherein the thermal diode is a gravitational thermal diode,
   wherein the container comprises a heat exchanger thermally coupled to the heat engine and configured to operate the thermal diode to provide cooling to the cavity, and
   wherein the heat exchanger entirely protrudes within the cavity,
   wherein the housing defines a recloseable opening of the cavity to receive the sample.

2. The shipping container according to claim 1, wherein the cavity is suitable for receiving a replaceable cartridge of cryogenic phase transition material in addition to the cryopreserved biological sample, optionally wherein engagement means are provided for receiving a replaceable cartridge of cryogenic phase transition material.

3. The shipping container according to claim 1, wherein the thermal diode is capable of maintaining a temperature difference of up to 180° C. across its vertical height with a power loss of less than 10 W.

4. The shipping container according to claim 1, wherein the thermal diode comprises an air blanket element or a closed circuit condenser/evaporator loop element.

5. The shipping container according to claim 1, wherein the heat exchanger is located at the vertically uppermost portion of the cavity when the shipping container is in an upright position.

6. The shipping container according to claim 1, wherein the heat exchanger is thermally coupled to a reservoir for receiving a cryogen.

7. The shipping container according to claim 1, wherein the heat engine is a Stirling cryocooler.

8. The shipping container according to claim 1, wherein the heat exchanger is at least partially surrounded with an infra-red shield.

9. The shipping container according to claim 1, further comprising one or more vacuum insulated panels located outside the cavity defined by the Dewar vessel.

10. The shipping container according to claim 1, further comprising one or more sensors for detecting the temperature within the cavity or the temperature of a sample located in the cavity, the location of the container, the power required to maintain the temperature within the cavity stable, the amount of cryogenic phase transition material in a cartridge located in the cavity, or the volume of a cryogen within the cavity.

11. The shipping container according to claim 1, further comprising an electronic contact for engagement with one or more sensors located within a replaceable cartridge of phase transition material.

12. The shipping container according to claim 10, further comprising one or more sensors and a communication unit for reporting a reading from the one or more sensors, wherein the reading from the one or more sensors indicates the position of the shipping container, the temperature in the cavity, the heat loss from the cavity, orientation of the cavity, shocks and vibration that the cavity has been exposed to or the integrity of the sample or a combination of such parameters.

13. The shipping container according to claim 1, further comprising a lid removably covering the recloseable opening of the cavity.

* * * * *